(12) United States Patent
Miller

(10) Patent No.: US 7,919,705 B2
(45) Date of Patent: Apr. 5, 2011

(54) MUSIC TRAINING SYSTEM

(76) Inventor: Arthur O. Miller, Little Rock, AR (US)

( * ) Notice: Subject to any disclaimer, the term of this patent is extended or adjusted under 35 U.S.C. 154(b) by 199 days.

(21) Appl. No.: 12/287,796

(22) Filed: Oct. 14, 2008

(65) Prior Publication Data

US 2010/0089221 A1 Apr. 15, 2010

(51) Int. Cl.
G10H 7/00 (2006.01)
(52) U.S. Cl. .......................................................... 84/616
(58) Field of Classification Search ................... 84/616, 84/477 R
See application file for complete search history.

(56) References Cited

U.S. PATENT DOCUMENTS

| | | | |
|---|---|---|---|
| 4,364,299 A | 12/1982 | Nakada et al. | |
| 4,732,071 A | 3/1988 | Deutsch | |
| 5,038,658 A | 8/1991 | Tsuruta et al. | |
| 5,056,398 A | 10/1991 | Adamson | |
| 5,440,756 A | 8/1995 | Larson | |
| 5,728,960 A * | 3/1998 | Sitrick | 84/477 R |
| 5,880,393 A * | 3/1999 | Kaneko et al. | 84/662 |
| 5,894,100 A | 4/1999 | Otsuka | |
| 6,051,769 A * | 4/2000 | Brown, Jr. | 84/477 R |
| 6,057,502 A | 5/2000 | Fujishima | |
| 6,140,568 A | 10/2000 | Kohler | |
| 6,346,666 B1 | 2/2002 | Tsai et al. | |
| 6,355,869 B1 | 3/2002 | Mitton | |
| 6,459,029 B2 | 10/2002 | Uehara | |
| 6,727,418 B2 | 4/2004 | Matsumoto | |
| 7,096,186 B2 | 8/2006 | Funaki | |
| 7,129,407 B2 | 10/2006 | Hiratsuka et al. | |
| 7,145,068 B2 | 12/2006 | Mizuno | |
| 7,199,298 B2 | 4/2007 | Funaki | |
| 7,268,286 B2 | 9/2007 | Carpenter | |
| 7,332,664 B2 | 2/2008 | Yung | |
| 2006/0065100 A1 * | 3/2006 | Funaki | 84/471 R |
| 2007/0039450 A1 | 2/2007 | Ohshima et al. | |
| 2007/0084330 A1 | 4/2007 | Okuyama | |
| 2008/0254824 A1 * | 10/2008 | Moraes | 455/556.1 |

* cited by examiner

Primary Examiner — Jianchun Qin
(74) Attorney, Agent, or Firm — Speed Law Firm

(57) ABSTRACT

A method and apparatus for displaying a sheet of music, which may include providing an image of the sheet of music on an electronic storage media; transmitting the image from the electronic storage media into a system processor; showing the image on a display; and electronically scrolling lines of the music image as a musician plays each line on an instrument. Optionally, the apparatus may include a storage media into which a music sheet is scanned to form an image; a system processor for storing and processing the image from the storage media; and an electronic display for displaying the image while the musician plays the music from the image.

20 Claims, 13 Drawing Sheets

Note: There is a Figure 6 in every Scan Line -1-88- in the MUSIC TRAINING SYSTEM

Pulse to Symbol Converter

| From Figure 5 Line No. | Name of Note | Pulse Length Shown in milliseconds | Number of Time Markers Counted during each note pulse | Musical Symbol for each type Note | Sensor/ Translator Outpulser |
|---|---|---|---|---|---|
| 1 | Staccaio | | One Time Mark | ♩ | to Figure 7 |
| 2 | Eighth (Two notes played in Quarter note Space) | | Two Time Marks in Quarter note space | ♫ | |
| 3 | Quarter Note | | Two Time Marks | ♩ | |
| 4 | Quarter note/dot | | Three Time Marks | ♩. | |
| 5 | Half Note | | Four Time Marks | ♩ | |
| 6 | Half Note /dot | | Six Time Marks | ♩. | |
| 7 | Whole Note | | Eight Time Marks | o | |
| 8 | Tied Notes (Two notes on same line or space) | | Total value of both notes Note: All notes held Longer than a whole note are counted as Tied Notes | T | |
| 9 | Fermatta | | 2X normal note value | ⌒ | to Figure 7 |

FIG. 6B

MUSIC TRAINING SYSTEM

BACKGROUND OF THE INVENTION

1. Field of the Invention

The invention relates to using piano training as typical of the music teaching industry to disclose new concepts, technology and methods of training musicians. It teaches advances in the state of the art by capturing and processing musical notes in a manner to display an image of the music sheets on a flat screen computer monitor and automatically scrolling the lines of music as the musician plays thereby eliminating the need for musicians to interrupt playing to turn pages of music sheets. Further it eliminates the need for physical music sheets and song books. Further, it relates to the means of storing a "first playing" of music or training instructions, storing those notes in one side of a comparator, processing a "second playing" of the same music and storing those notes in an identical second side of the comparator in a manner enabling a note-by-note comparison of the second playing with the first. The comparison data is used to formulate analyses enabling music teachers to compare trainee practice results with known standards of instruction and practice thus precisely quantifying trainee skill levels, rates of progress and specific training needs. Further, the disclosure teaches a new concept of utilizing electronically generated 'benchmarks' for both music trainees and professionals to test themselves against other musicians having a higher degree of music skills than their own.

2. Description of the Related Art

Creating and playing music has evolved over thousands of years. Someone in the distant past learned that a tightly strung sinew would make a pleasant sound if stretched and suddenly released. A few thousand years later the string was tensioned on a bow and used for hunting, making fires etc. Man later learned that a musical sound could be produced if the string were to be vibrated by rubbing a stick across the bowstring - - - the violin was born. Man later learned that changing the tension on the bowstring could change the sound of the tone. This process continued as man made advances in knowledge of the physics, mathematics and mechanics of constructing music instruments. There is now a variety of excellent music producing instruments having distinctly different sounds.

In a parallel development, a unique language evolved as composers of music began using signs, symbols and lines to teach people to play specific notes in predetermined sequences to make music. This musical 'language' was formalized and later evolved into the paper sheet music and song books that we know today. Man later learned that changing tension on the bowstring could change the sound of the tone. As more centuries passed, man learned to produce different sounds by varying 'string' lengths and 'string' materials to produce variations of the sounds Man also learned to make different sounds by blowing his breath through tubes. He then learned to vary the tube lengths to change the tone. He then learned to bore holes of different sizes in the tubes to produce varying sounds by opening and closing combinations of the holes together - - - harmonics - - - the flute was born. This process continued as man made advances in the knowledge of the physics, mathematics and mechanics of constructing music instruments. There is now a variety of excellent music producing instruments having distinctly different sounds. Thousands of years passed as man slowly separated the hunting bowstring and the music producing bow by constructing musical instruments using strings of different diameters. As more centuries passed, man learned to produce different sounds using different string lengths and 'string' materials to produce variations of sound.

The method of teaching and practicing music has not kept pace with the advances in music instrument technology. Teaching people to play music has changed little since the first father used endless repetition as a means of teaching his child how to produce music and that child taught his son and daughter and she taught - - - - etc. Training by constant repetition has been passed down virtually unchanged from ancient times, through many generations, and is still the basic training method used today.

Music played at the piano varies in quality from that produced by a beginner to an average piano player to a world-class concert pianist with many levels of musical competence between those degrees. Progressing up the scale from beginner to producing concert quality music requires three factors:

The first is that some gifted people are born with natural talent. We see evidence of innate talent in many functions of our society—sports, music, art, science, leadership etc. The inborn talent of the individual will determine the quality of his/her work provided it is accompanied by two other attributes:

The first of these, regardless of innate talent level, requires a determination to excel and the willingness to practice, practice, practice, practice and a dedicated determination to improve. A musician who has reached world-class status demonstrated natural talent, a determination to excel and has completed years of dedicated practice.

However, at the professional and competitive level there is a third factor that affects the climb toward perfection. That factor is the ability to overcome stress created by an intense desire to achieve perfection. Regardless of talent and dedication, stress will materially affect the performance of the artist. One of the several objectives of the present invention is to reduce some of the sources of that pressure.

To appreciate the effect of mental and physical stress on the quality of music produced by a piano artist we must understand what a musician does and how he/she does it. Piano music is a combination of tones, timing, tempo and harmonics produced by striking a number of keys in a predetermined order. These keys operate to strike wires inside the piano. The wires are of the proper circumference and are under the exact tension required to cause each wire to vibrate at a precise frequency.

The musician plays by following a series of instructions written by the composer in the signs and codes of the music industry. A rough count of sheet music shows approximately fifty different signs and symbols that are instructions from the composer telling the musician how to follow his/her 'road map' and the 'road signs' to produce the music as he/she wrote it. This 'roadmap' controls keystrokes, 'slower-faster, louder, softer, note combinations, note length, tempo, etc. In addition, while following the road map on the music sheet, the musician must have memorized the location of each of the eighty-eight piano keys arrayed in eight octaves. He/she must make the decision as to what key, or keys to strike with each of ten fingers operating independently and, without looking at the keys, strike various combinations of the eighty-eight keys with constantly varying tempo and force.

At the same time, the musician also must blend the harmonics by controlling the time interval that each of the various combinations (frequencies) exist. This time interval is a factor of the string vibration time that is varied by the musician holding the key down for a shorter or longer interval and/or by the operation of a foot pedal. The musician also must control the amplitude of each note by varying the force with which each key is struck.

Using and controlling the above-mentioned variables while playing, requires the musician to work at tremendous speed—under time pressure—while simultaneously using his/her brain, eyes and ears, to control the fingers, both hands and one foot to work as if they were independent of each other. All this must be done in a coordinated activity requiring split second alterations of these physical movements while using the eyes and brain to comprehend and react to about fifty different instructions on the music sheet. While all the above is progressing at very high speeds the musician must break concentration to turn a page of the music sheet! This break in concentration has, in varying degrees, an adverse effect on the quality of the music played because the distraction results in some degree of mental and physical stress. Some performances require both hands throughout the playing and it is often necessary to have a second musician read the music as it is played and turn the pages at the appropriate time.

At the top of the musical talent and skill hierarchy there is virtually no room for error—any error—however, no human is completely immune to pressure, frustration, distractions or even mental lapse due to fatigue even at the highest talent levels. It is well known that talented, highly skilled people in art, music, sports, and other artistic endeavors must practice continuously to overcome external factors that hinder peak performances. With the present methods of music training, students, professionals, and music teachers are required to practice a piece again and again and again and again and again with no specific 'feedback'. Practice sessions become boring and the musician may be unknowingly repeating the same mistakes every time the piece is played. The most naturally talented persons at the top of artistic or sports disciplines must practice or their brain and their body will not work together. The brain will tell the musician, the artist, the painter, the athlete etc. that the music will be flawless, the ball will go through the hoop, into the cup or over the net, the oil painting will be perfect but, without constant practice, the hands and feet will not produce what the brain wants them to do. Only intense, regular practice keeps the brain and the physical body in synchronization.

In this regard, music training and practice is different and more mentally difficult than many other disciplines. The sports figure can compete against the best in his/her field and know instantly when 'the edge' is gone and what mistakes were made because the result is apparent and the feedback is instantaneous. The oil painting artist has time to view the product and make modifications until satisfied with the result. The musician, however, is producing a transient product that cannot be modified. When the music stops, the product is recorded or gone. The present state of the art requires that he/she 'train' (practice) against the Old Masters and other top performers by listening to their music as a standard and audibly comparing it with their present work. The present state of the art requires that musicians have only their ears and their memory to tell them where they left the composer's 'roadmap' or precisely what caused the different musical result. The musician can often hear and recognize the difference, but the specific keystroke or timing variation from the 'road map' that created the error may, or may not be apparent. In any event, the musician is practicing against "the best" with only his/her ears to determine whether the practice session was an improvement or a deviation from the intended result. Few people can be totally objective when judging their own work in this manner. This often results in the artist repeatedly making the same variations from the music sheet each time they perform or practice.

With the present state of the art, training problems become progressively more intense the further one goes down the musical skill hierarchy. Lesser skilled musicians are more dependent on an instructor. However the instructor has only his/her ear to tell when a musical error is made during practice. In addition, repetitive practice is painfully boring to younger people. It is difficult when the student is practicing in the presence of an instructor and is very inefficient (occasionally worthless) when the student is practicing alone.

The present disclosure provides technology to eliminate the stressful distraction of turning pages of music sheets while playing. It also provides a new approach to music training and practicing for all levels of talent, competence and desire to excel. In addition it teaches the technology to apply these principles to a wide variety of music instruments including both stringed and wind instruments. Most importantly, this invention provides a means of combining the skill and dedication of music teachers with technical innovations to take the art of teaching music to new levels of effectiveness. Playing the piano music has the complexity and variable operations to require a comprehensive description of the invention. However, advances in the state of the art taught in this disclosure have application to music training for a variety of other instruments and commercial applications such as frequency measurement devices and piano tuning equipment. These applications will become apparent as the disclosure progresses.

SUMMARY OF THE INVENTION

An embodiment of this disclosure teaches a method of capturing the many harmonics as piano music is played (or inserted into the system via digital or analog recordings) and using the technical and mathematical aspects of the musical note scale to produce a MUSIC TRAINING SYSTEM™. In the present invention means are provided to identify and record every keystroke made while playing a piece of music including how long the musician held the key down to produce each type note. The harmonics of the music are captured from the air, filtered, separated, amplified and the fundamental frequency of each key is converted to digital format. These digital pulses are associated with each note producing key to identify every key on the piano keyboard. The digital pulses are used to control circuitry to produce a musical record of keystrokes, holding time and the order in which the notes were played. These data are stored and used as a pattern to enable note-by-note comparisons with a second playing of the same music. The system will accept and process input from digital or analog recordings as if they emanated directly from a piano. This enables the instructor or an accomplished musician to insert discs containing music of known quality as a 'standard' for the trainee to compete against. The music teacher can also record fingering and other manual skill routines that apply to individual music trainees to improve their skills and check the printout to verify the result.

A second embodiment discloses circuitry to enable a 'first playing' produced by a teacher or a professional musician to be used as a pattern for comparing the keystrokes, sequence and the notes played in a 'second playing' session with the corresponding keystrokes, sequence and notes of the first playing and downloading the result to a disc or printer for comparison and analysis.

The hardcopy printouts of the comparison data enable the skilled musician, the student and the music teacher to assess their strengths and weaknesses in detailed and measurable terms. The comparisons are provided in the form of print outs for each training session as feedback to enable the student; the teacher and the professional musician to determine, note-by-note, how closely the second playing adhered to the pattern instructions or the music sheet 'road map'. Through use of the matching printout and other analysis programs, the feedback can be as detailed and specific as desired. This enables the teacher to determine the skill level, rate of improvement and the specific cause of any deviations. When used in schools, the MUSIC TRAINING SYSTEM™ enables the music teacher to make objective, and accurate grading decisions in much less time and to give the trainee visual information concerning each deviation from the composer's music sheet.

In a third embodiment, the invention discloses a method of eliminating the need for musicians to interrupt playing to turn the pages of the music sheet or song book. The disclosure advances the state of the art by teaching an innovative method of using recently improved digital scanning technology to transport pictures of the music sheets to a processor that copies and adjusts image of the music sheet to fit a flat screen monitor similar to a laptop computer and integrating those images into operational functions. This creates a new market for music teaching discs, recorded training and practice routines and eliminates the use of paper music sheets or song books while playing.

In a fourth embodiment means are provided to adjust the Grand Staff lines of the music sheet image to the eye level of the musician. Further means are provided to scroll the Grand Staff Lines of the music sheet image upward into the preselected eye level of the trainee as the music is played. The invention further provides means for the musician to coordinate the speed of scrolling with the tempo of the music to be played.

In a fifth embodiment, the disclosure teaches a means of providing music teachers and musicians the capability of 'benchmarking' the percentage of keystrokes made during a second playing that exactly match the pattern produced by the professional musician or the music teacher during the first "pattern playing". In a practice mode the teacher will set the 'match' objectives at a low range for beginners and to a higher percentage for more skilled musicians. The system is designed to inhibit scrolling the music sheet unless the preset percent of matching keystrokes is met by the trainee while playing any of the several Grand Staff lines of music in a second playing. As progress is made by the trainee, the percentage of matching keystrokes required to scroll the 'road map' can be progressively raised by the instructor as the student becomes more proficient. Hardcopy analysis of the percent 'matching keystrokes' produced during the playing of the second piece provides detailed analysis feedback for critique and instruction. A "Restart Counter" is provided to let the teacher know how many times a trainee did not meet the objective and had to restart the system and begin the play again from the beginning.

This methodology reduces boredom for the trainee and enables teachers to quantify progress as practice continues and relate the differences to formulate training needs for the individual trainee and to grades progress.

In a sixth embodiment, recently developed high density, small, monitor screens, coupled with the sharp reduction of digital component size made it possible to install the Music Training System™ technology in a small, battery operated, case containing the monitor screen such as used on IPODS etc. This small unit can be scrolled horizontally if desired and can be effectively attached to hand held music instruments to eliminate music sheet page turning and provide the comparison practice and 'benchmarking' advantages for musicians playing hand-held instruments.

In a seventh embodiment the Music Training System™ can be used to detect 'out of tune' keys on a piano by using the 'second play vs. the 'first play' comparison capability of the Music System. A 'training disc' recording of keys that are precisely tuned to their fundamental frequencies, and having the keys struck in a sequential series, one through eighty eight, can be inserted into the Music Training System™ as a 'pattern' and 'saved' in the 'first play' registers of FIG. 7. A 'second play' series of keystrokes in the same sequence is played on the piano and 'saved into the 'second play registers. These are compared in the manner described in the disclosure and stored in the analysis section of FIG. 8. Programs can be written to 'print-out' the data of FIG. 8 to detect systemic tuning errors by comparing and identifying the keys that are recorded as errors. This analysis can determine whether the frequency deviation is 'higher- or lower' than the proper fundamental frequency.

These and other objectives and advantages of the present invention will be apparent from the claims and from the narrative descriptions and drawings of the invention of this disclosure.

BRIEF DESCRIPTION OF THE DRAWINGS

So that the manner in which the above-recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is described more fully in the detailed description of the disclosure as each of the individual FIGS. (3 through 10) are disclosed and explained.

FIG. 3 depicts the means of processing the fundamental frequencies of each of the twelve keys in each of the eight octaves through series-tuned filters to identify the precise frequency of each of the twelve notes played within the octave, and associating the note with the key that produced it. These figures also depict the means of converting the pure analog notes through analog to digital converters to derive square-wave digital pulses with consistent amplitudes while maintaining the identification of the piano key that produced the analog note. These square-wave notes exist only as long as the musician holds the note-producing key down. These data are transmitted to FIG. 4 for further processing.

FIG. 4 introduces a concept of identifying, processing and transmitting random, simultaneous or serially produced data that originates from multiple sources that must be identified at the receiving end of the circuits and associating the data with the point of origin. The descriptive name for this process is, "The Scan Line Highway"™. It is described in the detail description of FIG. 4.

FIG. 4 also contains a schematic of the means of precisely measuring the holding time of the digital pulses of FIG. 3. The striking and release of the note producing key is precisely timed by means of the system clock that converts these on-off operations of the key into a discrete number of precision clock pulses. These clock pulses are transmitted only while the musician held the note-producing key down to produce a specific note. This timing is used in the system to identify the type note played by the musician.

FIG. 4 also contains a scanner, column 2, (16) that detects the presence of a note, counts the notes by keyboard position and transmits the count and the 'high' representing the presence of the note directly to the system processor of FIG. 7A to initiate various operational functions. FIG. 4 is also the beginning of the 'Scan Line Highway' FIG. 1, (7) to be described later. There is one of FIGS. 3 through 7 inserted in a series configuration in every lane (1-88) of the 'Scan Line Highway'.

FIG. 6 B: This is an information drawing showing the correlation between the name of the note played, (column 2) the holding time for that note in terms of pulses of discrete widths, (column 3) the number of precision clock pulses that pass through the FIG. 4 gate during the time the pulse existed, (column 4) and the music sheet symbol representing the note played, (column 5). The column 5 note symbol can be reconstructed as disclosed on FIG. 6A. While not required for the analysis process, seeing the literal note symbols involved will make the analysis more meaningful to both trainees and music teachers.

FIG. 7 is a depiction of a section of the system processor containing a Matrix created from the intersection of the eighty eight horizontal registers with the vertical measure lines that correspond to the measure lines of the music sheet.

Figure 7:
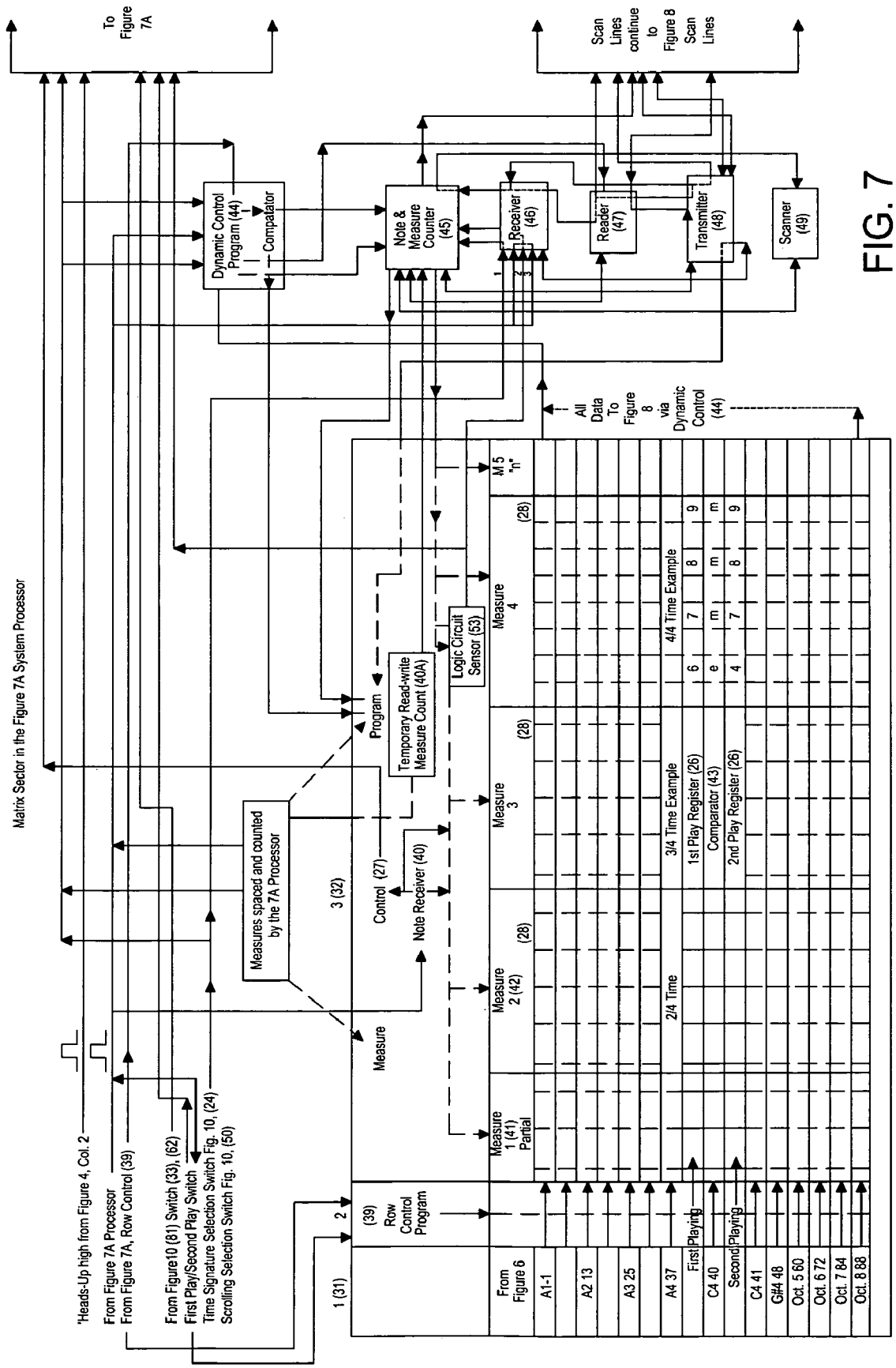
FIGS. 7, 7A and 8: These figures could be disclosed as one figure. However, to simplify the disclosure process FIGS. 7 and 7A disclose the internal functions within the system processor and FIG. 8 discloses the external function and means of collating data and making it available for programmers to write analysis programs.

The FIG. 7 segment of the horizontal circuitry lanes of the 'scan line highway' contain paired digit registers separated by a comparator common to both registers. One register stores digits derived from a 'first playing' that is used as a 'pattern' or standard. The other register stores digits derived from a 'second playing by the trainee or a practicing skilled musician to use for comparison and musical skill evaluations. These two 'mirrored' registers enable a note-by-note comparison of every note in the second playing with the corresponding note of the first playing. The comparator is designed to monitor the active registers and, if the corresponding register slots contain the same numeral, it will insert the letter "M" into the corresponding slot in the comparator. If the two numbers are not the same, the comparator will insert the letter "E" in the corresponding slot in the comparator. This process is further explained and extended in the "Detailed Description" of the system.

Figure 7A:
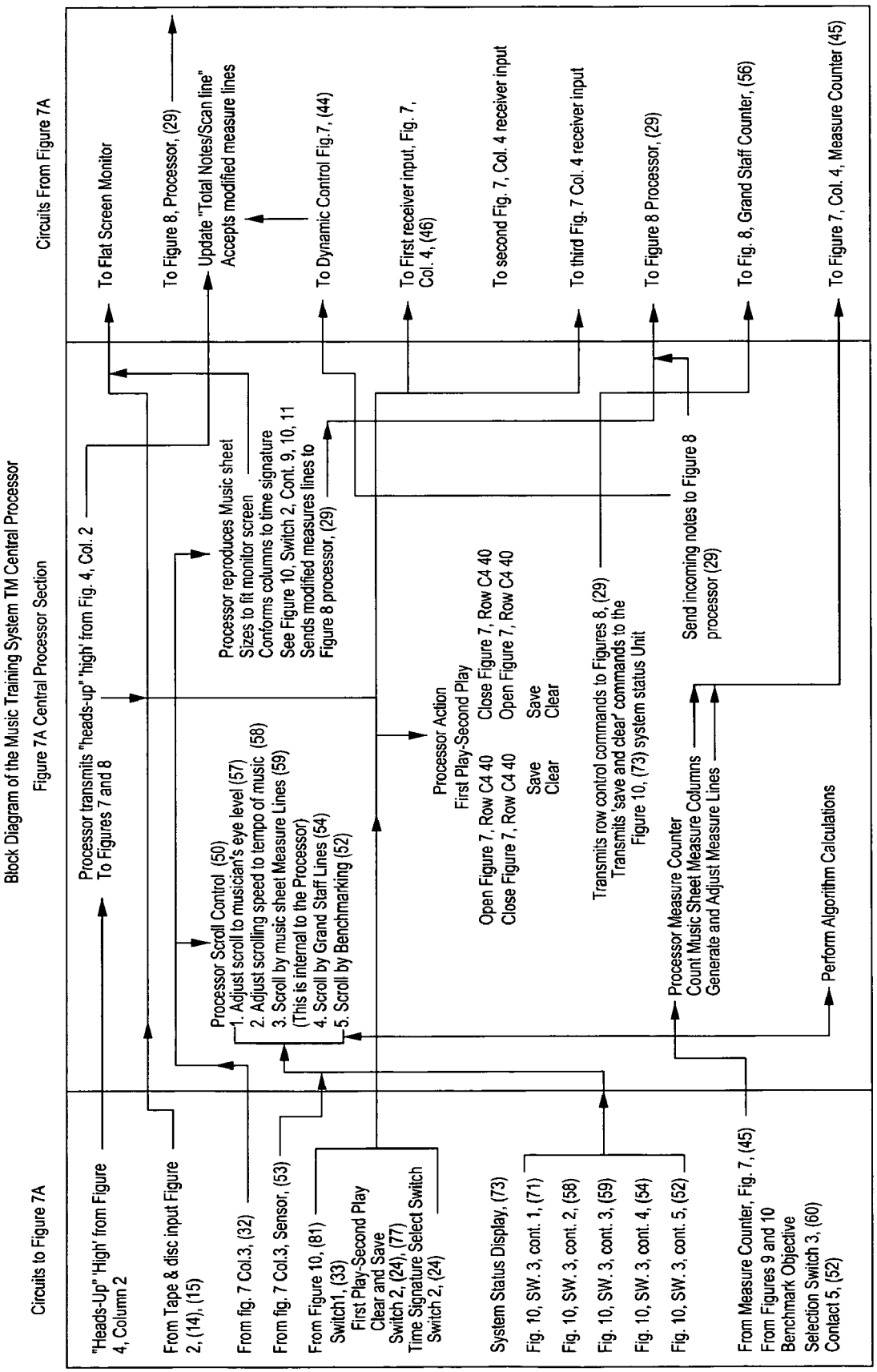

FIG. 7A is a block diagram of internal portions of the system processor showing the connections to the external operating components.

Figure 8:
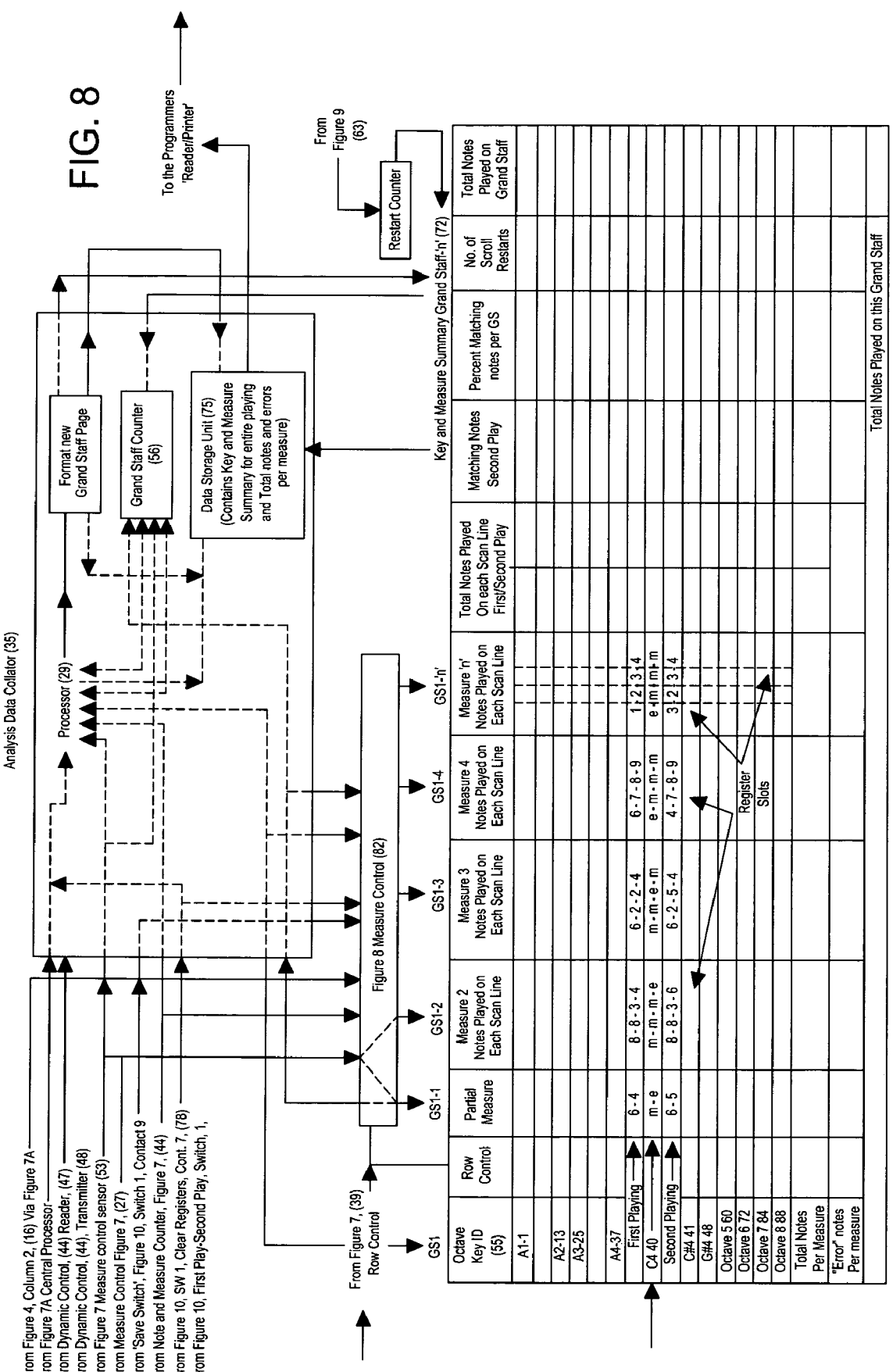

FIG. 8 is the Analysis Data Collator that discloses the end result of the FIGS. 7 and 7A internal operation and records it in a format conducive to detailed analysis of the result of the second playing compared with the first—i.e. (Pattern). This is accomplished by means of the Dynamic Control Program (44) of FIG. 7 interacting with the Measure Control Program of FIG. 7 column three (32). In this regard, the FIG. 8 Analysis Data Collator, is an 'assembly point' to provide read-write access to the data to be used in the various analyses to compare the second playing of a piece of music with the first.

The "Key ID" column of FIG. 8 (55) is a modified format of the "scan Line highway". It is used to record every note played on every key, separated by octaves for each piece of music played. The Measure Columns of FIG. 8 are virtual duplicates of the register-comparator-register configuration of the FIG. 7 matrix in a different format. This format positions the 'Pattern' playing with the 'Practice' playing in a manner that facilitates comparison and analysis of the result of the two 'playings'. The 'Key and Measure Summary' (72) collates current data.

Figure 9:
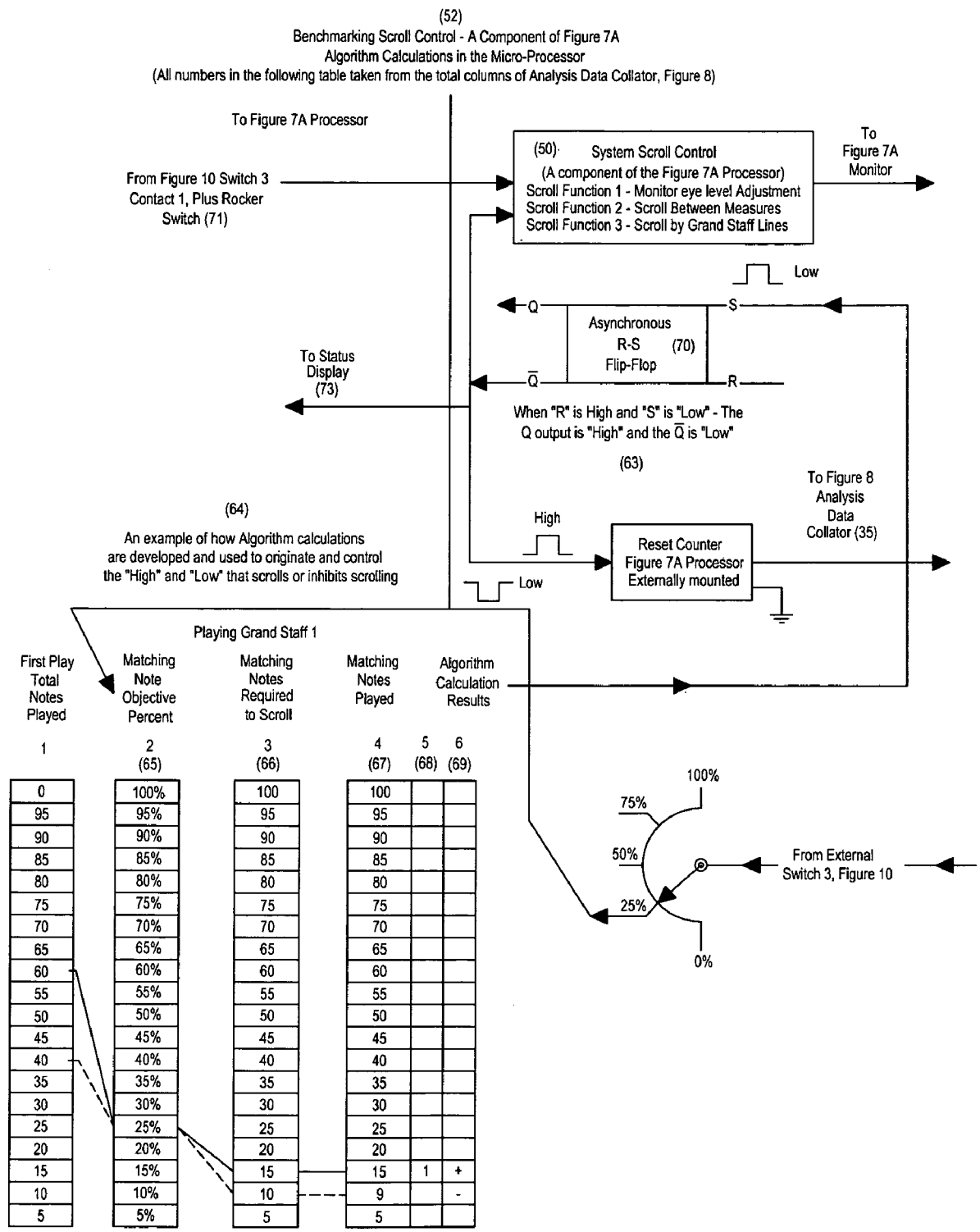

FIG. 9: This figure is an internal part of the FIG. 7A processor with the exception of the external mechanical switch of FIG. 10, (60). FIG. 9 is a part of the disclosure of the 'Benchmarking' training system. It contains external components in the form of 'switches' that control or 'set' circuits internal to the processor of FIG. 7A to 'trigger' or control the "Benchmarking" operation of the MUSIC TRAINING SYSTEM™. The external controls enable the musician to set the parameters of the first or the second playing and operate other system controls. The components internal to FIG. 7A disclose a method of disabling the monitor scrolling action when a predetermined number of second-play notes do not 'match' the corresponding notes of the first-play pattern.

Figure 10:
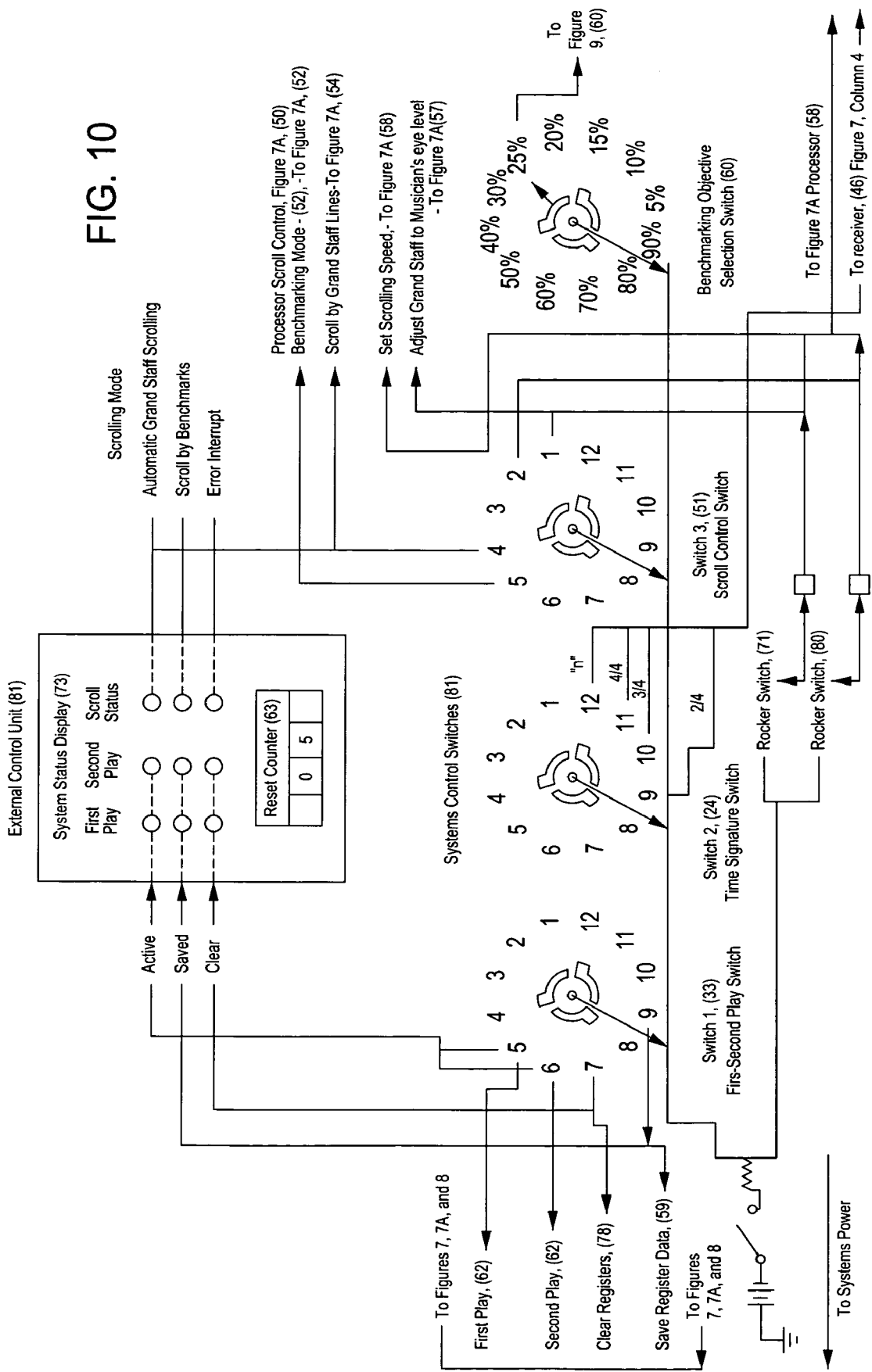

FIG. 10: This figure discloses the system control panel that provides the musician the means of controlling the various actions and 'settings' necessary to operate the MUSIC TRAINING SYSTEM™. The system control panel provides a Status Display (73) that provides visual information regarding operational settings. The primary controls shown on disclosure drawing FIG. 10 (81) are shown as mechanical switches because the connections on a mechanical switch can be more readily shown. Production models will use an LED or similar keypad for this function. Also provided on FIG. 10 is a depiction of a rotary switch, (60) that controls internal circuitry that 'sets' the objective percentage of notes the musician must play when the system is in the Benchmark mode.

DETAILED DESCRIPTION

This disclosure applies to innovative methods of teaching people to play music and to remove a number of currently necessary impediments to music teaching and playing. Because of the complexity involved in playing the piano it is used in this disclosure. However, the invention applies to music produced by a variety of music instruments i.e. stringed, wind, vibrating reed etc.

The invention makes use of the physics of sound, the greatly increased operating speed of recent vintage solid-state electronic circuitry and vastly reduced solid-state component size, cost and power consumption to create the MUSIC TRAINING SYSTEM™.

This disclosure teaches methods of capturing musical notes from the air, filtering and purifying the harmonics to isolate the fundamental frequency of each individual note, converting the analog frequencies to digital format and a means of precisely measuring the "real time" duration of each note while maintaining the precise identification of the keys that produced the notes. These data are converted into a literal number representing the original note symbol and are then inserted into a three-section comparator consisting of two digit registers separated by comparator. This innovation enables a note by note comparison between notes played during a second playing with those played in a first playing. FIG. 6A discloses an option of converting the note number into the literal note symbol that the musician 'read' when the note was being played. This is done to enhance the utility of the analysis process for trainees. FIG. 6B explains the relationship between the various stages of that process. Circuitry is provided to create a system of 'saving' a first playing of a piece of music to be used as a standard for comparison with a later playing of the same music from the same 'sheet of music'. This results in a hard copy, note-by-note comparison that makes available the data for producing a variety of computer analyses for comparison and training functions.

The disclosure also teaches a unique system of scanning a picture of the sheet music, or a music teacher's instructions and finger dexterity training exercises to a disc, inserting it into the MUSIC TRAINING SYSTEM™ processor and displaying it on a flat screen computer monitor. The processor automatically 'scrolls' the music sheet as the music is played. This eliminates the need for the musician to stop playing to physically turn the pages of a music sheet or song book. The disclosure also teaches methods of 'benchmarking' the music training progress and a means of quantifying the skill level of a musician compared with a standard. There are other innovations that create a 'computer age' method of teaching and practicing music.

Of the various types of music instruments, the piano and the organ involve the greatest number of variables. Piano musicians simultaneously play up to ten or more of eighty eight piano keys—each key capable of producing one of nine musical notes—played in hundreds of constantly changing combinations and sequences with each note having varying holding times. For that reason the piano will be used as the model for disclosing the concepts of the MUSIC TRAINING SYSTEM™. However, the principles taught are applicable to other music instruments and commercial applications.

The sheet music for the pattern is copied onto a digital disc, loaded into the system at figure two, (14) and appears on a flat screen monitor for pianos and other music instruments. The musician has the option of automatic scrolling as the music is played or setting a threshold commensurate with his/her skill level to use as an objective for the percentage of his/her keystrokes that match those made by the music teacher or the professional that produced the 'test pattern. If the preset percentage of notes played during the practice session does not match those of the pattern the system will not scroll the monitor. The trainee also sets external controls for the time signature shown on the music sheet, i.e. 2/4, 3/4 or 4/4, - - - "n" and sets another external control to the "second play" mode. Provision is made to use the time signatures of the music sheet to place the notes of both playing sessions into the proper measure and comparator registers.

As the musician begins to play, each note is converted into digital format, processed through the system and the numbers representing specific notes for the 'first play' are stored ('saved') in the 'first-play' digit register. The same operation uses the 'second-play' registers for the second playing. FIGS. 7, 7A, and 10 disclose the means of using external switches (FIG. 10) to control programming in FIGS. 7 and 7A to change from first to second play status. FIG. 6A discloses how the numbers that represent notes can be used to reconstruct the note symbol to make comparison and error analysis more realistic for the trainee. The first-play 'pattern' piece is stored in a digit register that comprises one side of a comparator. The second-play, or 'practice' session is similarly stored in a second register that comprises the second side of the comparator. The digit slots in the three components are all 'matching' slots. Slot one (1) in both registers is exactly the same as slot one (1) in the comparator as are all other slots. Slot two (2) and subsequent slots, all have a 'matching comparator slots etc. The analog notes are converted into a discrete number representing each type note as the musician plays the music. The numbers that represent specific notes are transmitted into the register slots in the same order as the musician played the notes. This is done by identifying the key that produced the note, identifying the literal 'music sheet' note by a specific number, inserting these data into a register row that is one side of the comparator embedded in one of a number of columns representing the music sheet measures. (See FIG. 7)

The concepts used to accomplish measuring the duration time of notes (figures three through six) can also be used to measure and compare the note amplitudes as instructed by music sheet 'road map' symbols such as the dynamic instructions for playing louder, softer etc. These amplitude measurements can be digitized and processed through this system by using the same, previously described processes using parallel paths. Numbers are applied to the amplitude levels specified by the dynamic symbols and sending the result through the system as described in the disclosure. Since the amplitude measurement functions are virtually the same as the note duration measuring and storing function, they were not shown on the schematics for the sake of clarity.

When the MUSIC TRAINING SYSTEM™ is operated in the Benchmarking mode the automatic scrolling by Grand Staff lines continues as long as the musician plays a preset number of notes that match the corresponding note in the 'first-play' register. When the musician does not achieve the preset number of matching notes, circuits in the FIG. 7A and FIG. 9 operate to stop scrolling and the musician must begin at the beginning of the music again. (See FIG. 9) A counter is provided to record the number of times the musician failed to meet the objective and had to replay the piece.

Provision is made to manually disable the comparison—matching feature of the scrolling mechanism and put the system on automatic scroll when doing a 'live' performance or producing a new pattern.

When the practicing musician completes the entire piece, every keystroke that he/she made has been stored in the 'second play' half of the comparator opposite the same keystroke positions in the first playing half of the comparator that contains the music played by the 'world class' musician or the music teacher. The comparator data enables the processor to make line-by-line records of the keys used, notes played, adherence to dynamic playing instructions, beat spacing and, if provided, the amplitude of each note for the entire playing. To be counted as a 'match' every keystroke must have been made at the same point on the music sheet, by the same key in the same octave of the piano keyboard. In addition, the musician must have held each musical note for exactly the same duration that the player of the pattern held that note at that same point. The amplitude measurements, when provided, are in a separate comparator embedded in a 'second lane' of the scan line highway. These must also 'match'. If any of these factors are not the same, a different note number, symbol or a different amplitude number will be printed in that position and counted as an error. The comparisons are downloaded into a disc that, when printed, provide the base data for a wide variety of analyses.

The Training Session: The training session is essentially the same as the practice session with the exception that the music teacher is provided the means of personally playing the 'pattern' piece or 'tailoring' fingering drills etc. to conform to the needs of an individual student. The comparison analysis sheets enable the teacher to determine the effectiveness of the training and the strengths or weaknesses of the individual student. The analysis will also tell the teacher whether any errors noted are caused by incorrectly reading the music 'road signs' or whether the student needs practice in finding and striking the correct key with the proper finger and holding the key down for the proper interval. When used in public or private schools, these "Percent Matching" figures can be reliably used as a factor for determining progress and grading purposes.

An explanation of the configuration and use of the Music Sheet "road map" when playing the piano will be helpful before beginning a detailed description of the design and operation of the MUSIC TRAINING SYSTEM™.

The music sheet 'road map' contains the composer's instructions telling the musician how the music is to be played. The instructions are written in a format called the Grand Staff that has two major divisions. There is a Treble Staff that is primarily for notes to be played by the right hand, and a Bass Staff for notes to be played by the left hand. These two segments comprise one Grand Staff line of music. Both segments contain five lines and four spaces (plus occasional use of a sixth space for the "Middle C" key (ledger line) which is normally the starting point for playing the music). The composer's note symbols are positioned on the lines or spaces of the Grand Staff to tell the musician what key to play. This will tell the musician which hand to use to play the note. The note symbol itself tells the musician how long to hold the key down—there are different note symbols for each timing (count- or 'beat') interval. The number of those (counts) varies as to the time signature specified by the composer. i.e. 2/4, 3/4, 4/4 etc.

Music is divided into measures delineated by measure lines or "beat marks". The Grand Staff lines are horizontal on the music sheet. The measure lines are vertical with the music played left to right. There are five lines and four spaces for the Treble Staff (right hand) and five lines and four spaces for the Bass Staff (left hand) for a total of eighteen lines or spaces The measure lines intersect these eighteen lines/spaces at various widths depending on the time signature (2/4, 3/4, 4/4 etc.). The system processor is programmed to automatically correlate the measure width with the number of register and comparator slots used. Therefore there are eighteen spaces for notes within each measure when the measure lines are viewed vertically across the Treble and Bass segments of the Grand Staff. Five lines and four spaces for each hand equate to eighteen lines or spaces that direct the musician which of twenty four keys to use to play the notes. (i.e. twelve keys in each of two octaves) The music sheet tells the musician which of the eight octaves to use as the music is played. However, there are eighty eight keys divided among eight octaves from which the musician could select keys at any time during the playing. (twelve keys per octave with the exception of octave eight that has four keys). Recording the key used, note played—(i.e. how long the musician held the note-producing key down), in what octave, in what measure and in what sequence relative to other active keys was made possible by the innovation of the scan line technique taught in this disclosure.

The music sheet usually has four to six (or more) measures per Grand Staff line of music. These Grand Staff lines of music are 'stacked' on the music sheet page to accommodate the physical size of the music sheet. In the traditional music system the musician plays the measures for a Grand Staff line of music from left to right up to the edge of the music sheet page, then shifts his/her eyes down to the next row of the Grand Staff, plays that row to the edge of the page and again shifts his/her eyes down to the next row and continues that process until the bottom of the page is reached, It is at that point that the musician must break concentration, momentarily stop playing with one hand and turn the page. This manual, visual 'scrolling', physical page turning requirement is eliminated in the MUSIC TRAINING SYSTEM™ and changed to an automatic vertical scrolling of the Grand Staff lines of music. This scrolling occurs from bottom of the screen toward the top, stopping at a pre-set optimum eye level for the individual musician.

Note: With minor circuit changes in FIG. 7A scroll control circuitry, (50) horizontal scrolling much like the 'crawlers' of large bill boards or at the bottom of television monitors can be provided. Musicians playing hand-held instruments (trombone, violin etc,) will use a much smaller, modified unit, using 'crawler scrolling techniques. End of Note:

The musician plays the entire piece of music with the total Grand Staff line of music at one eye level with no interruptions to turn pages. As the first note is played into the highest numbered measure column, automatic scrolling begins to move the Grand Staff line up one position of the screen at a preset speed to conform to the tempo of the music being played thereby bringing the next Grand Staff line up one level into the optimal view of the musician. (explained more fully later in the disclosure)

The complexity of detecting and recording the sequence of notes played is further reduced by innovative circuit configurations using the composer's time signature to get each note played into the correct measure in 'real time'.

An explanation of the Composer's time signature follows: The composer determined the 'time signature' for the music when it was written to inform the musician how to play the music the way the composer wanted it played. For purposes of this disclosure, the definition of a 'beat' is the time space between notes. The vertical measure lines are an important factor in playing at the proper 'beat' or tempo. Measure Lines usually divide the music into four or more roughly equal measures containing note spacing as follows:

2/4 time signature=2 beats (or counts) per measure with a quarter note getting one beat
3/4 time signature=3 beats per measure with a quarter note getting one beat
4/4 time signature=4 beats per measure with a quarter note getting one beat In this disclosure the time signature is explained in millisecond terms because of the difficulty in showing detailed system operations with relative spacing at nano/giga-second speeds.

For design purposes in this disclosure:
A 2/4 time signature measure has 2 equal parts of 500 milliseconds each.
With a 3/4 time signature a measure has 3 equal parts of 333.3 ms each
With a 4/4 time signature a measure has 4 equal parts of 250 milliseconds each.

The above arbitrary figures are used only to show the relative spacing of the measure lines to include the number of register spaces needed to accommodate one literal 'space' ahead of each of the numbers, that represent specific notes, into the registers, In actual practice, measure line spacing for different time signatures is accomplished in the computer processor that automatically adjusts the measure column width similar to adjusting the column width in a table. Scanning the music sheet into the monitor displays the duplicate of the sheet music on the system monitor screen and the processor 'sets' the vertical measure lines across the register slots to 'match' the time signature selected for that particular music sheet. The musician plays the measures as he/she sees notes on the monitor screen just as if a physical music sheet were being used. The automatic scrolling action begins when the count of notes entered into the horizontal note registers that are 'spanned' by the measure line reaches the number specified by the music sheet time signature. See FIG. 7; scan line C4 40 (28)

The above action coordinates the FIG. 7 Matrix with the FIG. 7A time signature specified for the piece of music being played and gets the incoming note symbols in the correct register slots. (explained further later)

Figure 4:
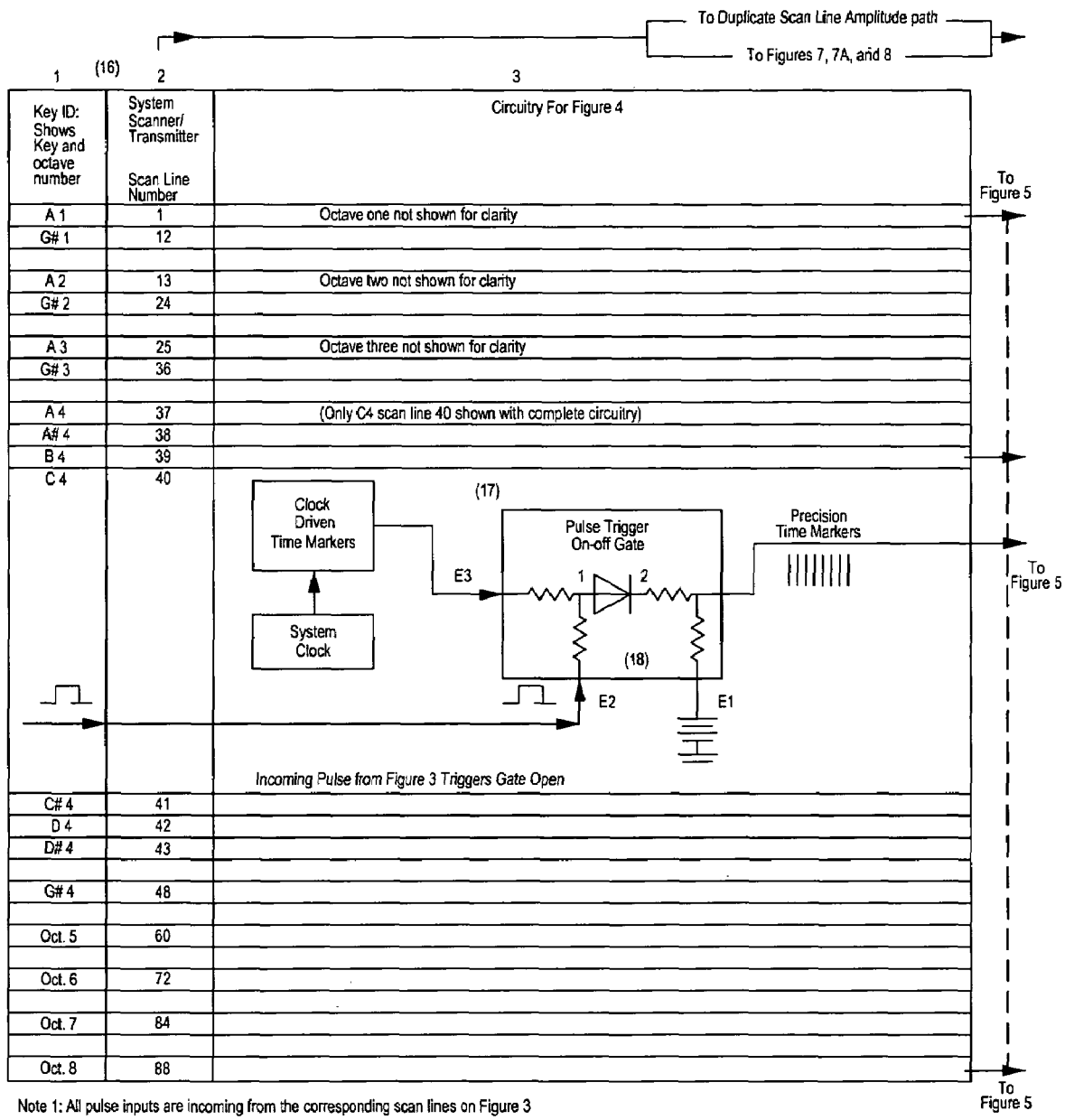
FIG. 4.

Refer briefly to FIG. 4, column 2, (16)

The keys in octave one are on scan lines 1-12 to conform to the literal position of those keys on the keyboard. The keys of octave two will be on scan lines 13-24, octave 3 keys are on lines 25-36 and so on through all eight octaves. These keys carry that scan-line identification, along with the octave and key name, throughout the system.

Figure 3:
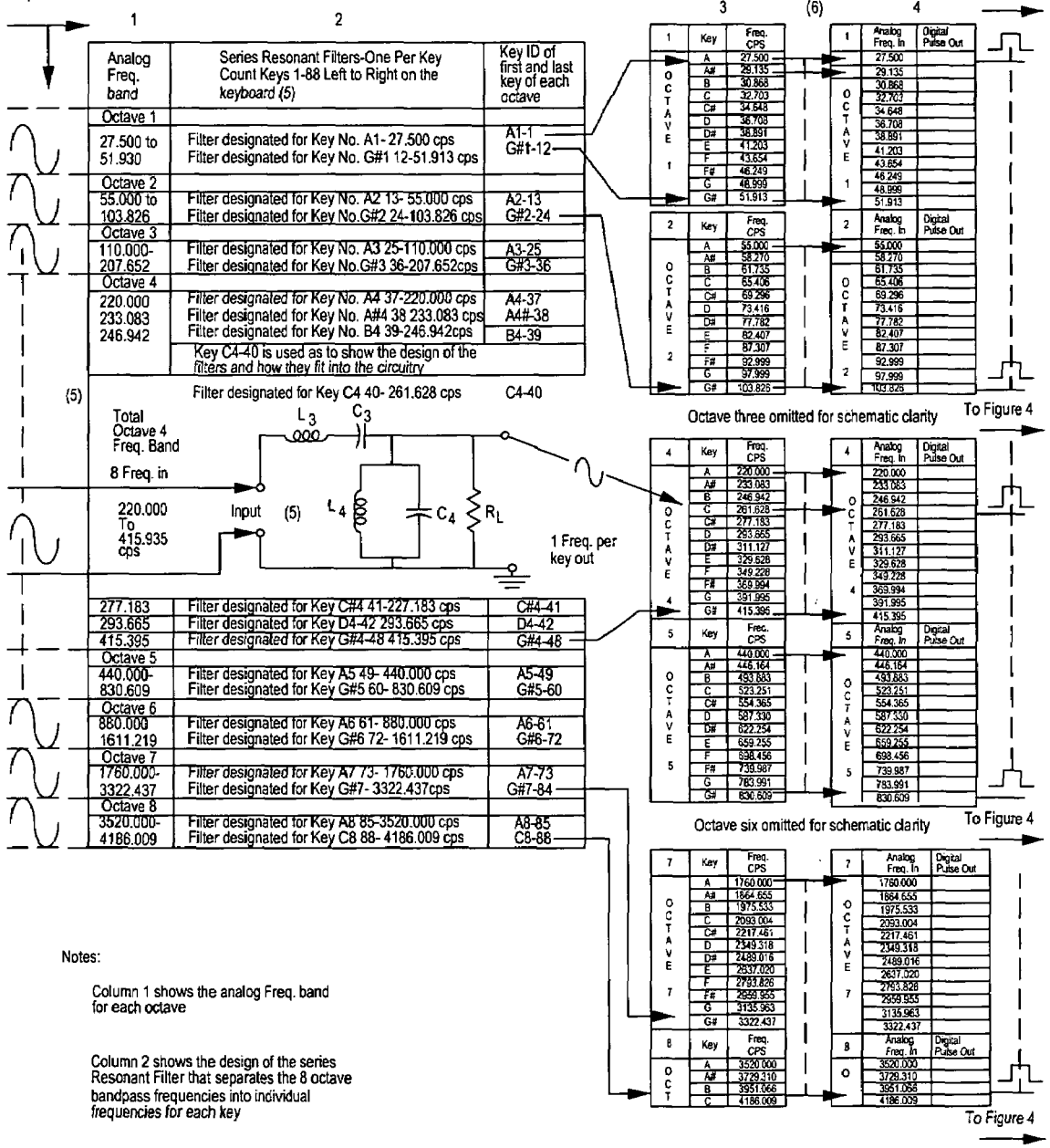
FIG. 3.

(The method of identifying specific note-producing keys is shown in detail in FIG. 3)

Refer to Block Diagram 1, (1)

There are eighty-eight keys on the standard piano keyboard. These are divided into eight octaves, seven of which contain twelve keys with the eighth containing four.

For purposes of this disclosure the keys are numbered from left to right 1-88. The low frequency side of the piano is to the left of middle 'C' which is literally key number 40 counting from the left side of the piano. Keys No. 41 through 88 comprise the high frequency side of the piano with key number 88 being the highest frequency.

Beginning with the lowest frequency (key No. 1) and progressing up the scale (toward the higher frequencies to key No. 12) these key names are:

A, A #, B, C, C #, D, D #, E, F, F #, G, G #

The letters with the pound sign (#) are called A sharp, C sharp D sharp etc. That # sign instructs the musician to play the key to the right of the sharp key when it appears on the music sheet. These same keys can also carry a 'flat' sign, "b" which tells the musician to play the key to the immediate left of the designated key. The sharp and flat designations are not a factor in the disclosure because the system uses the fundamental frequency of each key used and converts that frequency into digital protocol. The key designations for these keys are carried all the way through the key identification therefore it is not necessary to identify the "b" flat keys.

There are seven octaves with keys named A through G# and one, Octave No 8, with only four keys; A, A# B and C.

Every key has a specific alpha/numerical address on the keyboard.

For example: A1 A#1,2 B1,3 C1,4 C#1,5 D1,6 D#1,7 E1,8 F1,9 F#1,10 G1,11 G#1,12 are the keys, left to right, 1-12 that comprise octave No. 1. In the next octave up the frequency scale the keys have the same alpha identification but the numerical location position begins at A2, 13 then to A#2, 14, then B2, 15 and so forth up through G#2, 24. This progression is continued for all twelve keys in the octave. The third octave up the scale begins at A3, 25 and progresses up the scale to G#3, 36. This numbering scheme continues for octaves 4 through 7. Keys 85-88 make up the eighth octave with: A8, 85, A#8, 86 B8, 87 C8, 88. This numbering scheme makes the complete 'address' of any key available throughout the operation of the MUSIC TRAINING SYSTEM™. The key names, "A" through "G#" are the same in every octave, therefore the key name, the octave number and the scan line number identify the specific note-producing key each time it is used in the playing.

Method of identifying specific tones produced by each key:

| 1 | Name of Key | Fundamental Frequency-CPS | 2 | Name of Key | Fundamental Frequency-CPS | 3 | Name of Key | Fundamental Frequency-CPS | 4 | Name of Key | Fundamental Frequency-CPS |
|---|---|---|---|---|---|---|---|---|---|---|---|
| OCTAVE 1 | A | 27.500 | OCTAVE 2 | A | 55.000 | OCTAVE 3 | A | 110.000 | OCTAVE 4 | A | 220.000 |
| | A♯ | 29.135 | | A♯ | 58.270 | | A♯ | 116.541 | | A♯ | 233.083 |
| | B | 30.868 | | B | 61.735 | | B | 123.471 | | B | 246.942 |
| | C | 32.703 | | C | 65.406 | | C | 130.81 | | C | 261.628 |
| | C♯ | 34.648 | | C♯ | 69.296 | | C♯ | 138.591 | | C♯ | 277.183 |
| | D | 36.708 | | D | 73.416 | | D | 146.832 | | D | 293.665 |
| | D♯ | 38.891 | | D♯ | 77.782 | | D♯ | 155.563 | | D♯ | 311.127 |
| | E | 41.203 | | E | 82.407 | | E | 164.814 | | E | 329.628 |

-continued

| | | | | | | | | |
|---|---|---|---|---|---|---|---|---|
| | F | 43.654 | | F | 87.307 | | F | 174.614 | | F | 349.228 |
| | F♯ | 46.249 | | F♯ | 92.499 | | F♯ | 184.997 | | F♯ | 369.994 |
| | G | 48.999 | | G | 97.999 | | G | 195.998 | | G | 391.995 |
| | G♯ | 51.913 | | G♯ | 103.826 | | G♯ | 207.652 | | G♯ | 415.395 |

| | Name of Key | Fundamental Frequency-CPS | | Name of Key | Fundamental Frequency-CPS | | Name of Key | Fund. Frequency-CPS | | Name of Key | Fund. Frequency CPS |
|---|---|---|---|---|---|---|---|---|---|---|---|
| OCTAVE 5 | A | 440.000 | OCTAVE 6 | A | 880.000 | OCTAVE 7 | A | 1760.000 | OCTAVE 8 | A | 3520.000 |
| | A♯ | 466.164 | | A♯ | 932.328 | | A♯ | 1864.655 | | A♯ | 3729.310 |
| | B | 493.883 | | B | 987.767 | | B | 1975.533 | | B | 3951.066 |
| | C | 523.251 | | C | 1046.502 | | C | 2093.004 | | C | 4186.009 |
| | C♯ | 554.365 | | C♯ | 1108.731 | | C♯ | 2217.461 | | | |
| | D | 587.330 | | D | 1174.659 | | D | 2349.318 | | | |
| | D♯ | 622.254 | | D♯ | 1244.508 | | D♯ | 2489.016 | | | |
| | E | 659.255 | | E | 1318.510 | | E | 2637.020 | | | |
| | F | 698.456 | | F | 1396.913 | | F | 2793.826 | | | |
| | F♯ | 739.987 | | F♯ | 1479.978 | | F♯ | 2959.955 | | | |
| | G | 783.991 | | G | 1567.982 | | G | 3135.963 | | | |
| | G♯ | 830.609 | | G♯ | 1661.219 | | G♯ | 3322.437 | | | |

Note:
In piano terminology 'note' is not synonymous with 'frequency'

The fundamental frequencies for all twelve keys in seven octaves and the four keys in Octave eight have been identified and form the beginning point for designing electronic circuitry to detect record and utilize the note produced from any key on the keyboard. The musical note resulting from the musician striking a key on the keyboard is made up of the fundamental frequency for that note plus a number of harmonics that, when taken together produce a pleasant sound that we refer to as a "Musical Note". It is these 'notes' that are being discussed when referring to the number of times a musician strikes a key on the keyboard of a piano.

In audio engineering, when dealing with filtering, waveshaping, converting from analog to digital operation etc. the fundamental frequencies are most often used.

For purposes of this invention, the mention of a 'note' will refer to the musical, unfiltered note resulting from the musician striking a key on the piano keyboard unless otherwise specified in the disclosure.

The invention of the "Scan Line Highway" enabled the MUSIC TRAINING SYSTEM™ to move and process data while maintaining the precise identification of each note producing key during the multiplicity of combinations and sequences of the notes of all octaves throughout the operation. This concept, explained more fully later in the disclosure, is unique in the industry.

Figure 1:
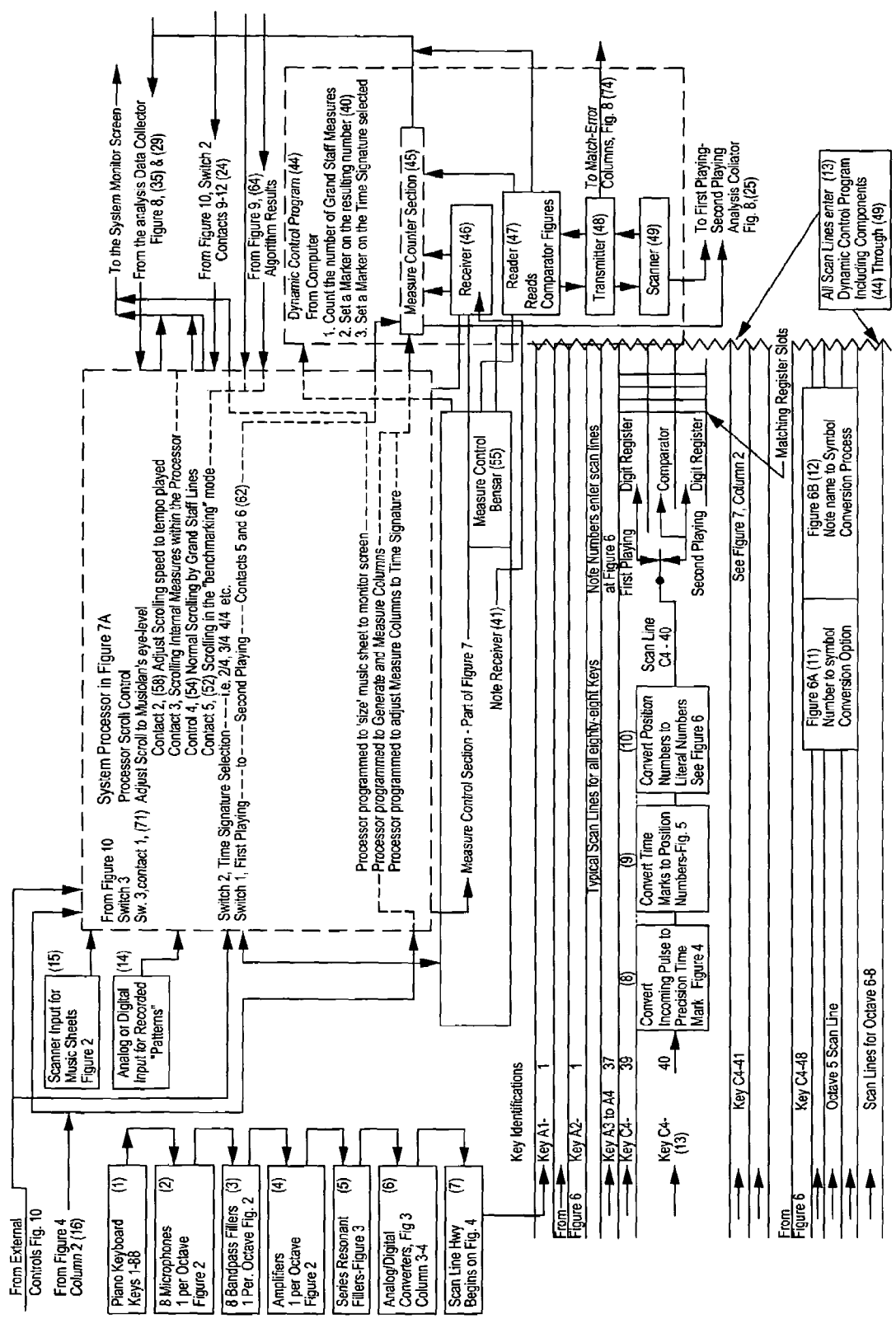
FIG. 1: - - - System Block Diagram: This figure is a block diagram of the overall MUSIC TRAINING SYSTEM™ with the exception of FIG. 8 which is a Data Analysis Collator that stores data and provides access for writing programs for training purposes. (Described individually later) The system uses tuned microphones over or near each octave (twelve keys) to capture the musical notes from a piano or other music instrument as the music is played. Precision filters separate the fundamental frequencies of the music by octaves. A second filtering stage identifies the individual note producing keys within each octave. The resulting notes are amplified to get consistent amplitude levels. The analog notes are converted to digital square waves. This is shown in block diagram form on FIG. 1, components (1) through (6). A unique circuitry and transmission path called a "Scan Line" is taught in this disclosure beginning on FIGS. 3 and continuing through 6 and indicated on FIG. 1 at components 7 through 10.

Refer to Block Diagram FIG. 1, (2)

Figure 2:
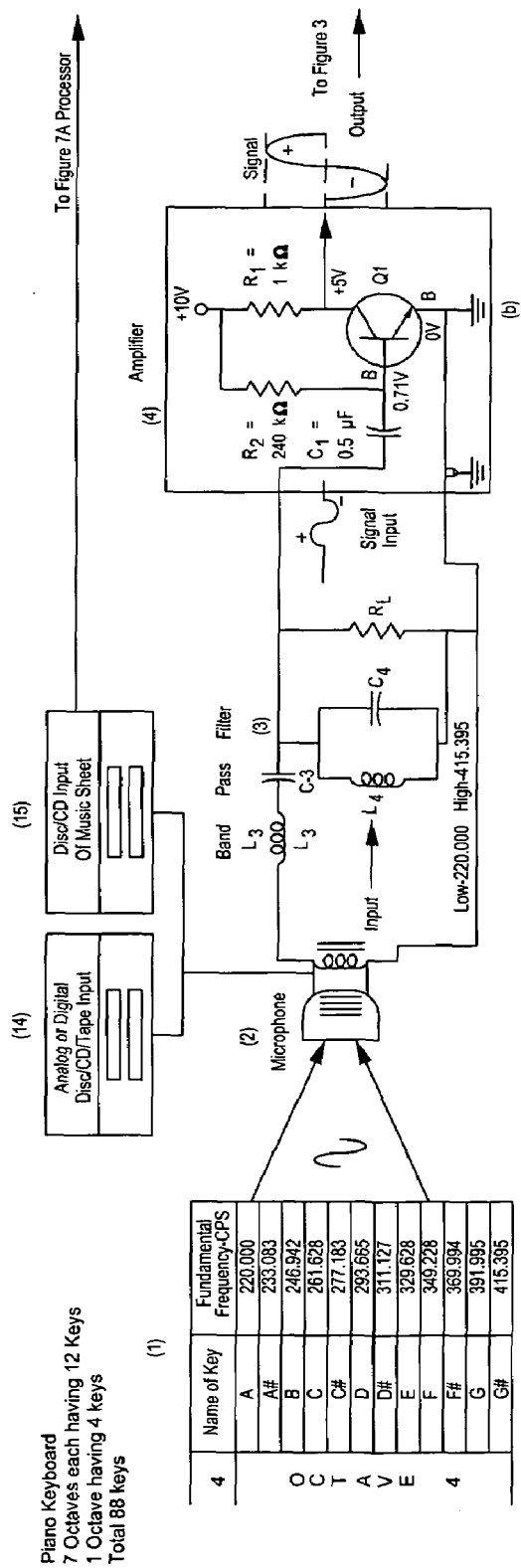
FIG. 2: Each of the eight octaves on the piano keyboard is provided a microphone designed and tuned to react only to the twelve fundamental frequencies of a specific octave. Precision series-tuned filters are used to eliminate all but the fundamental frequency of each key in each octave as the notes are produced. The fundamental frequency of each of eighty eight piano keys is a known constant throughout the music industry. Thus, associating the physical location of the key on the keyboard with the fundamental frequency of notes produced by that key provide positive identification of the source of any note produced by that key. The fundamental frequencies of the notes are amplified to a consistent level for the each of the frequencies. These precise data are passed to FIG. 3. The ports for inserting recorded analog or digital music and training routines are also shown on FIG. 2 (14), (15).
Figure 2:
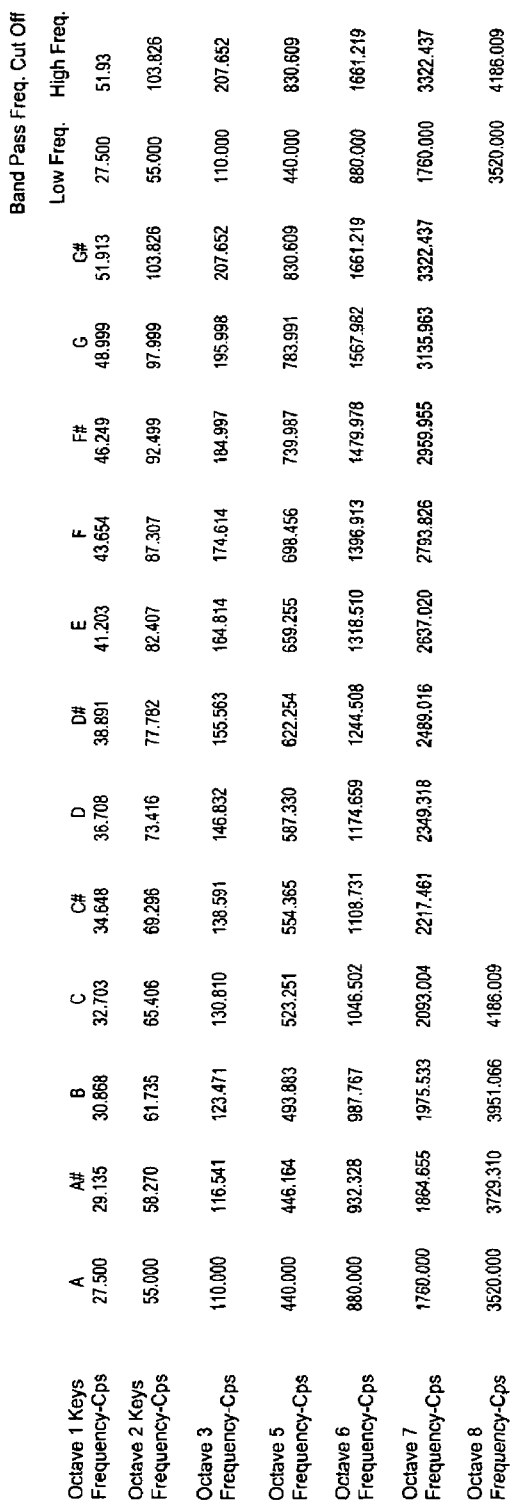

The Piano Keyboard, See Drawing FIG. 2. There are eight precision tuned microphones deployed as desired to capture the notes from the air as they are played. There is one microphone positioned over (or near) the twelve 'strings' of each of seven octaves and the four 'strings' of octave eight. Each microphone is designed to accept notes only in the frequency range of the twelve octave 'strings' it covers.

In addition to the microphones, circuitry is provided to couple the outputs of recorded analog or digital music discs into the speaker input circuit to enable analog or digital music discs to be used instead of a 'live' playing if desired. See FIG. 1 (14).

Refer to Block Diagram FIG. 1, (3)

The objective is to reduce the music to one fundamental frequency for each key by eliminating all extraneous harmonics. Block Diagram FIG. 1, (3) begins this process by passing the output of each microphone into a precision "band-pass" filter that is designed to accept the 'band' of frequencies produced from the keys in the octave it serves and to attenuate all other frequencies and ambient noise. The configuration of the band-pass filters is shown in greater detail on schematic drawing FIG. 2.

Refer to Block Diagram FIG. 1, (4)

For circuit design purposes it is necessary to have single frequency notes converted to square wave pulses with precise widths and consistent amplitudes. The quality of the MUSIC TRAINING SYSTEM™ output depends on the accuracy and consistency of these two measurements. The 'consistent amplitude' objective is accomplished by passing the frequency 'band' for each octave through amplifiers (one per octave) that amplify the fundamental frequencies of the octave to consistent levels while attenuating all frequencies outside the band for the octave it serves. This is shown in greater detail on FIG. 2. Measuring the precise widths of the pulses is done on FIG. 4. A second scan line path begins at here on FIG. 4, column 2, (16) that is the beginning of the amplitude scan line path through the system. Since amplitude measuring techniques are well known in the industry, and the operation of the amplitude scan line path is a virtual duplicate of the note path scan line, the schematics of the amplitude path are not shown to preserve schematic clarity.

Refer to Block Diagram 1, (5) Identifying specific frequencies:

While maintaining the octave grouping of the twelve keys, the individual fundamental frequencies of the outputs of each of these series-tuned frequencies are passed through analog to digital converters, (Block Diagram FIG. 5) that accept analog frequencies at the input and convert them into digital pulses at the output having virtual square wave forms and consistent amplitudes. This is shown in more detail on schematic drawing FIG. 3.

If it is desired to compare the amplitude of notes played in a second playing with the amplitude of notes played in a first playing, the design and techniques are the same as herein described with the exception that the voltage amplitude of the individual note square waves are measured and numbered at this point by wave shaping techniques well known in the industry. With the square waves measured vertically instead of horizontally, the same techniques are used as in FIGS. 3 and 4. A dual path through the system would consist of amplitude processed notes on one Scan Line path, (the "A" path) and the 'duration time' note identification on another, (the "N" path) until both paths are combined at the Keystroke Record Segment of the processor of FIGS. 7, 7A and 8

Refer to Block Diagram FIG. 1, (6):

The analog frequencies are passed through analog to digital converters to obtain a square wave that can be more readily measured as to amplitude and width, and to convert the analog notes to standard computer protocol.

Refer to Block Diagram FIG. 1, (7)

This innovation introduces a new concept of circuit design that makes possible what would otherwise be a very complex design process. This marks the beginning of the system scan line highway that provides a dual path through the system for every key on the keyboard in a manner to derive and record the amplitude and type of note played during a playing. This is a segment of schematic drawing FIG. 7 that contains the paired digit registers and the comparator that divides them. This segment also shows the arrangement of the Measure Markers and the means of using them to get played notes into the desired registers. This resulted in using the time signature to determine the number of register slots required in each measure. The "Scan Line Highway" is an adaptation of the Lines and Spaces of the music sheet Grand Staff that the musician uses to determine what note to play. The operation of the 'scan line highway is described fully in circuit drawing FIGS. 4, 7, 7A and 8.

Refer to Block Diagram FIG. 1, (8):

This block diagram shows where the circuitry that converts the square wave pulse to precision time markers is positioned in the circuit path. The number of these precision clock pulses is directly proportional to the exact length of time the musician held the key down to produce any one of nine different notes. This begins the process of converting the holding time of the note into a discrete number that represents that specific note. (See schematic drawings FIGS. 4, 5 and 6)

Refer to Block Diagram FIG. 1, (9)

This operation converts the precision time markers into binary numbers that are the basis of assigning a literal number that identifies the note that was played. At this point however, the numbers of schematic 5 are binary count 'position numbers' that identify what position the binary counters were in when the musician released the key. This precisely identifies the length of time the musician held the note—this eventually becomes the literal note number that represents that specific note. This can be seen more clearly on schematic drawing FIGS. 5 and 6.

Refer to Block Diagram FIG. 1, (10)

In this operation the 'position' numbers are converted into actual numbers that represent the nine notes. These data provide an option that can be used later in the analysis process to convert the number representing the note into the literal note symbol to make it more realistic for the trainees. This can be seen in more detail in drawing FIGS. 6, 6A, 6B.

Refer to Block Diagram FIG. 1, (11)

This describes the means of converting the literal integers that represent the notes that were played into the actual note symbols of each note. See Drawing FIGS. 6A. 6B.

Refer to Block Diagram FIG. 1, (12)

This is an explanatory drawing showing the relationships between the binary counter numbers, the name of the notes, the relative time that the musician is required to hold the key down to produce each note, the number of precision time markers that are produced by the system clock while the square wave pulse that was produced from the note exist. The music sheet symbol for each type note is shown in column 5 of FIG. 6A, (12)

Refer to Block Diagram FIG. 1, (13)

This shows the terminating point of the 'scan line' highway that began at block diagram FIG. 1, (7) which is FIG. 7 of the schematic drawings. This is to show that the circuitry depicted in the above block diagrams are configured in series on one scan line which is scan line C4 40 which is the 'C' key in octave 4, key number 40 counting from the left side of the piano. There are FIGS. 1 through 13 inserted in series in each of the other eighty seven scan lines.

Detailed Description of the Music Training System™

Note: When referring to the note number the disclosure concerns the numeral that represents a specific note symbol i.e. a Quarter Note—half note—etc. These are shown on FIG. 6A.

When referring to the number of the above notes the disclosure is referring to the counted number of notes (keystrokes) played. The disclosure will always refer to the literal number of notes resulting from keystrokes unless specified otherwise. End of note.

Refer to FIG. 2: - - - Note Acquisition:

FIG. 2 (1) uses the example of scan line C4 40 which is in octave 4 of the piano. This key is used throughout the disclosure. The circuitry and operation of the other eighty seven scan lines all operate the same. The only differences are the frequencies of each of the eight octaves and the design characteristics of the frequency separating filters shown in the accompanying table.

This invention does not require physical connections to the piano or other sources. The musical sound waves in the air are collected by a series of eight high quality microphones that are designed to respond to frequencies between 27.500 hz through 4186.009 hz. Each of the eight sharp cutoff microphones is designed and 'tuned' to respond only to the "band" of the twelve frequencies of the octave it serves. For example, microphone No. 4 (serving octave 4) is designed to accept a band of frequencies from 220.000 cps through 415.395 cps that are the fundamental frequencies generated by the twelve keys in Octave No. 4. (cps is an abbreviation of cycles per second.)

The combined eight microphones span the audible spectrum of the eighty-eight piano keys. They are shielded and positioned on the piano key-shelf or over, or adjacent to, the 'strings' of each octave inside the piano with external 'plug-in' jacks for connecting the microphones to the System. The plugs are configured and color coded to prevent the plug for an octave being inserted into an incorrect jack.

FIG. 2, (1) lists the octave number, the name of the key, and the fundamental frequency that the key produces when struck by the musician. These are separated by octave number and are provided for all eight octaves.

As the music is played, the microphones accept the analog tones from the air and present them to the eight band-pass filters, FIG. 2, (3). There is one band-pass filter for each of the eight piano octaves. Provision is made for disc input to the band-pass filters FIG. 2 (14) to enable pre-recorded music or training exercises to be entered into the circuitry at the input of the band-pass filters (3). In addition, provision is made to scan a copy of the music sheet into the processor and subsequently to a flat screen monitor for operational functions, FIG. 2, (15).

The human ear hears analog frequencies as pleasant sounds and hears unprocessed digital signals as 'noise'. Since the audible tones (music) from the various forms of digital recordings are equivalent to analog tones to accommodate the human ear, they can be processed by the MUSIC TRAINING SYSTEM™ the same as the analog tones produced by the piano.

Knowing the fundamental frequency produced by each piano key enables designing 'sharp cut-off' band-pass filters for the band of frequencies produced by each octave on the piano. Each of the eight band-pass filters is tuned to accept the fundamental frequencies produced by the keys of a specific octave and reject all others. By design, ambient noise and other frequencies outside the 'band' of frequencies of that octave are attenuated below practical usable range.

For example, the frequencies produced by striking the keys of octave 4 range from A=220.000 Cps to G#=415.395 Cps. The band-pass filter for that octave is designed to pass those frequencies and to attenuate all others.

The frequencies that are passed through the band-pass filter, FIG. 2, (3) and the amplifier FIG. 2, (4) 'fix' the amplitude of the analog signals from the band-pass filters at the desired level to produce a consistent signal for later processing and also attenuate any spurious frequencies or noise.

Refer to FIG. 3:

The amplified signals from each octave are presented to a group of series-tuned filters, FIG. 3, (5) that produce one, and only one, frequency for each key of the piano while attenuating and effectively blocking all others. This operation is essential to maintaining the identity of any key that produces a note. For example, on FIG. 2, the music was taken from the air and the filtering technique was used to divide all the music coming to the microphones into the frequencies of the eight octaves. FIG. 3 takes those eight octaves and further divides and identifies the frequencies according to the frequency of each of the twelve keys for each octave. This identifies the keys in both the physical position on the piano, and also identifies the keys by fundamental frequency. FIG. 3 presents those eighty eight fundamental frequencies, along with the key identity, to a series of analog to digital converters, FIG. 3, (6) that changes each analog fundamental frequency into a digital pulse while maintaining the key identity. Each pulse represents the musician striking one, and only one, piano key. Since the pulse will only exist as long as the musician holds the note-producing key down, the type note played is determined by precisely measuring the width of each square-wave pulse. The circuitry and frequencies are shown to make Octave 4 consistent with later examples. All other piano octaves are configured exactly the same as shown on FIG. 3. The note acquisition segments of FIGS. 2 and 3 will continue producing digital pulses at the output of the individual digital to analog converters as long as there are notes present at the input of the external microphones.

Refer to FIG. 4:

"C4 40" is: The 'C' key of Octave 4, which is the fortieth key from the left of the piano keyboard and is on scan line 40 of the FIG. 4 System Scanner. All the other eighty seven scan line paths contain the same key identification scheme, the same type circuitry having the same configuration but have different frequencies. This disclosure teaches a means of using the fact that the digital pulses derived from the analog notes exists only for the time the musician holds the note producing keys down. Since the notes have been converted into a square wave, the square wave is in positive "high" condition for as long as the note producing key is held down. The square wave disappears instantly and reverts to a "low" condition when the key is released by the musician. These facts are combined to conceive and design a means of precisely measuring the pulse parameters during this "high" interval. Measuring the amplitude of a square-wave pulse is well known in the industry and requires less innovative circuitry to function in the MUSIC TRAINING SYSTEM™ than does the many attributes of an analog musical note. Beginning on FIG. 4 the amplitude and note processing functions take separate scan line paths. Just as in the Note carrying scan line, the amplitude measurement values are converted to numerals on a scan line path that is identical to the scan line note path of FIGS. 4, 5, 6, 6A and 7. At the end of the scan line the amplitude square numerals are 'fed' into a duplicate of the FIG. 8, data analysis collator, and made available for programming into the training analyses. Because of the virtual duplication of the two scan line systems, the parallel amplitude scan line is not detailed in the disclosure to maintain schematic clarity.

The means of precisely identifying the type notes played by measuring the width of the pulse during 'high' interval of each square wave generated by the various types of notes is disclosed as follows:

Every computer processor is controlled by a system clock that emits a continuous string of precision 'time marks' with exact spacing and timing. FIG. 4, column 3, (17) discloses a Pulse Triggered On-Off gating circuit that is explained in detail later in the disclosure. The pulses are passed by the gate only as long as the musician holds the note producing key down. The number of time marks is precisely counted and accurately reflect the literal width of the square wave pulse that was presented at the entry of the gate. This enables a discrete number of time markers to pass through the gate for each type note produced by the piano. These numbers are converted on FIG. 5 to literal numbers that represent specific notes. Precisely identifying the type notes and later reconstructing the literal note symbol for analysis and training purposes is made possible by utilizing an innovative 'scan line highway' technique. Described as follows:

Explanation of the Scan Line Highway:

The music sheet is the composer's instruction to musicians telling them how the music should be played. It is analogous to a 'road map' having road signs along the highway.

The musician knows what key to strike, with what hand and with what finger by the placement of the note on a line or in a space of the Grand Staff music sheet. He/she knows how fast to play, how loud or soft to play etc by 'reading' other dynamic symbols on the music sheet. The 'scan-lines' provide the means of identifying and recording what key was used, what note was actually played, in what sequence with other notes played with other fingers and the musician's other hand at any precise point of the music.

To get nine different notes that could be played on any of eighty eight keys that are distributed across eighteen lines or spaces inserted in the proper sequence into one specific music sheet measure of a multiple number of measures while maintaining a record of each keystroke and the literal 'holding time' of each keystroke requires complex technical solutions. The scan line is a technique developed to transmit musical notes or other data that originate simultaneously or sequentially at multiple random points of a high speed data system, through diverse circuit configurations that process and transform the data, and transmit it to a collating terminating point in the system while maintaining the technical identification of each of the random points of origin in a manner to accurately associate the point of origin with the end result after processing the data. The 'scan line' innovation makes extensive use of the music sheet. For that reason, an explanation of the music sheet is in order:

The physical positions of the eighty eight keys on the keyboard and the fundamental frequency of each key were the only two constants available for designing the MUSIC TRAINING SYSTEM™. A third constant was derived by modifying the lines and spaces of the music sheet Grand Staff to make use of the fixed position of the note symbol on the music sheet Grand Staff lines that dictate what key to use to play a particular note. These three constants were used to construct the "Scan Line" that makes the MUSIC TRAINING SYSTEM™ feasible. The 'scan line' concept makes it possible to accurately record every note played and verify that it was the correct key, played in the proper sequence and positioned in accordance with the music sheet 'road map'. In addition, the 'scan line' makes it possible for scanners and counters in the processor to provide timely and accurate counts of the number and the type of notes that were played on each of the eighty eight keys in response to the music sheet 'road map' while maintaining the identification of the key that produced the note. Further, the scan line concept enables counting the notes as they are played in each measure as specified on the music sheet time signature and maintaining and recording a count for each key on the keyboard.

This configuration is duplicated in the other eighty seven scan lines and on the amplification scan line. The music sheet requires five lines and four spaces for the Treble staff and another five lines and four spaces for the Bass Staff for a total of eighteen lines and spaces that tell the musician what key to use at any point in the playing.

Refer to FIG. 4. The Scan Line Highway:

A "snapshot" of any music sheet measure shows that the eighteen lines and spaces are adequate for only a specific instant of time because the probability of a musician striking more than eighteen keys at one time is low. However the musician can strike any of the eighty eight keys at any time. Without the Scan Line Highway there would be only eighteen lines/spaces available with no practical way to record and time notes played on the other seventy keys. The objective of the series configuration in each scan line is to provide parallel paths (a separate 'lane' through the system on the scan line highway) for the nine notes that could be simultaneously played on any eighteen of the eighty eight keys on the piano. The 'scan line' highway concept assures that when multiple notes are played simultaneously they are processed immediately and stored in the proper registers.

The Scan Line Highway is analogous to a 'highway' having eighty eight 'lanes of traffic'. These 'lanes' are used as circuit paths to process both simultaneous and sequential notes through the system while maintaining the identification of every note producing key and which of nine possible notes were produced by striking each of the eighty eight keys. For this application, each key is assigned its' own 'lane' on the scan line highway and that assignment remains constant throughout the operation of the system. The 'scan line' innovation made it possible to control the dynamic factors of identifying, timing and sequencing constantly shifting combinations of simultaneous and/or sequential notes.

See FIG. 4, column 2, (16)

The Scan Line Highway contains a 'Scanner' having the capability of detecting and identifying data changes on each of the eighty-eight scan lines as the system operation progresses.

Refer to Block Diagram FIG. 1 (7), and FIG. 4, scan line C4-40, (16) that identifies the "C" key, in Octave 4, that is literal key number 40 counting left to right on the keyboard.

The block diagram of scan line 40 is typical of the other eighty seven scan lines. Identical innovative circuitry is embedded serially in each of the eighty eight scan lines. (See Block Diagram 1, (1-13. The 'scan-line highway' concept enabled the design objectives of the MUSIC TRAINING SYSTEM™ to become a reality.

Continue Referring to FIG. 4:

The Scan Line Highway begins on FIG. 4 Columns 1 and 2(16) by listing the piano key numbers as they appear in left-to-right numerical sequence on the piano across from the corresponding line number for the alpha-numeric name for those keys. Showing separate columns was done for disclosure clarity. Later drawings combine the key identification portions of column 1 and scan line numbers of column 2, to provide a complete alpha-numeric address of every key on the piano keyboard. For example, the key address of the first key on the keyboard will be: A1 1. This is the address of the 'A' Key, Octave 1, and the leftmost key on the piano which is Scan line 1.

Refer to FIG. 4. Column 1.

The key alpha names, octave numbers and fundamental frequencies for all octaves have been previously described. FIG. 4, column 1 contains an abbreviated listing of those key names and octave numbers showing the first and last keys of each octave. (Other keys of the octaves are omitted for schematic clarity)

Column 2 of FIG. 4 is a line scanner.

The function of the line scanner of column 2 is to continuously monitor all scan lines beginning when the system is activated by the external on-off switch. When the unit has the light (preferably green) it signifies that all registers are cleared and ready to accept notes. As the notes are played, the scanner 'triggers' upon detecting a 'high' created by the presence of a note on any of the eighty eight scan lines and transmits the key ID and scan line number directly to the Processor of FIG. 7A. The effect of those signals will be explained in the detailed description of FIGS. 7, 7A and 8.

Scan line C4 40 has been expanded on FIG. 4 to schematically show the circuitry that measures the time the musician held each key down. The musician determines the type of note to be played by the 'holding time' interval specified by the note symbol and time signature specified on the music sheet at a particular point in the playing. Identifying and reconstructing the notes for future analysis requires that every note be precisely measured as to amplitude and duration time while maintaining the key address of the note. This is accomplished as shown on FIG. 4, scan line C4 40 (17) by the measuring circuitry inserted in series with the C4 40 lane on the scan line highway. All other scan lines have circuitry the same as that shown in FIG. 4, (17)

FIG. 4 (17) contains a block diagram depiction of the processor computer clock that produces precision time marks that control timing functions in the processor of the system. Also shown is a depiction of a clock-driven, time mark generator that produces an output of continuous, precisely spaced, time marks that conform to computer processor protocol. These precision 'time marks' are used as a standard source to measure the holding time of all notes.

There is a Pulse triggered on-off Gate (18) provided in each scan line that controls integrating the precision time marks into the operation of the system.

The pulses enter FIG. 4 on scan line C4-40 in the order they were made when the 'C' key in octave 4 was struck. This produced a 'high' on scan line 40 that appears at E3 of the input of a pulse triggered "On-Off" gate (18) that is permanently connected to scan line C4-40. The same operation is in progress, either sequentially or simultaneously on any of the other eighty eight seven scan lines as the musician strikes any of the other eighty seven keys.

The schematic of FIG. 4 (17) is one of several types of very fast operating on-off gates that operate as follows:

The diode will conduct when the Anode, terminal one (1) is more positive with respect to ground potential than the Cathode, terminal two (2). If the control voltage at terminal E2 is at ground potential the cathode is positive with respect to the Anode. In this state the diode is 'back biased' and will not conduct and no signal will be passed - - - the 'gate' is closed. When an incoming pulse arrives at E2, it raises the 'trigger' to a voltage level higher than E1. This drives the anode, terminal one (1) positive with respect to the cathode, terminal two (2). This forward biases the diode and it offers virtually no internal resistance to the input signal and goes into a conducting state - - - the 'gate' is open and the signal, in the form of a series of precision time markers is 'passed' to subsequent circuitry in FIG. 5. This configuration produces a very high speed, fast acting gate. The instant the musician releases the key the pulse drops to zero, anode bias is removed, the gate closes and the precision time markers are stopped. In this manner a number of precision time markers were passed through the gate in direct proportion to the time the pulse existed.

There is a FIG. 4 square wave pulse - to - - precision time marker conversion gate in series in every scan line of the system.

The reason for converting note symbols into numerals is that it increases the accuracy of the system while reducing technical and mechanical difficulties. This is explained further into the disclosure. A method of restoring the note symbols and making them available for detailed analysis is disclosed and explained in FIGS. 6, 6A, and 6B.

FIG. 4, Columns 1 and 2 (16) show the key address and scan line number for all eighty-eight keys. Column 2 is a system scanner and transmitter with connections to the appropriate sections of the FIG. 7A system processor to continuously monitor every scan line 'looking' for pulses (a 'high' condition) on any scan line. The 'high' on any scan line is present along the entire length of the scan line and is used to 'trigger' circuitry that is inserted in series to perform the functions necessary to produce the MUSIC TRAINING SYSTEM™ analysis data.

Octaves not needed for this portion of the disclosure are not shown on the FIG. 4 scan lines to maintain schematic clarity.

Figure 5:
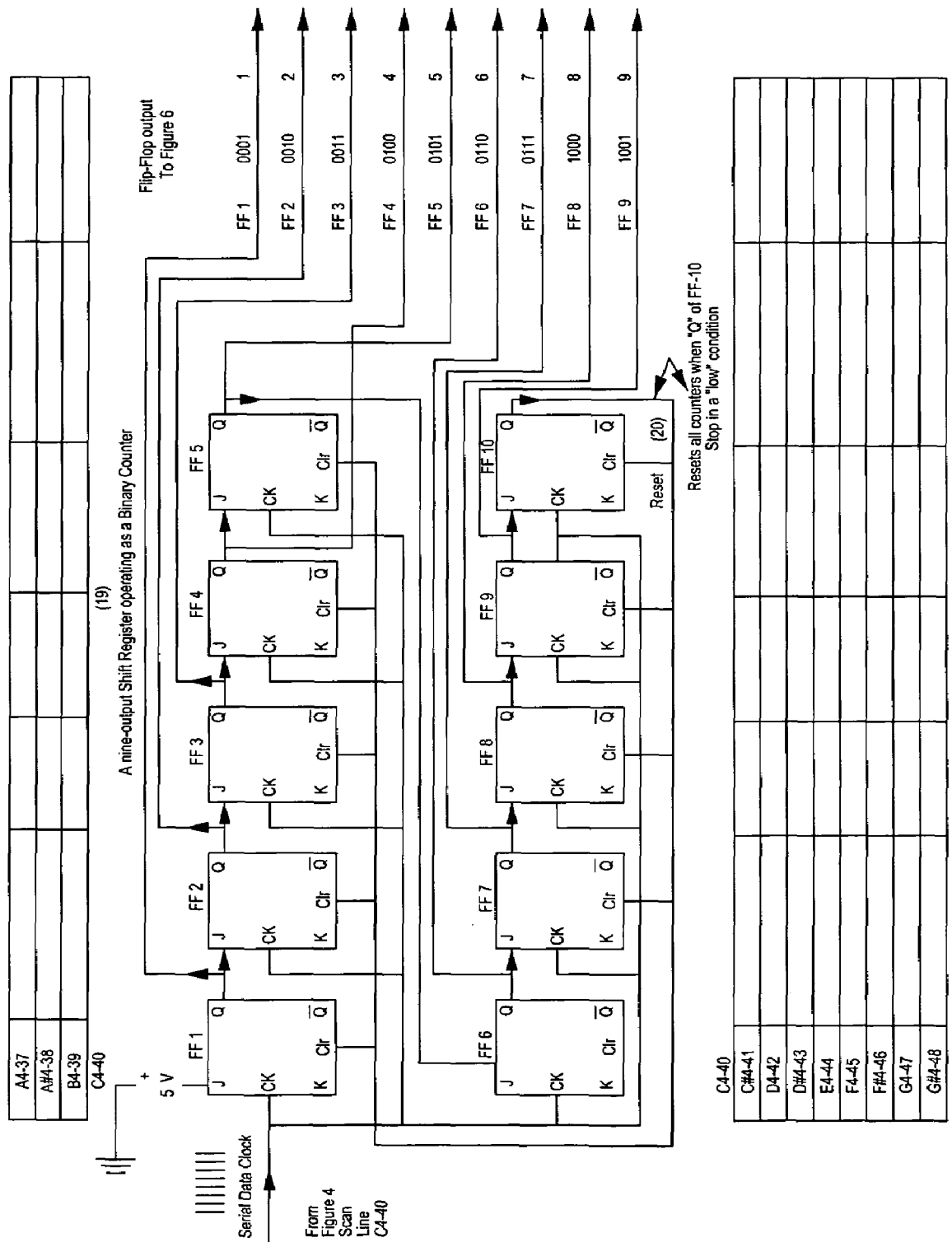
FIG. 5: Is a schematic of a nine output shift register operating as a binary counter. It is designed to provide an accurate count of the clock pulses that pass through the FIG. 4, (17 & 18) gate during the holding time of the note. This holding time measurement, when converted to binary numerals, is the means of identifying the type note the musician played. It is important to understand that there is one of FIG. 5 inserted into every scan line highway lane.

Refer to FIG. 5:

Note: For simplicity the explanation of FIG. 5 is in millisecond terms using ripple counter techniques and small binary-count numbers that are representative only. In production models, operating at Nano/Giga second speeds, large scale synchronous counters using much higher counter frequencies and much larger "divide-by" counters are used.

FIG. 5 is essentially a configuration 'off-the-shelf' Binary Counters operating as a shift register with nine outputs. In this configuration it functions as a register that holds the count between pulses. The shift register is composed of nine 'J K' Flip-Flops (19) that are arranged to count the clock pulses that 'passed' through the timing gate of FIG. 4, (17) during the time a pulse was present on the scan line connected to the flop-flop. The Flip-Flops count each clock pulse coming from FIG. 4 and continue counting until the end of the pulse. The Flip-Flops are 'set' to provide a 'High" at the output of the Flip-Flop where the pulses stop. For example, if the input goes 'low' while the string of pulses in FF one is at binary count 0001 (a binary one) the 'High" is registered on the output of the FF which is numbered "Output One". If the string of clock pulses continues to FF two and stops when the incoming pulse disappears, the count number is at 0010, the 'High" is registered on the output of FF two and the binary number is 0010 which is a binary two. If the string continues to FF nine, the 'High" is registered on the output of FF nine when the binary count is 1001. When the pulses stop, output "Q" of FF ten (20) goes to 'reset' mode and resets Flip-Flops one through nine to zero in preparation for the next pulse on the scan line.

The operation of FIG. 5 resulted in a 'high' condition on one of the nine FIG. 5 outputs and represents the note that the musician played. The type note was identified by measuring its duration in Binary number terms. The design of the MUSIC TRAINING SYSTEM™ requires that one, and only one, of the numerals 1-9 of FIG. 5 be presented to the digit registers of FIG. 7 at any specific instant. That binary 'position' numeral is translated into a 'literal' numeral to greatly simplify the comparison analysis process. The note amplitude comparison, or other music sheet instructions of the above process, require the number of Flip-Flop outputs shown in FIG. 5 to be increased but the basic operation of the amplitude scan line highway is the same. However, the addition of other 'road map' symbols that control tempo, repeat and other instructions are included in the operation of the MUSIC TRAINING SYSTEM™. The value of using a Binary number system will become apparent because of the variety of functions that are measured.

FIG. 5 converted the clock pulses of FIG. 4 into a 'position' number identifying one among nine notes.

There is one complete FIG. 5 (a series of ten 'J-k' Flip-flops) inserted into every line of the 'scan-line' highway. Each scan line represents one key on the keyboard. All circuitry installed on a scan line is always is series with the 'flow of data' from the individual keys.

Figure 6:
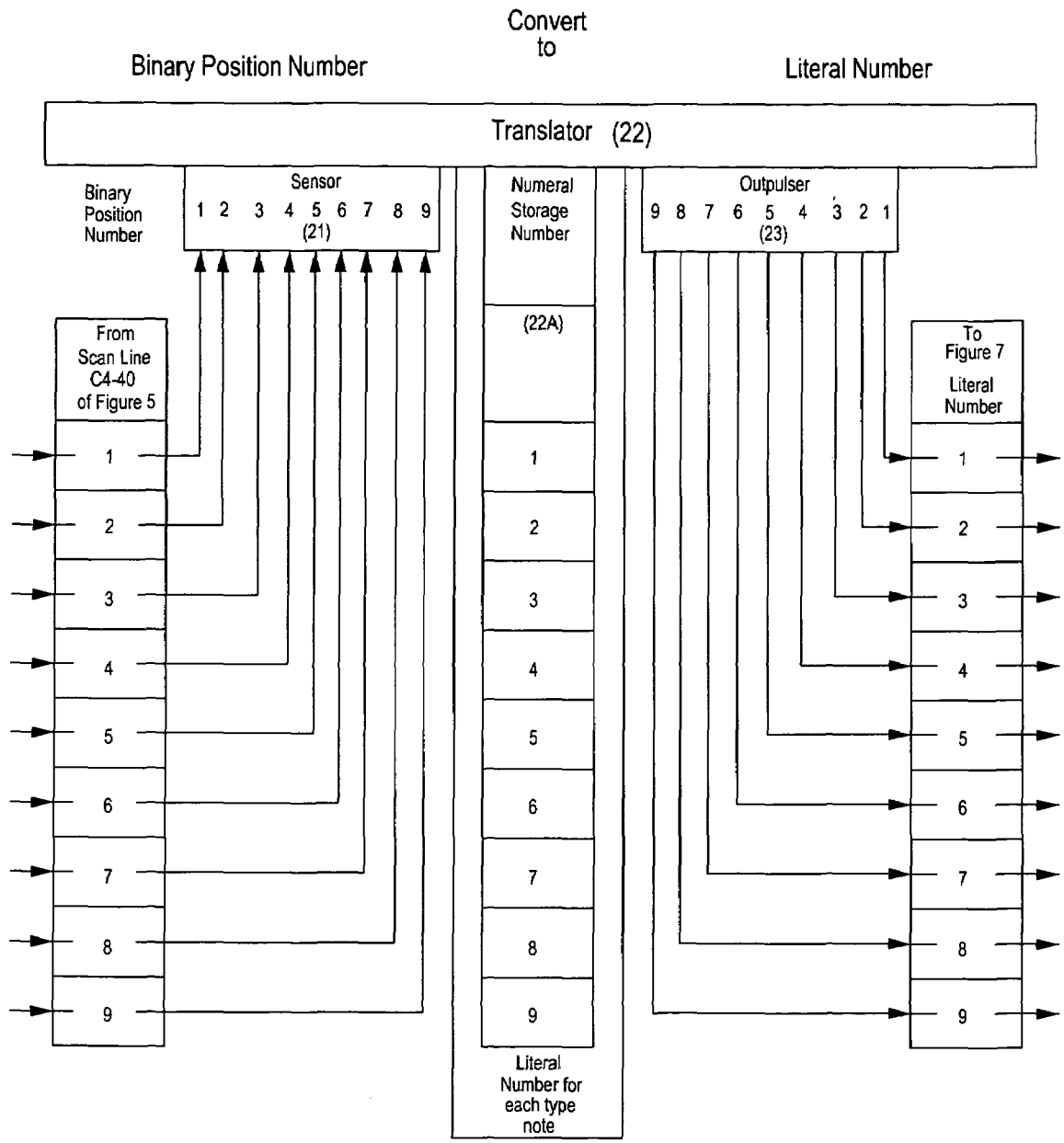
FIG. 6: This figure shows how the binary numerals produced in FIG. 5 are converted from Binary numbers that relate to a position on the shift registers of FIG. 5 into literal numbers that represent the note symbol that the musician read as he/she played the music.
Figure 6A:
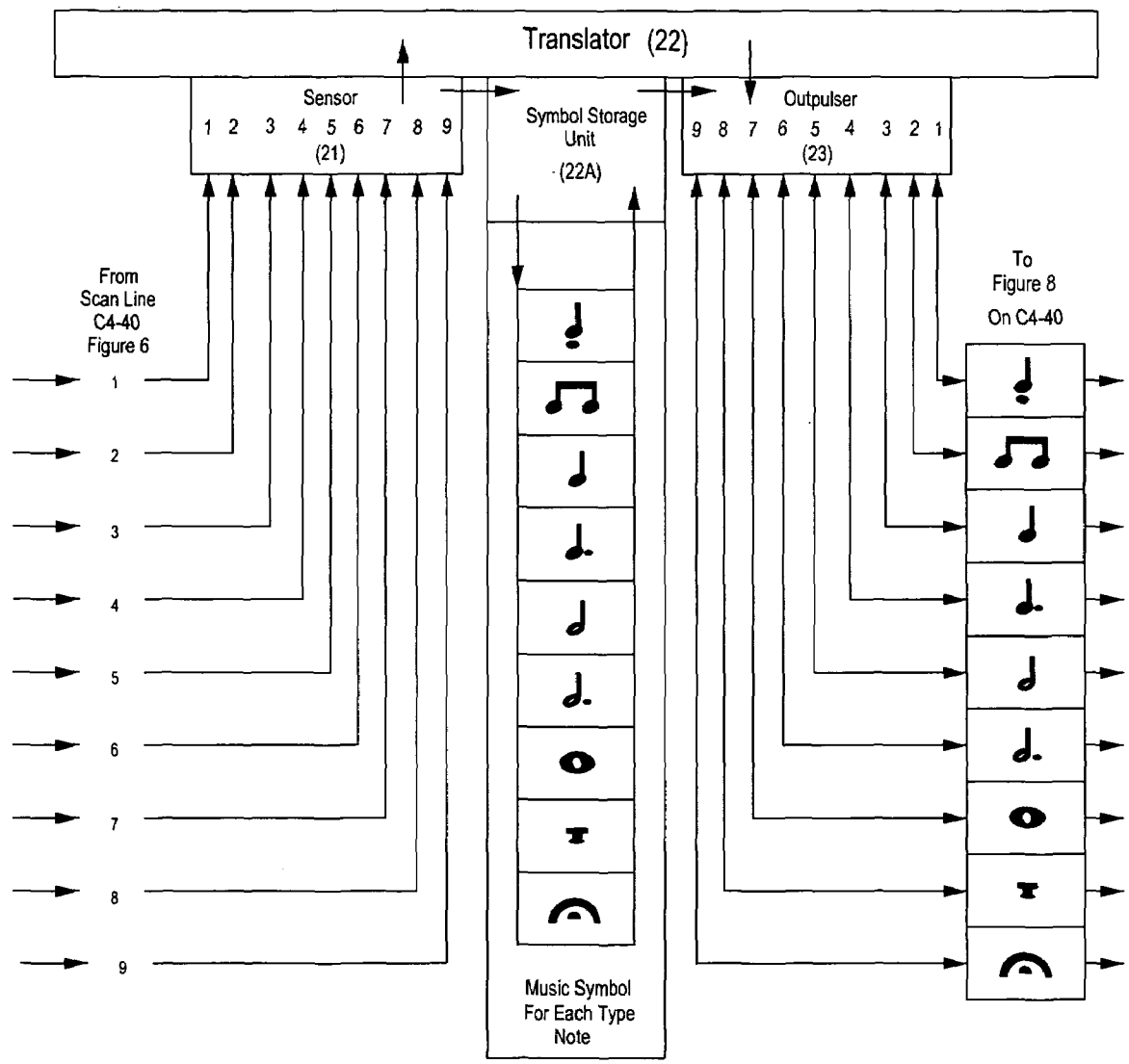
FIG. 6A: Shows how the numbers can be used to reconstruct the original note symbols. If this figure is used in production models, it should be done between FIG. 7A and the Analysis data collator of FIG. 8. If the numbers are converted into symbols prior to FIG. 7 the number of digit registers must be increased because of the different widths of the note symbols.

Refer to FIG. 6:

FIG. 6 makes use of the binary 'position' number derived on FIG. 5 to convert it into a literal integer that can be inserted into a comparator and used in the analysis process. FIG. 6 contains a sensor (21), A Translator (22) containing a numeral storage, (22A) and an Outpulser (23).

The sensor is designed to detect a 'high' on any one of the 1-9 inputs from FIG. 5 and react to the numerical position of the input containing the 'high'. For example, assume that the 'high' appeared on incoming line three of FIG. 6 which is position three of the nine inputs. Position three in the sensor (21) 'triggers' the Translator, (22) to connect to the number three slot in the Numeral Storage Unit (22A) and transmit the numeral three into the outpulser, (23). The advantage of having the music sheet measure lines intersect all eighty eight scan lines is apparent at this point because note symbols vary greatly in width. (See FIG. 6B) These notes must be inserted into digit registers having uniform widths. For that reason the digit registers are 'spanned' by measure line columns having widths that vary as to the Time Signature specified on the music sheets. Converting the note symbols into numbers minimizes the note width problem. In addition, the outpulser of FIG. 6 is programmed to transmit one space 'bit' ahead of the numerals into the registers and comparators of FIG. 7 for further processing.

The example of the intersection of the measure column lines with the register and comparator rows that are 'spanned' by the measure lines in accord with the time signature is shown on FIG. 7, scan line C4 40, (26).

Refer to FIG. 6A:

FIG. 6A is a virtual duplicate of FIG. 6 with the exception that it shows the components of FIG. 6 with a note symbol substituted for the numerals in the Number storage section (22A) This figure teaches how a numerical value can be translated to a musical symbol and transmitted into another operation. This is an option that can be used between the FIG. 7A Processor and the FIG. 8 Data Analysis Collator if desired.

The FIG. 6A Translator (22) contains Sensor (21) that is activated by the arrival of a 'high' on any of the numerals connected to the sensor. This 'high' is transmitted to the translator (22) that controls the Symbol Storage Unit (22 A) that contains the digitized equivalent of the note symbols representing the nine various types of notes that are most commonly played. The program in the translator equates the numeral 'high' on any of the incoming numerals from FIG. 5 into the appropriate note symbol via the one to nine position of the symbol column and transmits the digital equivalent of the note symbol to the Outpulser (23) and from there to the input of the scan line registers and the comparators of FIG. 7. There is one FIG. 6 or 6A on each of the eighty-eight scan lines.

Note: The system will function more efficiently by inserting the numerals one-to-nine directly into the FIG. 7 comparator and subsequently transmitting them to the FIG. 8 Data Analysis Collator. The FIG. 6A option is then used at analysis printout stage of the operation to convert the note numerals stored in the FIG. 8 registers into the literal note symbols for the end user.

Refer to FIG. 6B—The Pulse to Symbol Conversion: This is a disclosure information figure to provide an understanding of the relationship between the various operations that convert the analog note produced at the piano into the music sheet symbol for that note. For explanation purposes this disclosure uses an arbitrary selection of the millisecond as the unit of time measurement for clarity in presenting the note conversion process.

The Pulse to Symbol Converter is made up of six columns of nine rows each.

Columns one, five and six are the 'active' columns with physical components that are part of the conversion of the note into the applicable symbol. These columns are combined into a FIG. 6 containing only columns one, five and relationship between the precision time markers and the musical notes being converted six for all eighty-eight scan lines.

Columns two, three, and four of FIG. 6B are informational to provide a graphic illustration of how the conversion is accomplished and are included in the disclosure to aid in understanding the process. These columns illustrate the An explanation of the columns and rows of FIG. 6B follows:

Column 1: This is a passive component that is controlled by the outputs of FIG. 4. Visualize the nine rows of FIG. 6B, column 1 as metallic circuits connecting the one-to-nine outputs of FIG. 6 to a corresponding one-to-nine-input of FIG. 6B. Also visualize the metallic circuits of the nine rows extending from column 1 of FIG. 6B horizontally through to columns five and six.

Column 2: Column 2 is an "information column". The nine types of notes that are processed through the system are listed, 1-9, on the nine horizontal lines. Horizontal line one lists a staccato note and successive horizontal lines list the 'eighth' note (2), the quarter note (3), the quarter note with a dot (4), the half note (5), the half note with a dot (6), the whole note (7), tied notes (8) and fermata notes (9).

Note: In music there are virtually an infinite number of combinations of notes that make up chords, slurs, tied notes, etc that would operate in the MUSIC TRAINING SYSTEM™ the same as the nine notes explained but would be too numerous to depict in this disclosure.

There are two considerations that apply regarding other than basic notes:

1. If additional notes or symbols are needed for special applications, they can be added by expanding FIGS. 4, 5. For example lines one to nine could be extended to lines one to 'N' with only minor changes to FIG. 5 to make additions to the system.

2. The philosophy of the design is to faithfully record every keystroke made on a 'pattern' playing, putting those notes in one part of a Register/comparator and then recording every keystroke of a second playing and putting those notes in a second register exactly opposite the notes of the first playing for comparison. The content of these two registers are compared by the comparator and the letters "M" and "E" (match or error) inserted as appropriate With this in mind, the design is such that every keystroke has its own slot in the register/comparator comparator row and if the second playing is accurate, the notes of keystrokes of the second playing will be exactly opposite the first regardless of what the notes are named or what they were "tied" to.

For example, consider the "Fermata" note of row nine: This note symbol instructs the musician to hold the note for twice the normal interval for that note symbol. Any basic note on the music sheet may be played 'Fermata'. This means that a basic Quarter Note designated 'fermata' would be held the length of a Half Note and would show up on the analysis sheet as a half note—however—if the notes were the same on both the 'pattern' and the second playing, the musician of the second playing did it correctly.

Column 3: This is also an "information" column depicting the relative holding time of the different notes. As previously mentioned, an arbitrary clock pulse spacing of one millisecond is assumed for this segment of the disclosure. For example: The staccato note of row 1 is assigned a one-millisecond time marker.

Refer to line 2, column 3. This row is for the "Eighth Notes". The definition of 'Eighth Notes" is two notes played in the same time allocation used for a 'Quarter Note" This is shown by two short-duration pulses in a quarter-note space. Now notice line 3, columns one and two. These columns depict a quarter note that occupies the same literal space as the short two notes of line 2, column 3.

The following summary is applicable at this time:
Lines 1 through 9 of column 2 give the names of the nine notes
Lines 1 through 9 of column 3 show the linear (pulse time) relationship of the nine notes by comparing their relative pulse lengths.
Column 4 Lines 1 through 9 show the same relationships in terms of the number of one-millisecond time markers. For example: Row 1 of column 4 shows a single millisecond time marker. Row 2 shows two millisecond markers for the "Eighth Notes" etc.
This is also an "information" column that shows a single, one millisecond time marker for the staccato note of row 1. Row two shows two one-millisecond time markers with a millisecond space between them that defines an "Eighth Note". Row three shows a Quarter Note having the same over all time as the two 'Eighth Notes". The same relationship exists throughout the remaining rows 5 through 9.

Refer briefly to Figures four and five: The millisecond time markers shown on FIG. 4 directly represent the literal time markers of FIG. 4 and counted on FIG. 5. It is important to understanding this disclosure that the pulse lengths and time markers of FIGS. 4 and 5 take place at micro-second or greater, speeds but the relationship between pulse lengths and time markers has the same ratio of pulse length to the number of time markers.

Refer again to FIG. 6B Column 5: This is an "active" column that contains the computer "bits" that represent the symbol for the nine notes used in this iteration of the system. Line 1, column 5 is a symbol for of a quarter note with a dot beneath it. This tells the musician to make it a very short (staccato) note. Line one column 3 shows the resulting one millisecond pulse while line 1 column 4 shows that the staccato note gets one time marker.

Line two of column 5 shows the double quarter note symbols tied together that defines an eighth note (There is another eighth-note symbol but the operation is the same)

The relationships between the note names (column 2) - - - the relative pulse durations (column 3 - - - the relative number of time markers (column 4) - - - and the musical symbols for each of the notes lines 1-9 (column 5) are included to aid understanding the disclosure.

Column 6: This is also an "active" column that works in conjunction with column 5. When the "High" from any line on FIG. 5 appears on any line one-to-nine of FIG. 5, the sensor in column 6 is programmed to immediately transmit the 'computer bits' that represent the symbol on that row to the scan line that is active (High) that corresponds to the key that produced the note. Note: The actual transition from a 'high' pulse into a note symbol can be more readily understood by the configuration of FIGS. 6 and 6A.

Refer to FIG. 7: The note numerals have varying intervals for arriving at the digit registers at a given scan line. This requires a space bit to be transmitted ahead of each note numeral to keep consistent spacing between numerals in the digit registers. The note numerals from FIG. (6) pass through an internal "First Play-Second Play switch in the FIG. 7A processor program that is controlled by external switch FIG. 10, switch 1, (33) contacts 5, 6. This 7A processor program controls the FIG. 7 row control, column 2, (39) to open and close the proper register depending on whether the playing is for a 'pattern' (this includes a 'presentation) or a 'practice session'.

Beginning with FIG. 7 the circuitry embedded in the scan lines is different. FIGS. 4 through 6 had circuitry inserted in series into all eighty eight scan lines to develop the numerals that represent literal notes. FIG. 4, column 2 (16) contains circuitry that generates a parallel 'by-pass' of the eighty eight scan lines to provide a 'heads up' to the Music Training System™ Processor, FIG. 7A, by sending a 'High' plus the scan line and key ID that produced it to the 7A processor to assure that the note numerals incoming from FIG. 6 can be inserted into a comparison register at the appropriate time in the process. This 'high' is sent to multiple system points to enable simultaneous operation of these components. One of these points is to the FIG. 7A processor and thence to the Dynamic Control FIG. 7, (44) that stores the system data in a format to be transmitted to the FIG. 8 Data Analysis Collator. The purpose of FIG. 8 is to distinguish comparison data between the several Grand Staff lines of music being played and make those data available to computer programmers. (explained later in the disclosure)

The circuitry embedded in each scan line path changes at FIG. 7 into a matrix comprised of the original eighty eight horizontal scan lines each of which have been converted into pairs of digit registers (26), each pair separated by a comparator (43) having 'slot by slot' access to both registers.

The MUSIC TRAINING SYSTEM™ is designed to record every keystroke made on a 'pattern' playing and put those notes in one part of a Register/comparator; recording every keystroke of a second playing and putting those notes in a second register exactly opposite the notes of the first playing for comparison. The Comparator 'reads' corresponding slots of the two registers and inserts the letters "M" and "E" (match or error) into the corresponding comparator register slot as appropriate. Every keystroke has its own slot in the register/comparator row and if the second playing is accurate, the notes of keystrokes of the second playing will be exactly opposite the first regardless of what the notes are named.

The horizontal digit registers are intersected by vertical measure lines (28) that are modifications of the original music sheet measure lines that are 'scanned' into the FIG. 7A processor at FIG. 2 (15). The FIG. 7A processor adjusts the vertical music sheet measure lines to 'span' the horizontal register slots to conform to the time signature selected by the musician prior to beginning playing. In addition, the modified FIG. 7A measure lines are transmitted by the FIG. 7A Processor via the FIG. 7 Dynamic Control Program, FIG. 7, (44) to the Data Analysis Collator of FIG. 8 (29) where they duplicate the measure column and the scan line spacing of the rows of FIG. 7. The above operation is to enable collating the data needed to produce the 'end result' analysis documents in FIG. 8. Establishing the 'measure line, register/comparator/register matrix begins the process of getting the data incoming from figure six into the proper register slots. The objective is to enable subsequent comparison of data in the 'pattern' i.e. "First-Play" registers with data inserted into the 'practice', i.e. "Second-Play" registers.

To aid understanding this disclosure, note insertion into the registers of FIG. 7 is explained in detail with the note comparison registers of FIG. 8 being populated in parallel with the FIG. 7 circuitry. FIG. 8 is the 'end result' objective of the system in that the FIG. 8 columns and registers are formatted and configured to enable computer programmers to 'read' the comparison columns of FIG. 8 to produce a wide variety of training data. The production systems are configured to consolidate and combine FIG. 7 and FIG. 8 note insertion into rows and columns in one operation resulting in one matrix.

Refer to FIG. 7, column 3, (32)

The following functions are initiated by external FIG. 10 controls that are operated by the musician. (See FIG. 10, Switch 1, contacts 6-7.) The note insertion process will be explained in the following disclosures:

A unique matrix is formed by Horizontal Rows of parallel digit registers (26) separated by comparators (43) that are intersected by Measure Lines (28) that extend vertically across all eighty eight scan lines. A copy of the music sheet is scanned to a disc, inserted into the MUSIC TRAINING SYSTEM™ processor at FIG. 2 (15), transmitted to the FIG. 7A Processor and displayed on an external flat screen monitor. This is a picture of the original music sheet and enables the musician to work from a familiar instruction. This advancement in the state of the art enables writing programs that enable music teachers to determine how faithfully the musician followed the music sheet instructions of key selection, notes played, dynamic instructions such as 'repeat', "play twice", etc. The musician uses the image on the monitor screen as if he/she were looking at the original, physical music sheet with one important difference: Four innovative methods of 'scrolling' the copy of the music sheet are provided to eliminate the need for the musician to interrupt playing to turn pages of physical music sheets. The present invention replaces manual page turning with vertical 'bottom toward top' scrolling of the Grand Staff lines as the musician completes playing each Grand Staff line. This, and other, innovative scrolling methods are explained later in the disclosure.

The musician sets the music sheet time signature in the processor via an external Time Signature Switch FIG. 10, switch 2, contacts 9 through 12, (24) before playing begins.

The FIG. 7A processor is programmed to generate internal measure-line columns that are spaced to 'span' the number of register slots that 'match' the music time signature specified on the music sheet. These modified measure lines extend vertically across all eighty eight scan lines. FIG. 7, Measure Control, (27) measures 2, 3, and 4 (28) show register slot/ comparator configurations for 2/4, 3/4, and 4/4 time signatures. The variable register width technique reduces the number of registers and comparators required by enabling the system to use only the number of register slots specified by time signature of the music sheet rather than providing register slots for several different time signatures. The measure lines and the horizontal row divisions contained within the 'span' of the measure lines are analogous to rows and columns produced by a PC with two important differences: The processor is programmed to adjust the column width of each measure to conform to the time signature on the music sheet and these are fixed throughout the playing regardless of the data inserted in the column registers (26). The register rows are analogous to individual rows within each of the columns with the exception that they are designed not to move either horizontally or vertically within the column as the digit register row 'slots' are filled with spaces and note numerals.

Continue referring to FIG. 7, column 3:

The MUSIC TRAINING SYSTEM™ has two versions of the measure column width: The measure line width displayed on the flat-screen monitor is a picture of the measure lines on the original music sheet that are 'fixed' for the musician when the music sheet is 'scanned' to a disc and entered into the system on FIG. 2 (15). The only change to the music sheet is to program the FIG. 7A Processor to size the image to fit the available space on the monitor. This innovation allows musicians to work from a familiar picture of the original music sheet continuously displayed on the MUSIC TRAINING SYSTEM™ monitor screen at the musician's optimum eye level with no page turning involved.

'Sizing' the view screen allows the system to use very small screens for musicians who play hand-held instruments. These can be made to 'scroll' horizontally if needed.

The second version of the column width results when the musician manually operates an external "Time Signature Select Switch", FIG. 10, switch 2, (24) to 'set' the time signature specified on the music sheet i.e. 2/4, 3/4, 4/4 etc. prior to beginning play. Operating this switch does two things: The switch 'triggers' the FIG. 7A processor to command the Measure Control, FIG. 7, Column 3 (27) to adjust the width of the vertical measure columns to 'span' the number of time slots in the horizontal registers specified by the time signature. The number of spaces and notes included in the width of the columns is determined by the time signature of the music. In addition, for clarity in this disclosure, there is a connection between the processor of FIG. 7A to the processor of FIG. 8, (29) that 'triggers' the FIG. 8 processor to generate column widths in the FIG. 8 matrix that are formatted to duplicate the column widths of FIG. 7 and to accept the "match-error" data for the 'first-second' playing. (explained later in the disclosure)

The FIG. 8 format is different from the matrix format of FIG. 7 for two reasons: First, FIG. 7 shows the relationship between the measure lines, the external system controls and the several time signatures that are used in music. Secondly the FIG. 8 matrix is the 'end result' of all previous circuitry and must differentiate between the music being played from Grand Staff one and later Grand Staffs that will be played from the same music sheet. A processor in the FIG. 8 control segment, (29) accepts the measure lines of the FIG. 7 matrix from the 7A processor, and reformats them to facilitate direct 'read' access to the data resulting from the two playings. Data acquisition and distributing the notes into the proper registers is identical and parallel with FIG. 7. Inserting notes in FIG. 7 is described in detail in the following disclosure with the arrangement of the FIG. 8 format described more fully in the detailed description of FIG. 8.

The above innovations assure that the space and number slots available in the note storage registers, and in the analysis access columns of FIG. 8, correspond to the maximum number of notes that could be played by the musician in that measure.

A function of the time signature switch, FIG. 10, switch 2, contact 9, (24) is to command the Comparator segment of the Dynamic Control Program Measure Counter FIG. 7, (45) to count the number of measure columns as their width is adjusted to the horizontal register slots. This number is stored in the comparator of the Dynamic Control Program Measure Counter FIG. 7, (44) and used for internal measure scrolling and other functions. (explained later) Numerals representing notes can be entered into the digit registers only within an 'active' measure column. The Measure Control, FIG. 7, Column 3, (32) changes the measure columns for FIG. 7 and sends a command to the FIG. 8 to change the FIG. 8 measures from inactive to active and vice-versa in synchronization with the changes in the condition of the FIG. 7 columns. (Described later in the disclosure) This assures that the proper number of digit register space and note 'slots' are available within the measure columns of both FIG. 7 and FIG. 8 during playing to get the notes and spaces into the registers in the order they were played.

Refer to FIG. 7 scan line C4 40 (26).

The horizontal register row of each scan line of both FIGS. 7 and 8 contain two paralleled digit registers (26) separated by a comparator (43). The other eighty seven scan lines are configured exactly the same.

The Measure Lines of the original music sheet extend vertically across all eighty eight scan lines including the five lines and four spaces for the Treble Staff and the five lines and four spaces for the Bass Staff for a total of eighteen lines or spaces that may contain a note symbol in the measure column at any time. The matrix measure column lines are generated by the FIG. 7A processor when the original music sheet is 'scanned' into the processor.

Refer to FIG. 7 which is the Matrix Sector in the FIG. 7A System Processor and FIG. 8, which is The Analysis Data Collator, (35):

The previously described arrangement for spacing the measure columns to accept the notes that are entered into the 'first play'-'second play' registers of FIGS. 7 and 8 make it apparent that FIGS. 7 and 8 are similar in format and have a high percentage of parallel operations using similar techniques. It could be concluded that the two schematics should be combined and production units are combined. However clarity requires that they be explained as separate functions because FIG. 7 discloses the interaction of the controls that are operated by the musician and the musical data that is entered into the operating system. FIG. 8 details the means of formatting the system output to record the "match-error" data for every note producing key (scan line). This requires a format conducive to programmers producing a wide variety of training data based on the result of comparing a second playing with a first playing. Because of the different design objectives, the two operations are depicted in separate schematics to simplify describing the concept and operation of the system.

Refer to FIGS. 7 and 8.

The eighty eight FIG. 7 horizontal scan lines connect into eighty eight rows of paired digit register/comparators that extend horizontally with enough left to right lateral capacity to record the space and note numbers for as many measures as are on the music sheet. Each of the eighty eight scan lines represents a specific one, of the eighty eight keys, on the piano keyboard. The eighty eight scan lines of FIG. 8 are extensions of the FIG. 7 scan lines. As the numerals that represent notes are inserted into the FIG. 7, (26) registers and comparators, FIG. 7, (43) they are simultaneously transmitted, via the FIG. 7A processor, to the FIG. 8 processor (29) and inserted into their corresponding FIG. 8 measure columns as both columns are opened by incoming pulse "highs" to accept data. This technique assures that the note data inserted into measure columns and rows of FIG. 7 and FIG. 8 are identical.

The Key and Measure Summary of FIG. 8 is a data storage unit that provides a method of 'storing', collating and summarizing note data for all measures in a Grand staff line of music as it is being played. The notes of subsequent Grand Staff lines played are entered into second and following pages identical to FIG. 8 page GS1 with the exception that the pages are numbered sequentially to enable identifying the correct location of playing errors. This results in providing a means of external 'read' access to the FIG. 8, storage unit, (75) via the FIG. 8 processor, to retrieve the 'match-error' data for each scan line in a format to enable programmers to compile error, total notes per key (scan line) and similar data for training analysis purposes.

Refer to FIG. 7, column 3, (27) and measures 1 through 'n'. (28)

The vertical measure lines intersect all eighty eight horizontal scan lines and every scan line has the same register/ comparator configuration. The 7A processor measure line adjustments provide register and comparator slots that conform to the Time Signature selected by the musician for each piece of music played. This arrangement enables sequencing and storing the note numerals for each scan line register in the same order that the musician played them.

The Dynamic Control Program of FIG. 7 (44) contains an internal comparator, a Note and Measure Counter, (45) a receiver (46), a reader (47), a transmitter (48) and a "Scanner" (49). The Note and Measure Counter counts and records the number of measures in the comparator as they are 'scanned' into FIG. 7A, and the FIG. 8 Processor (29) and also counts the notes from all scan lines as they are entered into the active measure column. From there, these data, and the identification of the piano key that produced the note, are transmitted to the FIG. 7, Dynamic Control Processor transmitter (48) and from there to the corresponding scan line and measure column of the Analysis Data Collator, via the FIG. 8 processor, (29). These counts are dynamic numbers that are stored in the counter and used in conjunction with operational functions such as scrolling and 'benchmarking', A more detailed description of FIG. 7 follows:

The System Scan Lines:

Column 1 of FIG. 7, (31) is a continuation of the Grand Staff lines and spaces of the music sheet where the note symbol position on a line or space tells the musician what note to play and the note symbol itself tells the musician how long to hold the note. These music sheet instructions have been modified and converted into the scan lines that are used throughout the MUSIC TRAINING SYSTEM™. The scan lines combine the name of the key, the octave it is in, and the keyboard position for each of the eighty eight keys on the piano. The scan lines in Column 1 of FIG. 7 (31) are identical to those of Column 1, FIG. 8 (55) and extend from FIG. 7 into FIG. 8 and used to compile the 'notes per measure' for each Grand Staff line of music. These data are inserted into FIG. 8 as a portion of the basic data for detailed analyses. For example see scan line C4 40, measure 4, in both FIGS. 7 and 8 - - - notice that both had an error in the first beat of measure 4 while the other three beats were the same.

Referring to FIG. 7, Matrix column 3, (32).

An example of the relationship between notes and spaces for each time signature is shown on scan line C4 40, measure columns 1 through 5-'n'. Measure column 1, (41) is an example of a partial measure having rows to conform to those on some music sheets. FIG. 7, measure column 2, (42) is an example of the rows configured by the processor for a 2/4 time signature. Measure column 3 is an example of rows configured for a 3/4 time signature. Measure column 4 is an example of rows configured for a 4/4 time signature. The register slots for the 4/4 time signature show that there were four notes played on Scan Line C4 40 with one error and three notes that were correct. The dotted lines within the measure columns indicate that the same divisions apply across the entire vertical length of all eighty eight scan lines and vary according to the time signature used. This advancement in the state of the art eliminates the need for separate registers and comparators for each time signature. The space and note registers shown in FIG. 7, scan line C4 40, (26) and the intersecting measure line spacing is illustrative of one of the eighty-eight scan lines. There will be notes within the same measure on other scan lines but the number inserted into any measure will not exceed the maximum notes specified by the time signature i.e. 4 notes in a 4/4 time signature, 3 in a 3/3 signature, etc. The same numeric relationship between the number of notes in a measure column line of registers and the time signature exists for 2/4 and all other time signatures.

FIG. 7, Column 3, Measure Control Program, (32) is programmed to number the measure lines left to right one through "n" continuing through the total measures in the piece being played. A temporary number count store in the Measure Control program, (40A) connects to the Note and Measure Counter (45) to maintain a 'read-write' count of these measure lines until the system is cleared at the end of the playing. These numbers are significant in the scrolling and analysis portions of the disclosure.

Refer to FIG. 7, Column 3 (32), Scan Line C4 40 (26).

One embodiment of the MUSIC TRAINING SYSTEM™ is to provide a note-by-note analysis comparing a second playing (the 'practice' session) with a first playing (the 'pattern' playing) of a piece of music or a music training routine inserted by the teacher. The MUSIC TRAINING SYSTEM™ accomplishes this objective as disclosed by the following:

Refer to FIG. 7, columns one and two: (31).

An external switch, FIG. 10, switch 1 (33), contacts 5 and 6, (62) is operated by the musician to control the insertion of notes into the desired 'first play'-'second play' register rows of the scan lines. The MUSIC TRAINING SYSTEM™ processor, FIG. 7A, is programmed to respond to the 'First Play-Second Play external switch of FIG. 10, (33), contact 5, (62) and, via the Row Control Program of FIG. 7, column 2 (39) simultaneously open the 'first play' registers for all eighty eight scan lines for the first playing while simultaneously closing all 'second play' registers. Conversely, for the second playing the FIG. 7A program will respond to the FIG. 10, (33) external switch, 1, contact 6 (62) and simultaneously open all the 'second play' registers and close the 'first play' registers. The FIG. 7A System Processor extends the above commands and operations to the FIG. 8 measure columns via the FIG. 8 processor, (29). This assures that the 'first play'-'second play' measure columns are synchronized for the FIG. 7 and FIG. 8 measure columns.

Refer to FIG. 7, Column 3, Measure Numbers:

In addition to 'switching' the register rows from first to second play, a section of the System Control Switch, FIG. 10, (81) switch 1, contact 9, (59) is connected to the FIG. 7A processor to 'save' the data into the "Analysis Data Collator"

of FIG. 8 (35) according to the setting of the "First Play-Second Play switch. When a "First Play" piece of music is finished, the operation of the "Save" Switch of FIG. 10, (33), contact 9, (59) completes a connection to the FIG. 7A processor. The processor generates a signal causing all first play data to be 'saved' into "Analysis Data Collator" first-play registers of FIG. 8, (35). Further, when the second play is completed the data in the second play is similarly saved into the corresponding Second Play Registers of FIG. 8.

A third section of the FIG. 10, switch, 1, (33), contact 7, (78) is connected to the FIG. 7A processor to cancel (set to zero) any remaining data in the second play registers as controlled by having the First Play-Second Play switch 'set' to the 'Second-Play" position before beginning to play. The FIG. 7A processor is programmed to send an "all Second Play Registers clear" signal to the Control Panel Status unit, FIG. 10, (73) that turns on a green light on the control panel when the second play registers have been cleared of all data. This gives the musician a signal that the second play registers are ready to accept notes. This status light also tells the musician that the next note played must be the first note of the second playing or all subsequent notes will be recorded in the wrong register slots and the entire playing will be shown as 'errors'. The same action will occur when clearing and verifying the status of the 'Second-Play' Registers. The above operation assures that once the first playing (the 'pattern') is completed and 'saved', the system is switched to the "Second Play" position by the musician. The same 'ready' signal described above requires that the next note played is the first note of the second playing. This note is inserted into the column, register row and note slot that corresponds ('matches') the column, register row and 'first note' slot of the first playing. This coordinates all note insertion to assure that subsequent notes will also be inserted into their 'matching register slots' in the corresponding register throughout the playing and provide accurate data for a note by note comparison of the register slots.

Inserting Notes into the digit registers:

For design purposes, a number has been assigned to each of the note symbols used in playing the piano. See FIGS. 6, 6A and 6B. The number that represents a specific note is used in the system at points in the operations where knowing the type note the musician played is required. The type note is dependent on the length of time the musician held down the note producing key.

The innovation of assigning a numeral to each note symbol serves two purposes:

The first is that the nine note symbols used in music do not have uniform physical widths. Recording them directly into digital registers would require specialized, additional register slots. (See FIG. 6B)

The second reason to use numbers instead of standard note symbols is that it is much easier technically to precisely measure the holding time of a note by converting the note to a square wave and measuring the duration of the "high' by using the binary numbering system to identify the precise holding time of the note as accomplished in FIGS. 4, 5, and 6.

The numbers that represent note symbols are inserted into the digit registers as follows:

When the scanner of FIG. 4 column 2, (16) detects an incoming note on any of the eighty eight scan lines, the 'high' created by the presence of the note is transmitted to the FIG. 7A processor along with the key ID and scan line number. The FIG. 7A processor simultaneously sends the 'high' and the key address to three places in the system. The note receiver in the Measure Control Program, FIG. 7, column 3 (40) gets one of the 'highs'. In a parallel action the same "High" is transmitted to a note receiver in the Measure Control of FIG. 8, (82). This creates the following note insertion action in both figures:

The note receiver in the Measure Control program, FIG. 7, column 3 (40) generates a command to make the Partial Measure, one (41) and measure two (42) active columns: (high). The active condition of these columns allows the rows within those columns to be opened by the Row Control Column 2 (39) to accept the insertion of the note numeral into the correct measure column with the proper spacing between notes. Measure columns one and two are made active at the same instant in the operation to prevent loss of note numerals during scrolling from the first Grand Staff line of music to the second, third, fourth, to "n" Grand Staff lines of music. The row control is programmed to close the row when the 'high' produced by the note is no longer present.

Refer to FIG. 7, Column 2, (39).

The action of the First Play-Second Play switch associates the Row Control Program of column 2 with the 'open' register row. The Row Control of Column 2 has internal FIG. 7A program connections to the Note Receiver (40) in the Measure Control Program of FIG. 7, column 3 and is programmed to open the register row in any column that moves from a "low" to a "High" condition. The "high" on an active scan line is removed when the musician releases the note-producing key the active column goes "low", (this action disclosed later) the Row Control, Column 2, (39) senses the High to Low transition and closes the registers in the formerly active column. The above action limits note insertion to Row Segments within those columns that are in a "High" condition.

The second destination of the 'high' sent to the system processor by the scanner of FIG. 4 column 2 is transmitted to the FIG. 8, processor (29) along with the scan line identification to update the "Total notes per scan line" of column of FIG. 8.

The Comparator between the two horizontal register rows is described:

The identical horizontal registers of every scan line have a Comparator between them. There is 'slot by slot' correlation between the comparator slots and the slots in both rows of registers.

Refer to FIG. 7, Column 2, Scan Line C4 40 (43):

The switch schematic of scan line C4 40 shows the connections to the external Second-Play switch. These connections are the same for every scan line.

There is no connection between the First play switch and comparator because the 'First play registers are for the "pattern playing' and there is no need to activate the comparator during insertion of the 'pattern' notes. There is a two-way connection to the comparator second play register when the First play-Second play Switch is in the "Second play" position. There is also a two-way connection between the First play register and the Comparator when the select switch is in the First Play position. These connections extend the entire length of the scan line and apply to all scan lines.

The Comparator is passive during the First play while the numbers representing notes are being inserted into the First play 'pattern' registers, When the switch is changed to the second play (or 'practice') position, the Comparator, (43) is activated by the 'high' from the Measure Control Program FIG. 7, column 3 that turns the measure column 'high' to allow notes to be inserted into that column. The Comparator is programmed to 'read' the note numerals as they are inserted into the active 'Second play register and 'compare' the note numeral in the corresponding slot in the First play-'Pattern' register. The comparator is programmed to insert the letter "m" in the comparator slot that corresponds to the corresponding register slots of the two registers if both note numerals are the same. If the two register slots do not contain the same numeral, the comparator is programmed to insert the letter "e" in the comparator slot.

Refer to the FIG. 7, Dynamic Control Program (44)

The FIG. 7A system processor sends the third 'high' and key ID data from FIG. 4, Column 2, previously discussed, to the Dynamic Control Program Section of FIG. 7, (44). This Section is equipped with a Comparator, a Note and Measure Counter (45) that contains a Comparator, a receiver (46), a reader (47), a Transmitter (48) and a scanner (49).

The receiver in FIG. 7, (44), has three inputs and has output connections to both sections of the transmitter:

The first Receiver input is from the external Time Signature Selection circuitry, FIG. 10 (24), Switch 2 with a further connection to the Note and Measure Counter FIG. 7, (45). When the Time Signature, 2/4, 3/4, 4/4 etc. is selected by the musician, the receiver turns the corresponding time signature in the Dynamic Control Program, FIG. 7, (44) 'High' or active. The 'High" on the selected time signature 'sets a count' in the Measure Counter, FIG. 7, (45) to 'trigger' when the number of notes previously 'set' and expected by the time signature is reached in the currently active measure column. The action of this 'trigger' is explained later. The second 'high' receiver input is from the FIG. 7A processor and 'triggers' the Note and Measure Counter, FIG. 7, (45) to count the number of measures of the Grand Staff as the Processor inserts them into the monitor and to store the number of the highest numbered measure in the Note and Measure Counter FIG. 7, (45). This number is 'set' in the Note and Measure Counter to 'trigger' when an incoming note signal is received from FIG. 4, column 2 (via the FIG. 7A Processor) that turns the highest numbered measure on the Grand Staff Line 'high' to enable the column to accept notes. This trigger activates the Grand Staff scrolling process which will be described later.

The third input of the receiver also accepts the "High" and the key ID data of the incoming signal from FIG. 4, column 2, (16) via the system processor. These data perform two functions:

The first function is to use the "High to signal the Measure Counter (45) to 'trigger' the Scanner, (49) in the Dynamic Control Program of FIG. 7, (44) to establish a connection between the Note and Measure counter (45) and the 'reader' (47) and to activate these two units to begin 'reading and counting the numbers that represent notes being inserted into the rows in the active measure columns. The same 'High' that started the 'Reader" (47) also establishes a connection to the Transmitter (48) in the Dynamic Control Program. As the 'reader' (47) begins to read the note numbers being inserted into the registers, the data is detected by the transmitter and sent to the 'First play-Second play analysis collator of FIG. 8, (29). At the same time, another segment of the 'reader' is activated by the 'high' to begin 'reading' the comparators (43) that separate the register rows of the FIG. 7 matrix, and sending the data to the Transmitter (48) where they are transmitted to the "Match/Error column of the Analysis Data Collator of FIG. 8, (74) and inserted into the measure column that is 'High at the time of the transmittal. These data provide the notes for the first play and the corresponding notes for the second play in the proper measure column for every scan line as it goes "High". In like manner the FIG. 8, (74) Comparator is programmed to insert the "M" or the "E" data into the same measure on the same scan line to denote a "Match" if both numbers are the same, or an "Error" for the notes on the scan lines of both playing that do not match. The use of these data in the benchmarking process is disclosed in the description of the analysis collator of FIG. 8 (74).

The method of getting notes and 'match'/error' data into the digit registers and thence to the 'read' storage buffer of FIG. 8, (75) has now been described for one measure column. All other measure columns operate the same whether the note insertion is simultaneous or sequential on the different scan lines.

Refer to FIG. 7, (30) Dynamic Control Program, (44) for note processing for FIGS. 7 and 8:

The second function of the third input to the receiver, (46) is to use the input 'high' to 'trigger the function of the FIG. 7, column 3, (32) Measure Control Program Sensor (53) to activate the "scroll by Grand Staff lines" segment of the scroll control Circuitry of FIG. 7A Processor, (54). This circuitry controls scrolling the Grand Staff lines of the monitor music sheet to 'scroll' vertically, bottom toward the top of the screen. Provision is also made to keep the current and the first following Grand Staff segments of the music sheet in the optimal view of the musician at all times during the playing.

Scrolling the Grand Staff lines on the music sheet:

An embodiment of the MUSIC TRAINING SYSTEM™ is to 'scan' the music sheet to a digital disc and insert it directly into a multi-page processor-register, FIG. 7A, that enables it to be displayed on a flat screen monitor. This allows the musician to work directly from a picture of the original music sheet. In addition, processor generated measure lines makes possible the embodiment of automatic music sheet scrolling as the music is played. This advancement in the state of the art scrolls the Grand Staff lines upward on the monitor at a speed commensurate with the tempo being played and stops scrolling at the preset position for the optimum eye level of the individual. These advancements in the state of the art eliminate the requirement that the musician interrupt playing to manually turn the pages of the music sheet. The explanation of the system scrolling functions begins with an explanation of the external control switches:

Note: Modern electronic, key-pad type switches are efficient and require much less space than older mechanical switches. However, their compact, solid-state construction is not conducive to clarity in descriptive disclosure schematic drawings that require point to point explanations. For that reason three mechanical, switches, 1, 2, 3 with twelve contacts each was selected for this disclosure. Production units will use keypads and light emitting diodes configured to control component switching and to indicate which connections are made.

Refer to FIG. 10:

The following discloses the external switches that enable the musician to operate the MUSIC TRAINING SYSTEM™ in the various modes and operating conditions:

The external controls of the MUSIC TRAINING SYSTEM™ are three mechanically operated switches with twelve battery-to-ground contacts on each. The controls for 'switching' from first-play to second-play operation, and the manipulation of the options for those operations are depicted on switch 1, (33) The system time signature settings are on switch 2, (24) and the scroll control functions are on switch 3, (51). The 'benchmark' objective switch is also shown as a fourth switch on FIG. 10 as Switch (60)

The FIG. 7A, Processor Scroll Control (50) contains five program circuits, each controlling a different aspect of the scrolling function. Four of these programs are activated by an external switch, depicted on FIG. 10, (51) to scroll the music sheet data upward as the musician plays each Grand Staff line of music. In addition, contact 1 of switch 3 connects to an external 'rocker' type switch, (71) used by the musician to activate a program in the FIG. 17A processor, scroll control 1-(57) segment of the program (that enable him/her to manually adjust the 'home' position of the Grand Staff line of music to his/her most comfortable eye level. This optimum position' is fixed at the "Adjust Fixed Level" selection and remains in effect until reset by another musician.

Further, contact 2 of switch 3, (58) is coupled to an 'up-down' i.e. faster-slower, rocker switch 2 (80) that enables the musician to activate a program in the FIG. 7A processor, scroll control that enables the musician to set the Grand Staff lines to scroll at a rate that matches the tempo of the music that he/she plans to play. This can be preset by the musician prior to beginning to play, as long the preliminary music played to set scrolling speed is 'cleared' prior to the actual playing that is to be recorded.

FIG. 10 contains a Benchmark Objective Selection Switch (60) that is also shown on FIG. 9. That switch enables the musician to set an objective to correctly play a percentage of the total notes played. If the objective is met, music sheet Grand Staff scrolling continues. If the percentage of correct notes falls below the objective, scrolling stops. Explained more fully on FIG. 9. FIG. 10 also contains a Status Display panel (73) with lights showing the status of the various settings and conditions of the components as the music is being played. FIG. 7A scrolling program three (3) scrolls the Measure lines. This function is entirely within the FIG. 7A Processor. (54) It is automatic and is not controlled by an external switch that is operated by the musician. (mentioned here for disclosure clarity)

FIG. 10, switch 3, contact 4 has connections to the "Scroll by Grand Staff lines" (54) segment of FIG. 7A Processor Scroll control (50) that activates circuitry that, when 'triggered' by the logic circuit sensor in the Measure Control FIG. 7, columns 3 and 4, initiate and control 'scrolling' the Grand Staff lines upward from bottom of the monitor toward the top of the monitor until coming to rest in the optimum eye level of the musician that is preset by the musician before beginning to play. (Explained further in the disclosure)

FIG. 10, switch 3, contact 5 has connections to the "Scroll by Benchmarks" segment, (52) of the FIG. 7A Processor Scroll Control, (50). When 'set' in the "Scroll by Benchmarks" (52) position this switch enables other circuitry in the FIG. 7A Scroll Control (50) to work with Benchmark Control, (52) circuitry in the FIG. 7A Processor Control (50) and the scroll inhibiting function of FIG. 9 to 'stop scrolling the monitor screen if a predetermined number of "error notations" is detected in the comparators that are 'spanned' by the measure lines of the active Grand Staff line being played. (Inhibiting the scrolling is described more fully later in the disclosure)

Internal scrolling of measure columns within the Processor:

The following discloses the technique of scrolling from one measure column to the next within the internal program as the musician completes playing a measure and moves to the next.

Refer to FIG. 7, (44):

A portion of the Dynamic Control Program, FIG. 7, (44) is programmed to function as a comparator. (This is not the same comparator that is between the rows of the scan line registers) This comparator has been previously programmed to 'set' three numerical markers:

The first function is to count the number of measures in the Grand Staff line of the music on the monitor as it is scanned into the system and to 'set a 'high' on that number in the Measure Control program FIG. 7, Column 3. (32) The initial measure counting is done in the FIG. 7A program as the processor adjusts the width of the FIG. 7 and FIG. 8 measure columns to conform to the time signature of the music sheet.

The processor is programmed to count the measure lines of the music sheet and to send the count number to the Note and Measure Counter of FIG. 7, (45) This sets a 'high' on that number in the comparator. This number is used in the scrolling process and is described later.

The second function of the comparator in the Dynamic Control Program, FIG. 7, (44) is to set a 'marker' according to the time signature selected by the musician and to turn that marker 'high' in the FIG. 7, Note and Measure Counter, (45). This setting tells the Measure Counter how many notes to expect from the currently active measure column.

For example: When 4/4 time was selected, the 4/4 time signature in the receiver, (46) in the Dynamic Control Program of FIG. 7, (44) was driven 'high' and transmits that 'high' to the program in the Note and Measure Counter (45) where it is recognized as the numeral 4 and 'sets' that numerical marker in the counter. There is a possibility of receiving four notes from the Treble Staff and four from the Bass Staff for a total of eight notes being inserted into the active measure column. However, the composer's 'road map' often specifies 'rests' or other musical commands that may leave an entire Treble or Bass Staff measure partially or completely empty thereby varying the measure count between four and eight for that measure. Since the measure column extends vertically across all eighty eight scan lines, there may be more than four in the total measure column but never more on any individual scan line than the four (4) specified by the time signature. That number will be three (3) if a 3/4 time signature is selected, and two (2) if a 2/4 time signature is selected etc.

Refer briefly to FIG. 7, column 3 (32) which is the Measure Control Program of the system processor:

This section contains a "partial measure", (41), counted as measure 1, followed by measures 2, (42), measure 3, measure 4, measure 5, and measure "n" etc for as many measures as are in the particular piece of music being played. These measure column numbers are used to distinguish between columns for both internal scrolling within the processor and Grand Staff Line scrolling of the monitor.

When the number of note numerals counted in the active measure column equals the number required by the time signature, the Measure Counter 'triggers' the transmitter, (48) in the FIG. 7, Dynamic Control Program, (44) to send a command to the Measure Control Program, (27) FIG. 7, column 3, (32) to activate (make high) the next highest column in the matrix which would be measure column three since the partial measure one and measure two were previously activated. (See page 54 lines 21 through 30) However, since there could be a possibility of eight, instead of four, notes played in the active measures, there is a danger of losing the last notes to be inserted in a measure if it were to be de-activated while the musician was still playing in a measure when the next highest measure is activated. A logic circuitry sensor (53) in the Measure Control Program (27), FIG. 7, Column 3, (32) is provided to prevent that problem. This sensor has connections to all Measure Columns in the Measure Control Program, (27). It also has a connection to the processor of FIG. 8, (29) to enable simultaneously populating the measures of the FIG. 8, Analysis Data Collator, (35). The measure columns of FIG. 8 are duplicates of those of FIG. 7 in a different format and are therefore "high" at the same time via processor connections because both scan lines are made active by the same 'high' from FIG. 4 Column 2, (16) This action maintains the association of the key identity and the note numeral of the note that was produced by that key. The note numeral is inserted on the FIG. 7 scan line and the FIG. 8 scan line at the same time. After measure one has received the expected number of counts, the resulting 'high' sent to the Measure Control Program, (27) from the Measure counter (45) activates measures one and two in both FIGS. 7 and 8. There is a standard "And-Not" circuit in the Logic Circuit/Sensor, (53) that holds partial measure one, (41) and also measure two, (42) in the 'high' (activated condition) as long as there is a 'high' on partial measure one and a 'high' on measure two, And-Not a 'high' on measure three. When the musician plays the first note in measure three and a 'high' from the note is received from the Measure Counter, the 'And-Not' flip-flop operates to remove the 'high' from partial measure one, thus deactivating it and closing it to incoming notes. This leaves measures two and three 'high' and in the active condition to receive notes. The program sensor now has measure two and measure three in the 'high' condition And-Not measure four. When the musician plays the first note in measure four the flip-flop operates to drop the 'high' on measure two, reverting it to a 'low' condition leaving only measures three and four in the active state And-Not measure five. When measure five receives a note and becomes active, measure three is deactivated and reverts to a 'low' condition. This sequence continues through the highest numbered column on the active Grand Staff and is repeated when the musician completes the active Grand Staff and moves to the next Grand Staff line beginning at measure 1.

The internal scrolling technique just described gets the notes into the proper measure and register locations that are 'spanned' by the active measure column and also describes the internal 'measure-to-measure' 'scrolling' for both FIG. 7 and FIG. 8 as the musician plays from one measure column to the next. This action is a prerequisite for the following objective:

Scrolling the Grand Staff of the System Monitor as the musician plays.

An objective of the MUSIC TRAINING SYSTEM™ is to eliminate the need for the musician to interrupt playing to turn pages of the music sheet. That objective is met by scrolling the Grand Staff music lines on the flat-screen monitor upward into the optimum vision range of the musician as he/she completes playing a Grand Staff Line of Music and proceeds to the next following line. That function is disclosed as follows:

The comparator in the Dynamic Control Program, FIG. 7, (44) contains a note/measure counter that stored the measure numbers 1 through 'n' in ascending order depending on the measure count inserted when the FIG. 7A processor counted and stored the measure column count for the first Grand Staff line of music to be played. These measure columns are normally in a 'low' condition. As the internal scrolling process previously described proceeds, each measure is sequentially turned 'high' as the measure column is made active to accept notes as they are played (This was explained in detail in the disclosure of internal scrolling on pages 61 and 62) The Measure Counter in the Comparator 'steps' from Partial measure 1 to measure two, to measure 3 etc through measure "n" as the music in each measure is played. As a higher numbered measure is driven 'high' by an incoming note, the second highest numbered measure is momentarily held in a 'high' condition to prevent loss of notes with all previous measure columns restored to a 'low' condition. (Previously disclosed) Each of these measure numbers are successively turned 'high' when the measure column is activated by an incoming note. This 'high' appears on the corresponding measure number in the comparator section of the Dynamic Control Program, FIG. 7, (44) If there were six measures per Grand Staff line in the particular music being played the number six was stored in a 'high' condition in one side of the comparator when the music sheet was inserted.

With the insertion of the first note into the highest numbered measure column two things happen: When Measure six was turned 'high' by an incoming note, it 'matched' the 'high' of measure 6 (the highest numbered measure) that was stored in the Dynamic Control Program, Comparator FIG. 7, (44) when the music sheet was first scanned into the monitor. The Measure Counter recognized this 'match' and responded by 'triggering' a 'high' output to both the FIG. 7A and FIG. 8 processors. In FIG. 7A, this 'high' connects to Section 4 of the Scroll Control in the Processor (50) and activates control circuitry that is programmed to scroll the Grand Staff lines upward until the next Grand Staff line reaches the previously set optimum eye level of the musician where the scrolling is stopped. In FIG. 8 the 'high' was used by the FIG. 8 processor to close the measures of FIG. 8 and 'trigger' the FIG. 8 processor to command the Measure Control of FIG. 8, 'scroll' to the next page after 'saving' the data in the first measures. This is more fully explained later in the disclosure regarding FIG. 8.

The second operation 'triggered' by the 'high' condition of the highest numbered measure line 'matching' the 'high' of the first note inserted into the highest numbered measure is to 'trigger' the sensor in the Measure Control Program of FIG. 7 column 3, (53) to turn partial measure 1 and measure 2 'high' to again accept notes.

When all notes have been played into the highest numbered measure column (measure six in this example), measure column six is de-activated and the 'high' connection to the Scroll Control in the comparator is removed. When the musician progresses across the lower numbered Grand Staff measures and again plays a note in measure six of the second Grand Staff line of the music the entire scrolling process is repeated until the musician finishes playing the piece. This circuit configuration operates the scrolling process in the same manner regardless of the number of Grand Staff lines in the music piece.

Associating the FIG. 8 error data with the Grand Staff being played.

Refer to FIG. 8 - - - The Data Analysis Collator, (35)

FIG. 8 is designed to operate in parallel with FIGS. 7 and 7A to assure that notes processed and temporarily stored in the digit registers/comparators of FIG. 7 are available to programmers and music teachers in a 'read' format. These data populate a 'read only' Data Storage buffer, (75) that contains the data for all Grand Staff lines played in a complete playing and is 'cleared' when the data for the total playing is read. The contents of the 'read only' Data Storage buffer (75) can be 'read into' a disc, CD or printer to use as a basic source for writing programs for specific piano training needs and progress evaluation.

Accordingly, FIG. 8, column 1, (55) is a continuation of the scan line column 1 of FIG. 7, (31) that carries the piano key identification and physical position on the keyboard. The measure line columns of FIG. 8 are a variation of the FIG. 7 measure lines and also extend vertically across all eighty-eight key scan lines thereby providing a note storage that makes analysis data down to the individual piano key played in specific Grand Staff line of music available to training material programmers. These data would include specific keystrokes, the type note played and the 'first play-second play', "match-error' data and similar information as detailed as the fact that a trainee was having repeated errors while using the fourth finger of his/her left hand.

This FIG. 8 configuration makes these data from any of the several measures of a multiplicity of Grand Staff Lines of music played available to programmers and music teachers. However, writing 'print-out' programs for analyzing specific playing errors, and the cause of those errors require that the scan line, key ID and note comparison data for each note played be readily identified with its originating Grand Staff Line and 'stored' in the 'read' buffer of FIG. 8, (75). The detailed operation of that innovation follows:

Refer to FIG. 8.

Note insertion into the registers of FIG. 7, controlled by the FIG. 7A processor, (previously described) are duplicated in the data entering the FIG. 8 'processor', (29) where it is inserted into modified measure columns that 'mirror' the FIG. 7 measure column. This function maintains scan line and Key ID as previously explained. The principle difference between the FIG. 7 data and the FIG. 8 data is that FIG. 8 data is stored in a 'Read' format that enables program writers to provide the wide variety of detailed comparison—error data needed for analysis. The FIG. 8, (75) note acquisition and storage method enables associating playing errors with specific Grand Staff lines of music played subsequent to playing Grand Staff music line 1.

This is enabled by providing a counter (56) in the FIG. 8 processor to count the number of Grand Staff lines as they are being played. This count begins when Grand Staff one responds to the 'high' that initiated scrolling from one grand Staff line of music to the next in FIGS. 7 and 7A as the music is played. (Previously explained) The processor in FIG. 8, (29) is programmed to translate 'scroll count' No. 1 to number the first Grand Staff line of music as "GS 1" and to insert it in the 'header' for column 1 of FIG. 8, (55). The FIG. 8 processor then numbers all measure columns of the "GS 1" analysis page as 'measure column' GS1-1, GS1-2. GS1-3, - - - GS1-'n'.

The processor of FIG. 7A detects the 'high' to low' transition when the musician completes playing the highest numbered measure line of Grand Staff Line 1 and moves to the lowest numbered measure of Grand Staff Line 2. The FIG. 7A processor converts this 'low' into a second "high" that is sent to the counter, (56) in the processor of FIG. 8. This second count initiates two actions:

The first is to command the FIG. 8 processor, (29) to stop inserting data in GS No. 1 and to open a new analysis page numbered GS-2 with the heading of this second page inserted in the 'header' of column 1, (55) as "GS-2".

The second action of the FIG. 8 processor is to command the FIG. 8 measure control (82) to number the measure columns within that Grand Staff line of music as GS2-1, GS2-2, GS2-3, - - - GS2-'n'. This process is repeated through playing all Grand Staff Lines of music. The above action provides individual FIG. 8 analysis pages for each Grand Staff line played.

This completes the explanation of the means of scrolling Grand Staff lines by recognizing the highest numbered measure line and starting scrolling when the musician turns that measure column 'high' when the first notes in that highest numbered measure column are played. This process is repeated for scrolling the second and subsequent Grand Staff Lines.

The above operation enables achieving another of the objectives of the disclosure.

The third function of the comparator in the Measure Counter of FIG. 7, (45) is to inhibit scrolling when a predetermined percentage of notes played in a "Second-Playing" do not match the corresponding notes of a "First-Playing" i.e. "The Pattern". The action to inhibit scrolling when playing errors exceed a preset objective and the means of 'restarting' playing are disclosed as follows:

Refer to FIG. 8, Analysis Data Collator (35)

An objective of the MUSIC TRAINING SYSTEM™ is to provide an accurate record of every note played by musicians in both of two sessions: The "first playing" session records every individual note of a playing by a music teacher, professional musician, recorded work of Old Masters, or others with high musical skill for later use as a 'pattern' for comparison. The operation is as follows:

With the 'play selection' switch, FIG. 10, switch 1, contact 5, (62) in the 'first play' position, the 'first play' registers in all scan lines are 'active, and the 'first play' status light is on via the 'high' on contact 5, switch 1, (62) The first play registers are 'saved' (held in the 'high' condition) through switch 1, contact 9, (59) as long as the Play Selection switch is in the 'First Play' condition. This is done to hold the First Play Registers in the active mode during the 'second playing' to enable the note matching function. This condition exists until the connection to the First Play switch 1 contact 5, (62) is moved to the "Clear Registers" position at switch 1, contact 7, (78) after both the first playing and the second playing have been completed. At that time the "Clear Registers" switch 1, contact 7, (78) is operated by the musician. This contact is in a permanent "Low" condition to force all registers to the low condition and all registers are cleared.

There are two types of second-play operation:

The first is a standard practice session with the Grand Staff lines scrolling automatically as the musician completes playing a particular Grand Staff Line regardless of the number of playing errors made. In this mode, the comparisons between the 'pattern' and the 'second-play' results are taken from the Analysis Data Collator of FIG. 8, (35 and (29). (previously described)

The second type of 'second playing', herein called "benchmarking", is a session that requires the musician to play a predetermined number of second play notes that 'match' the corresponding notes of the first play in both keystroke identification, note holding time and, when provided, the amplitude component of the music. If the selected percentage of 'matching' notes is achieved, the scrolling process operates automatically as previously described. Failure to achieve the objective number of matching notes results in the Grand Staff music lines not scrolling to the next Grand Staff line of music and the musician must operate external switches to clear the 'second play, registers, FIG. 10, Switch 1, contact 7 (78), and operate the restart function, Switch 1, contact 8, (83) to resume playing and repeat the process until the objective is reached. Algorithms are programmed into a processor embedded in the FIG. 7A processor, (64) to calculate when the percentage of 'matching' numbers has been achieved. The algorithm criteria are disclosed in the circuit operation of FIG. 9, (64).

Operation of the MUSIC TRAINING SYSTEM™ in the Benchmarking Mode:

An external switch, FIG. 10, switch 3, contact 5, (52) is operated by the teacher or trainee to operate the MUSIC TRAINING SYSTEM™ in a Scroll by "Benchmarking" mode. An objective selection switch, FIG. 10, (60) is provided to 'set' the percentage of the second player's keystrokes and notes that must 'match' those of the pattern music to continue scrolling the monitor. Also see FIG. 9, (60).

This percentage objective can vary from one percent upward for beginners to approaching one hundred percent for world-class musicians. This feature is disabled when the musician operates the switch to change the "Scroll by Benchmark" operation via, Switch 3, contact 5 selection to "Scroll by Grand Staff Lines, FIG. 10, switch 3, Contact 4, (54). The process of restoring the system to automatic scrolling as the Grand Staff Lines are played is described in the following disclosure:

Refer to FIG. 7, column 3, scan line C4 40:

Two digit registers separated by a comparator are shown in measures one through 'n' of FIG. 7 column 3 on scan line C4 40 to show the relationship of the comparator 'matching' function and the paired registers. (Previously explained)

These same data are recorded on FIG. 8, columns GS 1-1 through "n" in a different format to provide external read-only access to the data for writing analysis programs.

The MUSIC TRAINING SYSTEM™ operates in the "Scroll by Benchmark" mode with normal scrolling by Grand Staff lines as previously explained with the exception that scrolling is inhibited during a "Second Play" practice session if a predetermined number of notes played in a 'second-play' Grand Staff line of music does not 'match' the objective number of the corresponding notes in the 'first-play' register. By design, once scrolling is interrupted, the trainee must return to the beginning of the "Second Play" (practice) playing, and operate the FIG. 10 external switches to 'clear' the registers of the 'second play' session data. This operation lights the "Clear" lamp in the System Status Display, (71). This tells the musician to operate the "First Play-Second Play switch 1, (62) to the switch 1, contact 6, Second Play position. With that operation the program removes the 'inhibiting' 'low' that holds the Scroll by Grand Staff function inoperative. This enables the musician to resume playing the second play music and continue unless the percent errors again exceed the objective and the inhibiting process is repeated. The method of counting these 'restart' operations for training and evaluation purposes is detailed in the following disclosure.

Inhibiting scrolling when the benchmarking objective is not met:

Refer to FIG. 9.

Note 1: As previously explained, when the disclosure refers to "the number of notes" the reference is to a literal count of the actual keystrokes made by the musician. The second reference to "the note number" refers to the numbers representing the note symbols for the different types of notes played during the practice session.

Note 2: All circuit operations and components of FIG. 9, are internal to the FIG. 7A Processor with the exception of the external benchmarking start switch 3, (51), contact 5 and the benchmark objective selection switch (60), The counting and algorithm calculations, are internal to the central processor of FIG. 7A but are shown on FIG. 9 for clarity in the disclosure. (End of Notes)

When the "Benchmarking" mode is selected by operating the control switch FIG. 10, switch 3, contact 5, (52) and the "First-Play-Second Play switch, FIG. 10, switch 1, (33) contact 6, (62) to "Second-Play, the system is in the practice or the 'testing' mode. In this condition there is a connection from switch 1, contact 6, (62) to the second play "Active" light" of the System Status Display, (73). The second play lights in the status display are in a 'seeking battery' condition, and are "on" via the High applied when the play switch is set to the 'Second Play" condition. This tells the musician that the 'second play' registers are 'active and ready to accept notes. The musician 'sets' the required percentage of 'matching' numbers in the FIG. 7A processor, (64) by operating the "Benchmark Objective Selection Switch" FIG. 10, (60) This switch is also shown on FIG. 9 for clarity. In this example, the objective is 'set' to 25%. The circuitry of FIGS. 7, 7A and 8 combined with programming in the processor, compares every keystroke of the 'practice' playing with those of the corresponding keystroke previously recorded in the time slots of the first play, 'pattern' register. This action has been previously disclosed on page 39, line 10 to page 43, line 29. (Also see the recording registers and comparators on FIG. 7, Scan Line C4 40)

Three of the five scrolling modes of the block diagram of the System Scroll Control component of FIG. 7A, (50) are repeated on FIG. 9, (50) for clarity. This depiction shows three of the input segments numbered one to three, all of which have programming and circuitry connections to control the system monitor screen that replaces the physical music sheet. The function of these segments is to scroll the display of the music sheet in three different modes:

Segment one has a connection to external switch 3, contact 1, FIG. 10 (71) which is a 'rocker' type switch (71) that enables the musician to adjust the eye-level of the Grand Staff monitor screen.

Segment two is the internal processor scrolling of the measures within each Grand Staff and has no need for external switch control.

Segment three has connections to the Measure Control of FIG. 7, column 4, (32) to enable scrolling the Grand Staff lines in normal practice and presentation playing modes.

The operations of segments one, two and three have been previously disclosed.

Refer to FIG. 9:

"Scrolling by benchmarks" is an adaptation of scrolling by Grand Staff Lines and is disclosed as follows:

The algorithm table of FIG. 9 (64) is internal to the FIG. 7A processor at component (64) and has six columns: Column 1 is the number of "First Play" notes played in the first Grand Staff Line of music. This column is populated by numbers registered by the Measure Counter, FIG. 7, which is The Dynamic Control Program. The notes are totaled as they are played for each measure of the Grand Staff and transmitted to FIG. 8, (35), the Analysis Data Collator, column 7 and further summarized by total data for each Grand Staff Line played. The central processor is programmed to use these data to populate the FIG. 9 columns.

Column 2, (65): Before beginning a practice or training session, the musician or the instructor inserts, or plays, a 'first play' pattern that is stored in the 'first play register of FIG. 7, (33) as previously disclosed. For this disclosure example it is assumed that the First-Play musician played sixty (60) notes in the music being compared. When the musician is ready to begin practicing by competing against the pattern of the 'First-Play" material the control switch, FIG. 10, switch 1 is changed to the "Second Play" condition which is switch 1, contact 6, (62). (Previously described.) The musician or instructor decides what percentage of the notes of the first played pattern should be 'matched' during the second playing. This percentage is 'set' prior to playing by means of an external switch on FIG. 10, (60) and has connections, via the FIG. 9 processor to column two of FIG. 9, (65). Column 2 of FIG. 9 shows an example having 25% of the "Second-Play" notes selected. A schematic of the switch to select the matching objective is shown on FIG. 9, (60) for clarity in the disclosure. This switch is physically mounted external to the system processor for control panel access by the musician. See FIG. 10, (60). The 25% setting requires the musician to play 25% of second play notes that 'match' their corresponding 'First-Play' notes in order to scroll the Grand Staff.

FIG. 9 column 3, (66) is the number of second-play 'matching' notes that are required to achieve 25% of the sixty 'first-play' notes shown in column one and connected to the 25% level in column 2.via the solid line. In this example fifteen matching notes that 'match' the corresponding 'first-play' notes are required to in scroll the Grand Staff Lines of Music. (This is shown by the solid line connection)

FIG. 9 column 4 (67): contains the number of notes played by the trainee during the second playing that 'matched' their corresponding first-play notes. In the example it is fifteen notes. (This is shown by the solid line connection)

FIG. 9 column 5 (68): is an 'active' column that is controlled by the algorithm calculator in the Processor to subtract the objective result of column three from the actual result in column 4 and to translate the result of the calculations into either a High for positive numbers or a Low for negative numbers and turn column six either High or Low depending on the positive or negative numbers of column 5.

FIG. 9, column 6, (69): is the result of the calculations completed for column 5. The Processor of FIG. 9 is programmed not to react to a positive number (a High condition) on column six because the only reason for inhibiting scrolling is when the trainee does not meet the objective. For that reason no signal is sent to the system scroll control of FIG. 7A and the monitor scrolls as previously described under "Grand Staff Scrolling".

When a negative number is inserted in column 5, the processor of FIG. 9 translates it into a 'low' in column 6, (dotted line connections) with the following result:

When column 6 is in a negative (low) condition the FIG. 9 Processor, (52) is programmed to send a signal to the central Processor of FIG. 7A, to inhibit scrolling the Grand Staff and to hold it in the 'no scroll' condition until the "Restart" button on the external control panel is operated by the musician. The technical operation for the scroll inhibiting function is disclosed as follows:

Refer to schematics on FIG. 9, (52): (A component of the FIG. 7A Processor)

In the normal 'scroll by Grand Staff Lines mode, the scrolling action begins with a 'high' applied to the "Scroll by Grand Staff" segment of the FIG. 7A processor Scroll Control (50) as previously disclosed. A negative number in FIG. 9, column 5 'triggers' the FIG. 9 Processor to drive column six, (69) low. That 'low is applied to the 'set' terminal of an Asynchronous Flip-Flop, FIG. 9, (70). With a low on the 'set' terminal, the output of the Flip-Flop Q (not) is 'low'. This output low is connected via internal connections in the Processor to the FIG. 7A processor 'Scroll by Grand Staff' lead (segment 4) (50). With this connection driven to effective ground potential, no Grand Staff Scrolling can occur.

When the external 'Clear Switch, FIG. 10, switch 1, contact 7, (78) is operated by the musician the second-play' registers are cleared. All second play registers set to low by applying a 'Low" from FIG. 10, switch 1, contact 7, (78) through the FIG. 7A processor to the FIG. 7, column 2, Row Control (39). With the "Play" switch set in the 'Second Play' position, the low clears all Second Play notes in the registers in all scan lines. With the 'play' switch in the Second Play position, there is a connection from the switch 1, contact 7, (78) "Clear Switch" to a ground potential connection that clears the second play registers. In addition, the 'low' on contact 6, switch 1 has a connection to the System Status Display (73) that extinguishes the active First play Second Play lights.

The act of clearing the second-play registers removed the 'ground' from column 6 and has the effect or removing the 'Low' from the "set" (S) terminal of the Flip-Flop. With a 'low' on the reset (R) terminal of the flip-flop the Q (not) terminal of the flip-flop is 'high'. This transition from 'low' to 'High' is connected to, and operates, the 'Reset Counter' of FIG. 9, (63) that counts and records each restart action. A connection between the FIG. 9, (63) Reset Counter to the FIG. 10, System Status Display with an internal connection to the counter in the Reset Counter records the number of times the 'Stop Scrolling-Restart operation' occurred. These numbers are further transmitted to the FIG. 8, Key and Measure summary, (72) and from there to the Data Storage Unit, (75) to be included in the various analyses. It should be understood that the restart counter operates only when the scroll select switch is in the benchmark position.

At the end of the training session, the number of times that trainee failed to meet the objective and had to restart the second playing is available to the teacher and to the musician via 'read' programs written from data stored in the FIG. 8 Analysis Data Collator, FIG. 8, (75). These numbers are used by the teacher for coaching, training, testing and grading purposes.

This completes the "Scroll by 'Benchmarking" disclosure and also completes the detailed disclosure of the MUSIC TRAINING SYSTEM™.

Embodiments include a method of utilizing recent advances in digital electronics component speed, size reduction, cost reduction and advances in scanner technology to provide a MUSIC TRAINING SYSTEM™ comprising eliminating the need for printed music sheets and song book; scanning sheet music to a storage media such as a disc, transmitting the image of the music sheet into a system processor; and presenting the image on a display such as a flat screen monitor in a manner to duplicate the music sheet. Embodiments may further include electronically scrolling the Grand Staff lines of the music as they are played to eliminate the requirement that musicians interrupt playing to turn pages of music sheets. Embodiments may also further include providing music teachers a record of key used, note played, sequence in relation to other notes used during a practice or presentation session, thereby enabling music teachers to evaluate musical skill levels and incremental progress in quantifiable terms and optionally enabling music teachers to make note-by-note comparisons of a second playing with a first playing of the same music, and optionally enabling music teachers to precisely quantify trainee practice results with standards of instruction and practice. Embodiments may also include electronically generating music training 'benchmarks' for both trainees and accomplished musicians. Further embodiments may include means of quantitatively testing musicians during practice sessions against musicians having a higher degree of musical skills. Further embodiments include acquiring, collating and formatting details of each practice and training session. Yet further embodiments include formatting and making training comparison data accessible to computer programmers to write training programs for specific individuals. Additional embodiments include verifying that every key on a piano keyboard is precisely tuned to its fundamental frequency.

The means of eliminating the need for printed music sheets described in the previous paragraph may further include scanning sheet music to a storage media such as a disc, transmitting the image of the music sheet into a system processor, inserting the contents of the disc into the MUSIC TRAINING SYSTEM™ processor, and presenting music sheets on a display such as a flat screen monitor. Further embodiments may include sizing the image of the music sheet to fit monitor screen. Yet further embodiments may include generating vertical measure lines the width of which varies in accordance with the time signature specified on each music sheet. Embodiments may also include using the physical width of a standard digit register slot as a unit of measure for determining the total width of the measure columns, and optionally determining the width of the column by using two units of measure per note specified by the time signature. Further embodiments may include extending the measure lines of the music sheet as 'fixed' columns extending vertically across all eighty eight horizontal scan lines that contain the digit registers. Embodiments may also include recognizing and counting measure lines (beat marks) of each sheet of music as it is entered into the system, optionally using the time signatures specified on each music sheet to determine and temporarily store the number of notes expected to be played in the measure lines of each music sheet, and optionally adjusting the width of the music sheet measure line columns to 'span' the number of register slots required for storing the first and second playing notes of an individual piece of music. Additional embodiments may include using a comparator consisting of two identical digit registers separated by a comparator with slot-by-slot access to the digit slots of both registers. Yet further embodiments may include counting and temporarily storing the number of measure columns as their widths are adjusted by the System Processor, and optionally adjusting the width of measure columns according to the number of time slots required by the time signature on the music sheet.

Additional embodiments include a means of electronically scrolling the Grand Staff lines of the music in a manner to eliminate the requirement that musicians interrupt playing to turn pages of music sheets comprising adjusting the Grand Staff lines of music on the flat screen monitor to the optimum eye level of the individual musician before the music is played and/or adjusting the Grand Staff scrolling rate according to the tempo of the music being played. Further embodiments include a means of 'scrolling' a Grand Staff line of the music sheet upward into the optimum eye level of the individual musician move to the next Grand Staff line of music. Yet further embodiments include scrolling between Grand Staff measure lines internally in a computer processor as music is played, and progressing from a lower numbered measure line to the highest next measure line and following.

Some embodiments may include a series of external control panel switches to change scrolling to meet the need of individual musicians. Innovations and scrolling methodology of embodiments optionally enable producing a very small Music Training System unit having horizontal scrolling capabilities for hand held music instruments.

Embodiments may include a System Display showing the operating status of the MUSIC TEACHING SYSTEM™. Further embodiments may include sensing the end of playing a Grand Staff line of music and 'scrolling' to the lowest numbered measure line on the next following Grand Staff line of music. Yet further embodiments may include internal scrolling of the measure columns from one column to the next, and optionally counting the number of measures in the Grand Staff line of music as it is scanned into the system. Embodiments may include a temporarily stored "High" activated on a numbered list in the Measure Control Program that corresponds to the number of measures counted. Additional embodiments may include counting the number of measure columns as the system processor adjusts the width of the columns to conform to the time signature of the piece of music being played. Embodiments may further include using the number of measure columns to condition a 'High" on that number on a number list contained in the comparator section of the a Dynamic Control Program, using the time signature selected by the musician to activate a "high" condition on a numbered list, setting a marker in the Measure Counter equal to the number of notes to expect from the currently active measure column, distinguishing between Measure Columns for internal scrolling within the processor, distinguishing between Measure Columns for scrolling Grand Staff Line of the monitor, and/or preventing loss of data while scrolling between measure lines.

Embodiments may also include holding the highest two numbered measure columns in an active condition as long as the high that resulted from an incoming note is present on two lower numbered measures and not present on a third, higher numbered measure. Further embodiments may include closing the lowest numbered measure column to incoming notes, opening the third highest measure column when the musician plays a note in the next highest numbered measure column, and/or an "And-Not" flip-flop operating to close the lowest numbered measure column to incoming notes. Embodiments may include an "And-Not" flip-flop operating to make the second highest numbered measure column, active. Embodiments may also include scrolling the Grand Staff music lines on the display or flat-screen monitor upward into the optimum vision range of the as the of music is played.

Additional embodiments include a means of scrolling the Grand Staff under control of a 'Benchmark' objective that inhibits scrolling when benchmark objectives are not met comprising a means of setting precise 'benchmark' objectives via an external switch FIG. 10, (60); and providing an algorithm table (internal to the processor) containing six columns. Embodiments may also include means of populating the six algorithm columns. Embodiments may also include inhibiting scrolling when the objective number of 'Matching' notes is not achieved, clearing the second play registers, restarting scrolling after exceeding the 'Match" objectives, a Reset Counter to record the number of restarts after 'match' failures,' and/or providing the number of times the "Restart" operation was required.

In some embodiments, one or all of the embodiments mentioned in the above paragraphs may further include enabling music teachers, trainees, and musicians to compile a record of every piano key used, in what octave, the note played, and the sequence it was played in relation to other notes during a practice or presentation session, which may comprise capturing analog music from the air using a tuned microphone for each octave; identifying the fundamental frequency 'band' of the piano keyboard octaves and associating the analog frequencies with the octave that produced the eight frequencies of each octave, and associating the fundamental frequencies of the octaves with the twelve keys that produced them. Further embodiments may include amplifying captured musical harmonics to achieve consistent note amplitudes for the frequency band of each octave, employing series tuned precision filters to separate the harmonics from the fundamental frequencies contained in the note, associating the fundamental frequencies of the eighty eight individual keys with their keyboard designation, and/or passing each fundamental frequency through an analog to digital converter to obtain a digital square pulse. Embodiments may include maintaining the keyboard identity of every key that produced a frequency.

Embodiments may further include a means of associating the key and octave number with the literal keyboard position of any key that produced a note (counting left to right on the keyboard) and/or providing circuitry to measure the duration time of all notes played the note. Embodiments may include a means of precisely measuring the amplitude and duration time of every note played along with the key address of the note producing key. Embodiments may also include identifying the type note played on all keys by relating the measured the width of the digital pulse to the 'real-time' duration times of the notes. (i.e. quarter note—half note—etc.) played. Embodiments may also include providing separate scan-line paths for processing the Amplitude of the digital pulses and the duration time of the digital pulse because of the differences in their circuit functions. Further embodiments may include using a configuration of J-K Flip-Flops to convert a varying number of precision time markers into Binary Numbers each of which represents a specific musical note, converting nine binary numbers, each of which represents a different musical note symbol, into nine base 10 numbers that represent the note symbols, and/or using base 10 numbers to overcome the problem of storing nine different musical note symbols having varying symbol widths, each of which could be assigned to any one of the digit registers at any time during the playing.

Embodiments may include a means of acquiring musical notes that originate simultaneously or sequentially at multiple random points of a high-speed data system through diverse circuit configurations that transform and process the data, and transmit them to a collating point in a data system while maintaining the technical identification of each of the random points of origin to accurately associate the point of origin with the end result after processing the data (for purposes of this disclosure, this innovation is called a "Scan Line Highway" that begins on FIG. 4). Embodiments may further include providing parallel paths for the nine types of notes that could be simultaneously or sequentially played on any eighteen of the eighty eight keys on the piano. Additionally, embodiments may include assuring that notes played either, simultaneously or sequentially, are processed through the system immediately, and/or assuring that notes played either, simultaneously or sequentially, are stored in the proper comparator/registers.

Embodiments may include a scan line highway comprising using eighty eight parallel circuit paths to process both simultaneous and sequential notes through the system while maintaining the identification of every key that produced a note. Embodiments may further include eliminating gating circuit time delays by inserting note processing circuitry in series in each of the eighty eight 'scan lines' to eliminate the need for 'first in-first out'-gating circuits having their inherit time delays. Further embodiments may include identifying and storing all notes played in the comparison registers, whether simultaneously and/or sequentially, with no delays or interaction with other notes. Embodiments may include measuring the literal width of the 'high' pulse and/or inserting circuitry in series with every scan line by providing identical separate 'scan line' paths for measuring the duration time and amplitude of each 'high' pulse. Embodiments may also include measuring the holding time and amplitude of the digital pulse to determine the type note that was played. Embodiments may also include using scanners and counters in the processor to provide timely counts of the number and types of notes played on each of the individual eighty eight keys and/or maintaining the address and identification of every key that produced a note. Embodiments may further include controlling the dynamic factors of identifying, timing and sequencing the constantly shifting combinations of simultaneous and/or sequential notes. Additional embodiments include providing an external activation switch that displays a green light when the system is conditioned to accept notes and/or scanning all scan lines and 'trigger' on receipt of an "High" that represents an incoming note on any of the eighty eight scan lines.

Embodiments may include a system scanner/transmitter designed to continually scan all eighty eight individual key lines (Scan Lines) searching for a 'high' that denote the presence of a digital pulse that represents a note, transmitting a 'high' on any of eighty-eight scan lines along with the key identity and scan line number directly to three segments of the processor, and/or counting the notes as they are played in each measure as specified on the music sheet time signature and maintaining the identification and address of each note producing key. Embodiments may also include detecting the presence of a note and transmitting the key identity with the 'high' produced by the note to three locations in the system processor. Further embodiments include using the 'heads-up' pulse to pre-start various system operations prior to note arrival in the component to be used. Additional embodiments include simplifying the comparison analysis and training processes by converting the base 10 numerals, each of which represents a specific note symbol, back to the original note symbol.

Further embodiments include inserting notes into the digit registers, enabling music teachers to evaluate musical skill levels and incremental progress in quantifiable terms using note-by-note comparisons of a second playing with a first playing of the same music. Some embodiments use paired digit registers separated by a comparator, each component having slot-by-slot coordinating digit slots with the other two components. Embodiments may additionally include providing an external switch enabling the musician to control setting the music time signature into the FIG. 7A processor and/or automatically changing the horizontal number of registers according to the number of notes specified by the time signature.

Embodiments may also include a means of terminating eighty eight scan lines into eighty eight paired digit register/comparators that extend horizontally across as many vertical measure lines that are specified by the time signatures. Embodiments include generating measure columns that 'span' a number of digit register slots required by time signature of each music sheet. Embodiments may also include extending measure columns vertically across all eighty eight horizontal digit register columns to form a matrix for accepting notes incoming on any of the eighty eight scan lines. Further embodiments may include providing a Dynamic Control Program (FIG. 7, (44)) to manage the multiple simultaneous functions and commands of the system and serve as in interface between the FIG. 7 operation and the FIG. 8 data collating and formatting function. Additional embodiments include providing a means of counting and storing the number of measure columns generated and spaced as the system processor counts the measures and the measure width is adjusted to coordinate with the Time Signature of the music sheet.

Embodiments may include a means of inserting notes originating from any of eighty eight scan lines into only active first play registers or in the active corresponding second-play register and/or changing the status of the measure columns from active to inactive and vice versa in a manner to insert notes only into the 'active' digit registers. Embodiments may further include receiving and storing numerals representing notes into register slots of a digit register in the same order as the musician played them. Embodiments may also include means of 'switching' from a first play to a second play or from a second play to a first play status, a means of 'saving' data inserted into the digit registers when the musician completes playing, a means of clearing data from registers after playing and the note comparisons are compete, a means of using numerals derived from note symbols having different widths to reduce the number and size of register slots, and/or a means of using numerals derived from note symbols to facilitate measuring a digital pulse to get the precise holding time of individual notes. Embodiments may further include providing identical horizontal digit registers separated by a comparator with the three components having corresponding, slot-by-slot, register slots. Embodiments may include programming a comparator to 'read' the register slots in both rows of registers to determine whether the number in each slot of the 'first play' register match the numbers in the corresponding slots of the 'second play' register, programming a comparator to insert an 'M" (for match) into the comparator register if the numbers in the corresponding slots are the same, and/or inserting an "E" in the corresponding comparator slot if the numbers in corresponding slots do not match.

Further embodiments may include using the music sheet time signature to determine the number of notes expected to be received into the Note and Measure Counter in the Dynamic Control Program and/or counting the notes as they are entered into an active measure and to 'trigger' when the previously set number of notes expected by the time signature is equaled by the number entered into the active measure column. Embodiments may also include using the 'trigger' from the Measure Counter to activate the next highest numbered column in the matrix. Further embodiments may include a means of using the absence of the original 'triggering' high to 'de-activate' a measure column One or more of the above embodiments may include utilizing electronically generated 'Benchmarks' for both trainees and professional musicians to test themselves against musicians having a higher musical skill level than their own comprising: 'benchmarking' training objectives wherein an objective percentage of notes played in a second playing is required to 'match' the corresponding notes of a first playing or the system will not scroll to the next Grand Staff line of music. Embodiments may include a means of 'setting' a Benchmark objective variable from 0 to 100% to control the percentage of second playing notes required to 'match' the corresponding notes in a first playing of the same piece of music from the same music sheet. Further embodiments may include providing a status display panel shown on FIG. 9 that displays the conditions that exist in the system as various operations are activated or changed. Embodiments may further include a means of counting and recording the total notes played in both a first and a second playing of the same piece of music, comparing every note played in a second playing with its corresponding note in a first playing to determine a "match" or an error made by the second musician, counting and recording the first play notes, counting the second play notes that 'matched' the corresponding first play notes, separating the count of 'matching' notes from the count of errors made in the second playing, and/or using processor algorithms to calculate the percentage of second-play notes that match their corresponding first-play notes as the percentages change during the playing. Additional embodiments may include inhibiting scrolling when the preset objective percentage of 'matching' notes is not met. Embodiments may include 'clearing' second play registers to accommodate accepting 'replay' notes of the music previously played, restarting scrolling when the scrolling has been inhibited due to failure to meet note 'matching' objectives, and/or a 'restart counter' to count the number of times scrolling was inhibited. Embodiments may include providing 'feedback' to trainees during and after they perform the 'second playing' training sessions in note-by-note competition with a 'first playing' produced by a higher skilled musician.

One or more of the above embodiments may further include providing a means for music teachers and skilled musicians to verify the tuning of every one of the eighty eight keys on a piano keyboard comprising detecting out of tune piano keys or other note producing instruments. Embodiments may include a 'training' disc known to contain a recording of the precise fundamental frequency of each of eighty-eight piano keys (or other note producing instruments) carried through the third decimal point. In some embodiments, operate the 'first play' function of the system resulting in storing the standard notes in the 'first play registers of the FIG. 7, scan line C4 40 registers (26)-(43)-(26) comparators. Embodiments may include changing to 'second play' recording and striking, left to right, each of the eighty-eight keys taking care to strike only one note on any one key at any one time. In some embodiments, with both keys in tune, the note played will appear in the same position on the same line of the 'scan line' and, if the musician played the note consistently, the note numerals will be the same in both numeral storage registers.

One or more of the above embodiments may include acquiring, collating, formatting and storing detailed trainee practice and note comparison results to provide external access to those data by trainees, teachers, training material writers and system programmers comprising a means of extending the scan lines of FIG. 7 into FIG. 8 to enter notes into the "Total notes played per each scan line" column in the Key and Measure Summary, column 1, (72). Additional embodiments may include a method to operate FIG. 8 in parallel with FIGS. 7 and 7A to make notes stored in the digit registers/comparators of FIG. 7 available to programmers and music teachers in a 'read' format. Embodiments may include a Data Storage Unit, e.g., FIG. 8, (75) that provides a means of 'storing', collating and summarizing note data for all measures in a Grand staff line of music as it is being played. Other embodiments may include a Data Storage Unit (75) in the FIG. 8 Analysis Data Collator (35) as an 'assembly point' to provide read-write access to the data to be used in the various analyses to compare the second playing of a piece of music with the first. Some embodiments include a means of external 'read' access to the FIG. 8, Data Storage Unit, (75) via the FIG. 8 processor, to obtain 'match-error' data for each scan line in a format to enable programmers to compile error, total notes per key (scan line) and similar data for each training session. Embodiments may include a Note and Measure Counter, e.g., FIG. 7, (44) that counts and records the number of measures in the comparator as they are transmitted into the FIG. 7A and the FIG. 8 processor (29), to the FIG. 8 Analysis Data Collator (35) where they are to providing 'benchmarking' and other training material. Embodiments may also include inserting notes into the FIG. 8 Key and Measure Summary, "Total Notes per Scan Line" column and making them available to computer programmers via the Data Storage Unit (75) for writing training programs. Embodiments may also include operating the note insertion process of the registers of FIG. 7 in parallel with note insertion in the analysis registers of FIG. 8. Embodiments may include measure columns of FIG. 8 that are virtually duplicates of the register-comparator-register configuration of the FIG. 7 matrix in a different format.

Some embodiments include positioning the 'Pattern' playing with the 'Practice' playing in a manner that facilitates comparison and analysis of the result of the two 'playings.' Some embodiments include paralleling the FIG. 8 Analysis Data Collator (35) with the FIGS. 7 and 7A internal operation. Embodiments may include a Dynamic Control Program (44) of FIG. 7 interacting with the Measure Control Program of FIG. 7 column three (32) in order to process comparison data from the data acquisition circuitry into the 'read-write program assembly point' of FIG. 8, (75). Embodiments may also include using the internal Grand Staff scrolling process of FIGS. 7 and 7A to scroll to the next FIG. 8 analysis page after saving the data of the first measures into the Key and Measure Summary of FIG. 8 (72). Embodiments may include numbering the Grand Staff analysis pages to assign the 'matching-error' data to the correct Grand Staff playing as the Grand Staff is scrolled from the lower numbered Grand Staff line of music to the next active line.

Embodiments may include a Key and Measure Summary, FIG. 8, (72) which is a modified format of the "scan Line highway" oriented vertically to record every note played in every measure on every key, separated by octaves for each piece of music played. Embodiments may include a system that has the FIG. 8 Key and Measure Summary, (72) columns and registers formatted and configured to enable computer programmers to 'read' the comparison columns of FIG. 8 to produce a wide variety of training data. Embodiments may include conditioning the FIG. 8 matrix to accept the "match-error" data for the 'first-second' playing and to insert note data into FIG. 8 in parallel with the insertion of notes in the FIG. 7 matrix. Embodiments may include data acquisition and distributing the notes into the proper registers is identical and parallel with FIGS. 7A and 8.

Some embodiments include a means of inserting modified FIG. 7A measure lines into the processor of FIG. 8 (29), where they duplicate the measure column and the scan line spacing of FIG. 7 register rows. Embodiments may include providing FIG. 8 (75) note acquisition and storage methods to enable associating playing errors on the FIG. 8 analysis sheets with the specific Grand Staff line of music played subsequent to playing Grand Staff music line 1. Embodiments may include a processor in the FIG. 8 control segment, (29) that accepts the measure lines of the FIG. 7 matrix from the 7A processor, and reformats them to facilitate direct 'read' access to the data resulting from the two playings. Embodiments may include means of entering notes simultaneously into the FIG. 7 and FIG. 8 measure columns to assure that identical note data is inserted into measure columns and rows of FIG. 7 and FIG. 8. Embodiments may enable computer programmers to compile error, total notes per key (scan line) and similar data for training analysis by providing external access to the FIG. 8, Data Storage Unit, (75) via the FIG. 8 processor to compile error, total notes per key (scan line) and similar data for training analysis purposes.

Embodiments may include a basic source for writing programs for specific piano training needs and progress evaluation by providing a. Data Storage buffer, (75) that accepts the note data for all Grand Staff lines played in a complete playing in a format that can be 'read into' a disc, CD or printer. Embodiments may enable programmers to compile error, total notes per key and similar data for writing training analysis programs by providing a 'read access port to the Data Storage Unit, FIG. 8, via the FIG. 8 processor, to respond to remote processors and printers for the 'match-error' data for each scan line.

One or more of the above embodiments may include measuring and relating the digital pulse to the "Real Time" duration of the pulse to determine the type of note i.e. quarter note, half note, whole note etc. further comprising connecting a port on the computer system clock to the input (E3) of a high speed, pulse triggered On-Off gate to provide precision pulses at the output only when a digital pulse is present at the E2 input to the gate. Embodiments may include a means of opening and closing the gate by connecting the square-wave note pulse to terminal E2 of the gate thereby forward biasing and opening the gate only when a positive pulse is present (17). Embodiments may include a string of precision time markers, of which the number passing the gate is in direct proportion to the duration of the note (note: The time the note exists determines the type of note (and the note symbol) that was played). Embodiments may include a means of converting a series of precision time markers into Binary numbers. Embodiments may include a means of converting a series of Binary numbers into a series of base 10 integers. Embodiments may include an option for converting the Binary Numbers, each of which represents a specific musical note, into the Music Sheet Symbol for that note. Embodiments may include a binary counter operating as a shift register to count the number of precision time markers that pass the 'gate' while the square wave is in a 'high' condition. Embodiments may include nine J K Flip-Flops configured as a shift register to operate as a binary counter to stop counting when the pulse decays and be in a 'high condition' at the count where the pulse stops. Embodiments may include configuring the nine J K Flip-Flop to provide nine outputs to conform to the nine different notes produced by a musician while playing. Embodiments may include also a translator to convert the nine binary counter position numbers produced by the square wave into base 10 numbers. Embodiments may include developing uniform numbers to represent note symbols that have different widths to reduce the number of digit registers required. Embodiments may include an option (FIG. 6A) to change the number that represents a particular note into the original note symbol. Some embodiments may include digit registers and circuitry that change the number of digit slots to accommodate the several time signatures used in music. Embodiments may include an 'outpulser' to send the base 10 numbers into one side of a three part comparator of FIG. 7. [For an example see scan line C4 40, measure 4 (28) of FIG. 7].

FIG. 6B is included in the disclosure to graphically show the relationship between the notes, timing and the note symbols involved in converting the pulse generated from the analog notes into the correct symbol for the notes. For circuit operation explaining this process, see FIGS. 7, 7a, and 8.

In reference to FIG. 9, Example No. 1, with 40 'first—play' notes played and an objective of 25% matching notes, then 10 notes would be required to scroll the Grand Staff. The trainee only 'Matched' nine notes—this resulted in a negative number in col. 5 and a 'Low' in col. 6, which would inhibit scrolling the Grand Staff ('Highlighted by Dotted Lines'). In Example No. 2, with 60 'first—play' notes played and an objective of 25% matching notes, then 15 matching notes would be required to scroll the Grand Staff. The trainee played exactly 15 matching notes. When the algorithm divided the required number in column 3 into the actual number played in col. 4, the result was: —15÷15=1—a positive number in col. 5 and a 'High' in col. 6 which would continue scrolling the Grand Staff ('Highlighted by Solid Lines').

While the foregoing is directed to embodiments of the present invention, other and further embodiments of the invention may be devised without departing from the basic scope thereof, and the scope thereof is determined by the claims that follow.

The invention claimed is:

1. A method of displaying a sheet of music, comprising:
providing an image of the sheet of music on an electronic storage media;
transmitting the image from the electronic storage media into a system processor;
showing the image on a display; and
electronically and dynamically scrolling lines of the music image on the display in response to the musician playing each line on an instrument, wherein said system processor determines a scrolling rate of the lines according to fundamental frequencies of music notes of the music played by the musician and a time signature of the music on the image.

2. The method of claim 1, further comprising:
providing a record of a play of music by the musician, including key used, notes played, and sequence in relation to other notes.

3. The method of claim 2, further comprising:
providing a record of a second play of music by the musician, enabling a comparing of the first play with the second play.

4. The method of claim 2, further comprising:
providing a stored recording of a musical standard of the music in the electronic storage media; and
comparing the play of music by the musician to the standard.

5. The method of claim 4, further comprising:
acquiring, collating, and formatting results of the play of music; and
generating a report comparing the results of the play of music to the standard.

6. The method of claim 1, further comprising:
sizing the image to fit the display;
generating one or more music measure lines of the image; and
altering the width of the music measure lines according to the time signature specified on the image.

7. The method of claim 1, further comprising:
adjusting the lines of music on the display by moving the lines of the music image relative to the display to at or near eye level of the musician before the music is played.

8. The method of claim 1, further comprising:
adjusting a scrolling rate of the lines of music on the display in response to a tempo of the music being played by the musician each line on the instrument in real time.

9. A method of displaying a sheet of music, comprising:
providing an image of the sheet of music on an electronic storage media;
transmitting the image from the electronic storage media into a system processor;
showing the image on a display;
electronically scrolling lines of the music image as a musician plays each line on an instrument;
providing a record of a play of music by the musician, including key used, notes played, and sequence in relation to other notes;
providing a record of a second play of music by the musician, enabling a comparing of the first play with the second play,
wherein the comparing of the first play of music with the second play of music comprises determining a percentage of keystrokes of the first play which match keystrokes of the second play using the system processor.

10. A method of displaying a sheet of music, comprising:
providing an image of the sheet of music on an electronic storage media;
transmitting the image from the electronic storage media into a system processor;
showing the image on a display;
electronically scrolling lines of the music image as a musician plays each line on an instrument;
providing a record of a play of music by the musician, including key used, notes played, and sequence in relation to other notes,
wherein providing a record comprises:
capturing analog music using a tuned microphone for each octave;
identifying the fundamental frequency band of the octaves and associating the analog frequencies with the octave that produced the frequencies of each octave;
associating the fundamental frequencies of the octaves with the keys which produced the frequencies;
amplifying captured musical harmonics to achieve consistent note amplitudes for the frequency band of each octave;
passing each fundamental frequency through an analog to digital converter to obtain a digital square pulse; and
associating the key and octave number with keyboard position.

11. The method of claim 10, wherein providing a record comprises measuring a duration of all notes played, comprising:
measuring an amplitude, duration, and key address of notes played;
identifying the type of note played by relating a measured width of a digital pulse to a real-time duration of the notes played;
providing separate scan-line paths for processing the amplitude of the digital pulses and duration time of the digital pulse;
using a configuration of J-K flip-flops to convert a number of precision time markers into binary numbers, each of which represents a separate note;
converting binary numbers into base 10 numbers representing note symbols; and
storing the musical note symbols having different symbol widths using the base 10 numbers.

12. A method of displaying a sheet of music, comprising:
providing an image of the sheet of music on an electronic storage media;
transmitting the image from the electronic storage media into a system processor;
showing the image on a display;
electronically scrolling lines of the music image as a musician plays each line on an instrument;
sizing the image to fit the display;
generating one or more music measure lines of the image; and
altering the width of the music measure lines according to the time signature specified on the image,
wherein altering the width of the music measure lines comprises:
using the physical width of a standard digital register slot as a measuring unit to determine a total width of the measure columns; and
determining the width of the measure columns using two units of measure per note specified by the time signature.

13. The method of claim 12, further comprising extending the music measure lines as fixed columns extending vertically across eighty-eight horizontal scan lines containing digit registers.

14. The method of claim 13, further comprising:
counting measure lines of each image;
using the time signature of each image to store a number of notes expected to be played by the musician in the measure lines of each image; and
adjusting the width of measure line columns using the system processor to span the number of register slots required to store the first and second playing notes of a music image.

15. The method of claim 14, further comprising:
using a comparator comprising two identical digit registers separated by the comparator with slot-by-slot access to the digit slots of the identical digit registers;
counting and storing a number of measure line columns as their widths are adjusted by the system processor; and adjusting the width of measure line columns according to a number of time slots required by the time signature on the image.

16. A method of displaying a sheet of music, comprising:
providing an image of the sheet of music on an electronic storage media;
transmitting the image from the electronic storage media into a system processor;
showing the image on a display;
electronically scrolling lines of the music image as a musician plays each line on an instrument;
adjusting a scrolling rate of the lines of music on the display according to a tempo of the music being played,
wherein adjusting a scrolling rate of the lines of music on the display according to the tempo of the music being played comprises:
   scrolling between measure lines in the system processor as the music is played;
   progressing from a first measure line to a second measure line; and
   altering scrolling rate using a series of external control panel switches.

17. A music system for a musician, comprising:
a storage media into which a music sheet is scanned to form an image;
a system processor for storing and processing the image from the storage media, the system processor comprising:
   a music reproduction system for reproducing the music sheet as the image;
   a processor scroll control for adjusting one or more parameters, the one or more parameters including scrolling speed according to a tempo of the music of the image while the musician plays the music; and
   a processor measure counter for counting image measure lines and columns;
one or more microphones for detecting notes of music the musician plays;
one or more filters for separating fundamental frequencies of the notes of music the musician plays to form filtered notes of music;
a converter for converting the filtered notes of music from analog to digital signals to allow the signals to be transmitted to the system processor; and
an electronic display for displaying the image while the musician plays the music from the image.

18. The music system of claim 17, further comprising a data storage unit for storing, collating, and summarizing note data for measures in a line of music while the musician is playing music from the image.

19. The music system of claim 17, further comprising:
one or more paired digit registers and matching register slots, the paired digit registers including a first digit register capable of storing digits from a first play of the image by the musician and the second digit register capable of storing digits from a second play of the image by the musician; and
a comparator for monitoring the digit registers and providing a first indication in the register slots if corresponding digit registers match or providing a second indication in the register slots if the corresponding digit registers do not match.

20. The music system of claim 17, further comprising:
one or more scanners and one or more counters for providing counts of the number and types of notes played on keys of a musical instrument.

* * * * *